US010468199B2

(12) United States Patent
Kusuzaka et al.

(10) Patent No.: US 10,468,199 B2
(45) Date of Patent: Nov. 5, 2019

(54) NONAQUEOUS LITHIUM POWER STORAGE ELEMENT

(71) Applicant: Asahi Kasei Kabushiki Kaisha, Tokyo (JP)

(72) Inventors: Keita Kusuzaka, Tokyo (JP); Kazuteru Umetsu, Tokyo (JP); Nobuhiro Okada, Tokyo (JP); Tekeshi Kamijo, Tokyo (JP); Atsushi Hosokibara, Tokyo (JP); Tadashi Matsushita, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/070,422

(22) PCT Filed: Jan. 20, 2017

(86) PCT No.: PCT/JP2017/002033
§ 371 (c)(1),
(2) Date: Jul. 16, 2018

(87) PCT Pub. No.: WO2017/126698
PCT Pub. Date: Jul. 27, 2017

(65) Prior Publication Data
US 2019/0027321 A1 Jan. 24, 2019

(30) Foreign Application Priority Data

Jan. 22, 2016 (JP) ................. 2016-010895
Aug. 8, 2016 (JP) ................. 2016-155797
Sep. 30, 2016 (JP) ................. 2016-192566
Sep. 30, 2016 (JP) ................. 2016-192651
Sep. 30, 2016 (JP) ................. 2016-192662

(51) Int. Cl.
*H01M 4/1393* (2010.01)
*H01M 10/42* (2006.01)
*H01M 10/0525* (2010.01)
*H01G 11/06* (2013.01)
*H01G 11/24* (2013.01)
*H01G 11/46* (2013.01)
*H01M 10/052* (2010.01)
*H01M 10/0567* (2010.01)
*H01M 10/0585* (2010.01)
*H01G 11/34* (2013.01)
*H01G 11/50* (2013.01)
*H01G 11/60* (2013.01)
*H01G 11/62* (2013.01)

(52) U.S. Cl.
CPC ............ *H01G 11/06* (2013.01); *H01G 11/24* (2013.01); *H01G 11/34* (2013.01); *H01G 11/46* (2013.01); *H01G 11/50* (2013.01); *H01G 11/60* (2013.01); *H01G 11/62* (2013.01); *H01M 4/1393* (2013.01); *H01M 10/052* (2013.01); *H01M 10/0525* (2013.01); *H01M 10/0567* (2013.01); *H01M 10/0585* (2013.01); *H01M 10/4242* (2013.01); *Y02E 60/13* (2013.01); *Y02T 10/7022* (2013.01)

(58) Field of Classification Search
CPC ........... H01M 4/1393; H01M 10/0525; H01M 10/4242; H01M 10/052; H01M 10/0567; H01M 10/0585
See application file for complete search history.

(56) References Cited

U.S. PATENT DOCUMENTS

| 5,427,875 A | 6/1995 | Yamamoto et al. |
| 5,702,843 A | 12/1997 | Mitate et al. |
| 5,928,812 A * | 7/1999 | Xue ................... H01M 4/13 429/231.95 |

(Continued)

FOREIGN PATENT DOCUMENTS

| CN | 101641811 A | 2/2010 |
| EP | 2219247 A1 | 8/2010 |

(Continued)

OTHER PUBLICATIONS

Barrett et al., "The Determination of Pore Volume and Area Distributions in Porous Substances: Computations from Nitrogen Isotherms," The Journal of the American Chemical Society, 73: 373-380 (1951).
Lippens et al., "Studies on Pore Systems in Catalysts: The t Method," Journal of Catalysts, 4: 319-323 (1965).
Mikhail et al., "Investigations of a Complete Pore Structure Analysis: Analysis of Micropores," Journal of Colloid and Interface Science, 26: 45-53 (1968).
Ravikovitch et al., "Density Functional Theory Model of Adsorption on Amorphous and Microporous Silica Materials," Langmuir, 22: 11171-11179 (2006).
International Search Report issued in corresponding International Patent Application No. PCT/JP2017/002033 dated Apr. 18, 2017.

(Continued)

*Primary Examiner* — Carlos Barcena
(74) *Attorney, Agent, or Firm* — Morgan, Lewis & Bockius LLP

(57) ABSTRACT

This nonaqueous lithium power storage element contains a positive electrode, a negative electrode, a separator, and a nonaqueous electrolyte that contains lithium ions. The positive electrode has a positive electrode current collector and a positive electrode active material layer disposed on one surface or both surfaces of the positive electrode current collector, and the positive electrode active material layer contains a positive electrode active material that contains a carbon material. When the pore distribution of the positive electrode active material layer is measured by mercury intrusion, the pore distribution curve for the relationship between the pore diameter and log differential pore volume has at least one peak having a peak value of 1.0-5.0 mL/g for the log differential pore volume in the pore diameter range of 0.1-50 μm, and the total cumulative pore volume Vp in the pore diameter range of 0.1-50 μm is 0.7-3.0 mL/g.

38 Claims, No Drawings

(56) References Cited

U.S. PATENT DOCUMENTS

| | | | |
|---|---|---|---|
| 2004/0126659 A1* | 7/2004 | Graetz | H01G 9/155 429/218.1 |
| 2005/0130043 A1 | 6/2005 | Gao et al. | |
| 2005/0233218 A1 | 10/2005 | Ogawa et al. | |
| 2006/0105242 A1* | 5/2006 | Sato | H01M 4/13 429/231.95 |
| 2006/0134517 A1 | 6/2006 | Sawa et al. | |
| 2006/0209493 A1 | 9/2006 | Fujino et al. | |
| 2007/0281216 A1 | 12/2007 | Petrat et al. | |
| 2008/0055819 A1 | 3/2008 | Taguchi et al. | |
| 2009/0246624 A1 | 10/2009 | Kojima et al. | |
| 2010/0117031 A1 | 5/2010 | Akagi et al. | |
| 2010/0255377 A1* | 10/2010 | Tsubata | H01M 4/587 429/231.8 |
| 2011/0159382 A1 | 6/2011 | Matsui et al. | |
| 2012/0050950 A1 | 3/2012 | Kim et al. | |
| 2012/0094177 A1 | 4/2012 | Honoki et al. | |
| 2012/0212186 A1 | 8/2012 | Fujii et al. | |
| 2012/0288759 A1 | 11/2012 | Nagai et al. | |
| 2015/0049415 A1 | 2/2015 | Tsukada et al. | |
| 2015/0311002 A1 | 10/2015 | Okada et al. | |
| 2016/0225537 A1 | 8/2016 | Tsukada et al. | |
| 2016/0300667 A1 | 10/2016 | Okada et al. | |
| 2017/0207459 A1 | 7/2017 | Okada et al. | |
| 2017/0244096 A1* | 8/2017 | Kuzushima | H01M 10/0569 |
| 2017/0244098 A1 | 8/2017 | Duong et al. | |

FOREIGN PATENT DOCUMENTS

| | | |
|---|---|---|
| JP | H04-328278 A | 11/1992 |
| JP | 2001-167767 A | 6/2001 |
| JP | 2004-014300 A | 1/2004 |
| JP | 2004-095188 A | 3/2004 |
| JP | 2004-362859 A | 12/2004 |
| JP | 2008-171593 A | 7/2008 |
| JP | 2008-177263 A | 7/2008 |
| JP | 2008-181830 A | 8/2008 |
| JP | 2009-231234 A | 10/2009 |
| JP | 2012-006826 A | 1/2012 |
| JP | 2012-209161 A | 10/2012 |
| JP | 2012-212629 A | 11/2012 |
| JP | 5278467 B2 | 9/2013 |
| JP | 2013-201170 A | 10/2013 |
| JP | 2014-199723 A | 10/2014 |
| JP | 2015-061053 A | 3/2015 |
| JP | 2016-012620 A | 1/2016 |
| TW | 201535848 A | 9/2015 |
| WO | 2011/089701 A1 | 7/2011 |
| WO | 2014/088074 A1 | 6/2014 |
| WO | 2016/006632 A1 | 1/2016 |

OTHER PUBLICATIONS

International Preliminary Report on Patentability and Written Opinion issued in corresponding International Patent Application No. PCT/JP2017/002033 dated Aug. 2, 2018.

Decision to Grant issued in corresponding Japanese Patent Application 2017-509053 dated Sep. 12, 2017.

Supplementary European Search Report issued in corresponding European Patent Application No. 17741575.9 dated Feb. 1, 2019.

* cited by examiner

NONAQUEOUS LITHIUM POWER STORAGE ELEMENT

FIELD

The present invention relates to a nonaqueous lithium power storage element.

BACKGROUND

In recent years, with an aim toward effective utilization of energy for greater environmental conservation and reduced usage of resources, a great deal of attention is being directed to power smoothing systems for wind power generation or overnight charging electric power storage systems, household dispersive power storage systems based on solar power generation technology, and power storage systems for electric vehicles and the like.

The number one requirement for cells used in such power storage systems is high energy density. The development of lithium ion batteries is advancing at a rapid pace, as an effective strategy for cells with high energy density that can meet this requirement.

The second requirement is a high output characteristic. A high power discharge characteristic is required for a power storage system during acceleration in, for example, a combination of a high efficiency engine and a power storage system (such as in a hybrid electric vehicle), or a combination of a fuel cell and a power storage system (such as in a fuel cell electric vehicle).

Electrical double layer capacitors and nickel-metal hydride batteries are currently under development as high output power storage devices.

Electrical double layer capacitors that employ activated carbon in the electrodes have output characteristics of about 0.5 to 1 kW/L. Such electrical double layer capacitors have high durability (cycle characteristics and high-temperature storage characteristics), and have been considered optimal devices in fields where the high output mentioned above is required. However, their energy densities are no greater than about 1 to 5 Wh/L. A need therefore exists for even higher energy density.

On the other hand, nickel-metal hydride batteries employed in existing hybrid electric vehicles exhibit high output equivalent to electrical double layer capacitors, and have energy densities of about 160 Wh/L. Still, research is being actively pursued toward further increasing their energy density and output, and increasing their durability.

Research is also advancing toward increased outputs for lithium ion batteries as well. For example, lithium ion batteries are being developed that yield high output exceeding 3 kW/L at 50% depth of discharge (a value representing the state of the percentage of discharge of the service capacity of a power storage element). However, the energy density is 100 Wh/L or lower, and the design is such that the high energy density, which is the major feature of a lithium ion battery, is reduced. The durability (especially cycle characteristic and high-temperature storage characteristic) is inferior to that of an electrical double layer capacitor. In order to provide practical durability, therefore, these are used with a depth of discharge in a narrower range than 0 to 100%. Because the usable capacity is even lower, research is actively being pursued toward further increasing the durability of lithium ion batteries.

There is a strong demand for implementation of power storage elements exhibiting high energy density, high output characteristics and durability, as mentioned above. Nevertheless, the existing power storage elements mentioned above have their advantages and disadvantages. New power storage elements are therefore desired that can meet these technical requirements.

Promising candidates are power storage elements known as lithium ion capacitors, which are being actively developed in recent years.

The energy of a capacitor is represented as $½·C·V^2$ (where C is electrostatic capacitance and V is voltage).

A lithium ion capacitor is a type of power storage element using a nonaqueous electrolytic solution comprising a lithium salt (or, "nonaqueous lithium power storage element"), wherein charge/discharge is accomplished by: non-Faraday reaction by adsorption/desorption of anions similar to an electrical double layer capacitor at about 3 V or higher, at the positive electrode; and Faraday reaction by intercalation/release of lithium ions similar to a lithium ion battery, at the negative electrode.

To summarize these electrode materials and their characteristics: when charge/discharge is carried out using a material such as activated carbon as an electrode, by adsorption and desorption of ions on the activated carbon surface (non-Faraday reaction), it is possible to obtain high output and high durability, but with lower energy density (for example, one-fold). When charge/discharge is carried out by Faraday reaction using an oxide or carbon material as the electrode, the energy density is higher (for example, 10 times that of non-Faraday reaction using activated carbon), but then durability and output characteristic become issues.

Electrical double layer capacitors that combine these electrode materials employ activated carbon as the positive electrode and negative electrode (energy density: one-old), and carry out charge/discharge by non-Faraday reaction at both the positive and negative electrodes, and are characterized by having high output and high durability, but also low energy density (positive electrode: one-fold×negative electrode: one-fold=1).

Lithium ion secondary batteries use a lithium transition metal oxide for the positive electrode (energy density: 10×) and a carbon material (energy density: 10-fold) for the negative electrode, carrying out charge/discharge by Faraday reaction at both the positive and negative electrodes, and have high energy density (positive electrode: 10-fold×negative electrode: 10-fold=100), but have issues in terms of output characteristic and durability. The depth of discharge must be restricted in order to satisfy the high durability required for hybrid electric vehicles, and with lithium ion secondary batteries only 10 to 50% of the energy can be utilized.

A lithium ion capacitor is a new type of asymmetric capacitor that employs activated carbon (energy density: one-fold) for the positive electrode and a carbon material (energy density: 10-fold) for the negative electrode, and it is characterized by carrying out charge/discharge by non-Faraday reaction at the positive electrode and Faraday reaction at the negative electrode, and thus having the characteristics of both an electrical double layer capacitor and a lithium ion secondary battery. A lithium ion capacitor exhibits high output and high durability, while also having high energy density (positive electrode: one-fold×negative electrode: 10-old=10) and requiring no restrictions on depth of discharge as with a lithium ion secondary battery.

As explained above, the potential uses of nonaqueous lithium power storage elements such as lithium ion batteries and lithium ion capacitors include automobiles and the like, but as their applications continue to increase in the future there will be greater demand for an even higher level of improved energy density, output characteristics and durability.

In light of this background, as a measure for improving the output characteristic and cycle durability of a lithium ion battery, it has been proposed in PTLs 1 and 2 to appropriately specify the conductive filler amount, voids and pore sizes in the positive electrode active material layer of the positive electrode, in order to form a satisfactory conductive pathway in the positive electrode active material layer, increase the lithium ion conductivity and ensure electrolytic solution retentivity.

However, the technique described in PTL 1 is particularly dependent on the pores formed by the gaps between the conductive filler in the positive electrode active material layer, and despite retentivity of the electrolytic solution in the pores, linkage between the conductive filler is easily broken, and therefore the input/output characteristic has had room for improvement. Moreover, while the technique described in PTL 2 ensures the void percentage or pore size and increases the lithium ion conductivity, it is also associated with lower positive electrode bulk density and has potentially resulted in reduced energy density.

In PTL 3 there is proposed a lithium ion secondary battery using a positive electrode containing lithium carbonate in the positive electrode, and having a current shielding mechanism that operates in response to increased internal pressure in the battery. In PTL 4 there is proposed a lithium ion secondary battery employing a lithium complex oxide such as lithium manganate as the positive electrode, and with reduced elution of manganese by including lithium carbonate in the positive electrode. In PTL 5 there is proposed a method of causing restoration of the capacitance of a deteriorated power storage element by oxidizing different lithium compounds as coated oxides at the positive electrode.

However, the methods described in PTLs 3 to 5 are associated with the problems of increased resistance due to decomposition of residual lithium compounds in the positive electrode, and reduced energy density, and therefore further room for improvement exists in terms of the high load charge/discharge characteristic.

On the other hand, PTL 6 discloses a power storage device wherein the negative electrode active material used is mesoporous graphite of which the volume of mesopores with pore diameters of 100 Å to 400 Å occupies 25% to 85% of the total mesopore volume, and wherein a satisfactory output characteristic is exhibited at room temperature and at low temperature.

However, PTL 6 contains no description regarding the pore volume, specific surface area. and distribution thereof in the negative electrode active material layer. Research by the present inventors has shown that by merely adjusting the pore volume, specific surface area and their distribution in the negative electrode active material alone, it is difficult to obtain a sufficient input/output characteristic and high load charge/discharge cycle characteristic, in a nonaqueous lithium power storage element using the material. The pore volume, specific surface area and distribution thereof in a negative electrode active material layer are significantly affected by the types of negative electrode active material, conductive filler and binder, as well as their weight ratios in the negative electrode active material layer, or the amount of coverage of the coating or accumulation by reductive decomposition of the nonaqueous electrolytic solution at the negative electrode active material layer. Thus, it was found that the pore volume, specific surface area and their distribution in the negative electrode active material layer have an effect on the input/output characteristic and high load charge/discharge cycle characteristic, in a nonaqueous lithium power storage element using the material.

CITATION LIST

Patent Literature

[PTL 1] International Patent Publication No. WO2011/089701
[PTL 2] Japanese Unexamined Patent Publication No. 2012-209161
[PTL 3] Japanese Unexamined Patent Publication HEI No. 4-328278
[PTL 4] Japanese Unexamined Patent Publication No. 2001-167767
[PTL 5] Japanese Patent Publication No. 5278467
[PTL 6] Japanese Unexamined Patent Publication No. 2009-231234

SUMMARY

Technical Problem

In light of the circumstances described above, the problem to be solved by the invention is that of providing a nonaqueous lithium power storage element that is excellent in terms of high energy density, high input/output characteristic and high load charge/discharge cycle durability.

The present invention has been devised on the basis of this discovery.

Solution to Problem

The aforementioned problem is solved by the following technical means.

Specifically, the present invention provides the following.

[1]

A nonaqueous lithium power storage element containing a positive electrode, a negative electrode, a separator and a nonaqueous electrolytic solution containing lithium ion, wherein the positive electrode has a positive electrode power collector and a positive electrode active material layer disposed on one or both sides of the positive electrode power collector, the positive electrode active material layer comprising a positive electrode active material containing a carbon material, the negative electrode has a negative electrode power collector and a negative electrode active material layer disposed on one or both sides of the negative electrode power collector, the negative electrode active material layer comprising a negative electrode active material that can intercalate and release lithium ions, and when the pore distribution of the positive electrode active material layer is measured by mercury intrusion, the pore distribution curve for the relationship between the pore size and the log differential pore volume has at least one peak with a peak value of 1.0 mL/g to 5.0 mL/g for the log differential pore volume in the pore diameter range of 0.1 μm to 50 μm, and the total cumulative pore volume $V_p$ in the pore diameter range of 0.1 pin to 50 μm is 0.7 mL/g to 3.0 mL/g.

[2]

The nonaqueous lithium power storage element according to [1], wherein the pore distribution curve for the positive electrode active material layer has at least two peaks with a peak value of 0.5 mL/g to 5.0 mL/g for the log differential pore volume in the pore diameter range of 0.1 µm to 50 µm.

[3]

The nonaqueous lithium power storage element according to [2], wherein the pore distribution curve for the positive electrode active material layer has at least two peaks in the pore diameter range of 0.3 µm to 20 µm.

[4]

The nonaqueous lithium power storage element according to any one of [1] to [3], wherein the positive electrode contains a lithium compound other than the positive electrode active material.

[5]

The nonaqueous lithium power storage element according to [4], wherein the lithium compound is one or more types selected from the group consisting of lithium carbonate, lithium oxide and lithium hydroxide.

[6]

The nonaqueous lithium power storage element according to [4] or [5], wherein the lithium compound in the positive electrode is lithium carbonate.

[7]

The nonaqueous lithium power storage element according to any one of [4] to [6], wherein the amount of lithium compound in the positive electrode is 1 weight % to 50 weight %, based on the weight of the positive electrode active material layer.

[8]

The nonaqueous lithium power storage element according to any one of [4] to [7], wherein 0.1 µm≤$Y_1$≤10 µm, where $Y_1$ is the mean particle diameter of the lithium compound, 2 µm≤$Z_1$≤20 µm, where $Z_1$ is the mean particle diameter of the positive electrode active material, and $Y_1$<$Z_1$.

[9]

The nonaqueous lithium power storage element according to any one of [4] to [8], wherein the proportion $A_1$ of voids with an area of 0.2 µm$^2$ to 250 µm$^2$ in a cross-sectional SEM image of the positive electrode active material layer is 10% to 60% per unit area of the positive electrode active material layer.

[10]

The nonaqueous lithium power storage element according to [9], wherein 1.0≤$B_1/4C_1$≤3.5 is satisfied, where $B_1$ is the total circumferential length of voids with an area of 0.2 µm$^2$ to 250 µm$^2$ in a cross-sectional SEM image of the positive electrode active material layer, and $C_1$ is the total of the square roots of the areas of voids with an area of 0.2 µm$^2$ to 250 µm$^2$.

[11]

The nonaqueous lithium power storage element according to [9] or [10], wherein in a cross-sectional SEM image of the positive electrode active material layer, voids are present surrounding the lithium compound in the positive electrode active material layer, and $X_1$>$Y_1$ is satisfied, where $X_1$ is the mean size of the voids.

[12]

The nonaqueous lithium power storage element according to any one of [4] to [11], wherein 0.3≤A≤5.0, 0.5≤B≤10, 0.05≤C≤3.0 and 0.4≤A/B≤1.5 are satisfied, where A (µL/cm$^2$) is the mesopore volume per unit area due to pores with diameters of 20 Å to 500 Å, as calculated by the BJH method in nitrogen gas adsorption measurement for each side of the positive electrode, B (µL/cm$^2$) is the micropore volume per unit area due to pores with diameters of smaller than 20 Å, as calculated by the MP method in the nitrogen gas adsorption measurement, and C (µL/cm$^2$) is the ultramicropore volume per unit area due to pores with diameters of smaller than 7 Å, as calculated by the DFT method in carbon dioxide gas adsorption measurement for each side of the positive electrode.

[13]

The nonaqueous lithium power storage element according to [12], wherein 1≤D≤20, where D (m$^2$/cm$^2$) is the specific surface area per unit area as calculated by the BET method in nitrogen gas adsorption measurement, for each side of the positive electrode.

[14]

The nonaqueous lithium power storage element according to any one of [1] to [13], wherein the area overlap ratio $A_2$ of fluorine mapping with respect to oxygen mapping, binarized based on the mean value of brightness, is 40% to 99%, in element mapping of the positive electrode surface by SEM-EDX.

[15]

The nonaqueous lithium power storage element according to any one of [1] to [14], wherein the area overlap ratio $A_3$ of fluorine mapping with respect to oxygen mapping, binarized based on the mean value of brightness, is 10% to 60%, in element mapping of a broad ion beam (BIB) processed cross-section of the positive electrode by SEM-EDX.

[16]

The nonaqueous lithium power storage element according to any one of [1] to [15], wherein the volume of pores of 20 Å to 350 Å as calculated by QSDFT (Quenching Solid Density Functional Theory) in the negative electrode active material layer is 50% to 100% of the volume of pores of 0 Å to 350 Å as calculated by QSDFT.

[17]

The nonaqueous lithium power storage element according to [16], wherein the volume of pores of 20 Å to 250 Å as calculated by QSDFT in the negative electrode active material layer is 40% to 90% of the volume of pores of 0 Å to 350 Å as calculated by QSDFT.

[18]

The nonaqueous lithium power storage element according to [16] or [17], wherein the specific surface area of 20 Å to 350 Å as calculated by QSDFT in the negative electrode active material layer is 20% to 100% of the specific surface area of 0 Å to 350 Å as calculated by QSDFT.

[19]

The nonaqueous lithium power storage element according to any one of [16] to [18], wherein the mean pore size of the negative electrode active material layer is 2 nm to 20 nm.

[20]

The nonaqueous lithium power storage element according to any one of [1] to [19], wherein the positive electrode active material comprises an activated carbon as the carbon material.

[21]

The nonaqueous lithium power storage element according to [20], wherein the activated carbon satisfies 0.3<$V_1$≤0.8 and 0.5≤$V_2$≤1.0, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and has a specific surface area of 1,500 m$^2$/g to 3,000 m$^2$/g, as measured by the BET method.

[22]

The nonaqueous lithium power storage element according to [20], wherein the activated carbon satisfies 0.8<$V_1$≤2.5, where $V_1$ (cc/g) is the mesopore volume due to pores with diameters of 20 Å to 500 Å as calculated by the BJH method, satisfies $0.8 < V_2 \leq 3.0$, where $V_2$ (cc/g) is the micropore volume due to pores with diameters of smaller than 20 Å as calculated by the MP method, and has a specific surface area of 2,300 m$^2$/g to 4,000 m$^2$/g, as measured by the BET method.

[23]

The nonaqueous lithium power storage element according to any one of [1] to [22], wherein the mean particle diameter of the positive electrode active material is 1 μm to 10 μm.

[24]

The nonaqueous lithium power storage element according to any one of [1] to [23], wherein the doping amount of lithium ion in the negative electrode active material is 530 mAh/g to 2,500 mAh/g per unit weight.

[25]

The nonaqueous lithium power storage element according to any one of [1] to [24], wherein the BET specific surface area of the negative electrode active material is 100 m$^2$/g to 1,500 m$^2$/g.

[26]

The nonaqueous lithium power storage element according to any one of [1] to [23], wherein the doping amount of lithium ion in the negative electrode active material is 50 mAh/g to 700 mAh/g per unit weight.

[27]

The nonaqueous lithium power storage element according to any one of [1] to [23] and [26], wherein the BET specific surface area of the negative electrode active material is 1 m$^2$/g to 50 m$^2$/g.

[28]

The nonaqueous lithium power storage element according to any one of [1] to [23], [26] and [27], wherein the mean particle diameter of the negative electrode active material is 1 μm to 10 μm.

[29]

The nonaqueous lithium power storage element according to any one of [1] to [28], wherein the positive electrode power collector and the negative electrode power collector are metal foils without through-holes.

[30]

The nonaqueous lithium power storage element according to any one of [1] to [29], wherein the following (a) and (b) are simultaneously satisfied for the nonaqueous lithium power storage element:

(a) the product of Ra and F, Ra·F, is 0.3 to 3.0,
(b) E/V is 15 to 50, where Ra (Ω) is the initial internal resistance at a cell voltage of 4 V, F (F) is the electrostatic capacitance, E (Wh) is the electrical energy and V (L) is the volume of the power storage element.

[31]

The nonaqueous lithium power storage element according to any one of [1] to [29], wherein Rb/Ra is 0.90 to 2.0, where Rb (Ω) is the internal resistance of the nonaqueous lithium power storage element after a charge/discharge cycling test conducted 60,000 times at an environmental temperature of 25° C. and a rate of 300 C, in a cell voltage range from 2.2 V to 3.8 V, and Ra (Ω) is the internal resistance before the charge/discharge cycling test.

[32]

A power storage module containing a nonaqueous lithium power storage element according to any one of [1] to [31].

[33]

A power regenerating system containing a nonaqueous lithium power storage element according to any one of [1] to [31].

[34]

A power load-leveling system containing a nonaqueous lithium power storage element according to any one of [1] to [31].

[35]

An uninterruptable power source system containing a nonaqueous lithium power storage element according to any one of [1] to [31].

[36]

A non-contact power supply system containing a nonaqueous lithium power storage element according to any one of [1] to [31].

[37]

An energy harvesting system containing a nonaqueous lithium power storage element according to any one of [1] to [31].

[38]

A power storage system containing a nonaqueous lithium power storage element according to any one of [1] to [31].

Advantageous Effects of Invention

According to the invention it is possible to provide a nonaqueous lithium power storage element that is excellent in terms of high energy density, high input/output characteristic and high load charge/discharge cycle durability.

DESCRIPTION OF EMBODIMENTS

An embodiment of the invention (hereunder referred to as "this embodiment") will now be explained in detail as an example, with the understanding that the invention is not limited to this embodiment. The upper limits and lower limits for the numerical ranges for this embodiment may be combined as desired to constitute any desired numerical ranges.

<Nonaqueous Lithium Power Storage Element>

A lithium-type power storage element generally comprises a positive electrode, a negative electrode, a separator and an electrolytic solution, as the major constituent elements. The electrolytic solution used is an organic solvent dissolving a lithium salt (hereunder referred to as "nonaqueous electrolytic solution").

<Positive Electrode>

The positive electrode of this embodiment has a positive electrode power collector, and a positive electrode active material layer disposed on one or both sides of the positive electrode power collector.

The positive electrode of this embodiment preferably contains a lithium compound as the positive electrode precursor, prior to assembly of the power storage element. As mentioned below, when assembling the nonaqueous lithium power storage element of this embodiment, preferably the negative electrode is predoped with lithium ion. The pre-doping method is preferably application of a voltage between the positive electrode precursor and negative electrode, after the nonaqueous lithium power storage element has been assembled using the positive electrode precursor containing a lithium compound, the negative electrode, the separator and the nonaqueous electrolytic solution. The lithium compound is preferably contained in the positive electrode active material layer formed on the positive electrode power collector of the positive electrode precursor.

Throughout the present specification, "positive electrode precursor" is defined as the state of the positive electrode before lithium doping, and "positive electrode" is defined as the state of the positive electrode after lithium doping.

[Positive Electrode Active Material Layer]

For this embodiment, the positive electrode active material layer in the positive electrode comprises a positive electrode active material containing a carbon material. The positive electrode active material layer may also contain optional components such as a conductive filler, binder and dispersion stabilizer, as necessary, in addition to the positive electrode active material containing the carbon material.

The positive electrode active material layer of the positive electrode precursor preferably comprises a lithium compound other than the positive electrode active material.

—Positive Electrode Active Material—

The positive electrode active material contains a carbon material. The carbon material is preferably activated carbon, carbon nanotubes, a conductive polymer or a porous carbon material, and more preferably activated carbon. The positive electrode active material may employ a single type of carbon material alone, or it may be employing a mixture of two or more different carbon materials, and it may even contain a material other than a carbon material (for example, a complex oxide of lithium and a transition metal).

The content of the carbon material with respect to the total weight of the positive electrode active material is preferably 50 weight % or greater and more preferably 70 weight % or greater. From the viewpoint of obtaining a more satisfactory effect by combination with the other materials, the content of the carbon material may be, 100 weight %, for example, and preferably no greater than 90 weight % or no greater than 80 weight %, with respect to the total weight of the positive electrode active material.

When activated carbon is used as the positive electrode active material, there are no particular restrictions on the type of activated carbon or its starting material. However, preferably the pores of the activated carbon are optimally controlled to obtain both a high input/output characteristic and high energy density. Specifically, if $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, then:

(1) in order to obtain a high input/output characteristic, the activated carbon satisfying $0.3 < V_1 \leq 0.8$ and $0.5 \leq V_2 \leq 1.0$ and exhibiting a specific surface area of 1,500 m²/g to 3,000 m²/g as measured by the BET method (hereunder also referred to as "activated carbon 1") is preferred, and (2) in order to obtain high energy density, the activated carbon satisfying $0.8 < V_1 \leq 2.5$ and $0.8 \leq V_2 \leq 3.0$ and exhibiting a specific surface area of 2,300 m²/g to 4,000 m²/g as measured by the BET method (hereunder also referred to as "activated carbon 2"), is preferred.

The (1) activated carbon 1 and (2) activated carbon 2 will each be explained in order.

(Activated Carbon 1)

The mesopore volume $V_1$ of activated carbon 1 is preferably a value larger than 0.3 cc/g, from the viewpoint of a greater input/output characteristic when incorporated into a power storage element. On the other hand, the mesopore volume $V_1$ of activated carbon 1 is also preferably no greater than 0.8 cc/g from the viewpoint of suppressing reduction in the bulk density of the positive electrode. $V_1$ is more preferably 0.35 cc/g to 0.7 cc/g and even more preferably 0.4 cc/g to 0.6 cc/g.

The micropore volume $V_2$ of activated carbon 1 is preferably 0.5 cc/g or greater in order to increase the specific surface area of the activated carbon and increase capacitance. From the viewpoint of reducing the bulk of the activated carbon, increasing the density as an electrode and increasing the capacitance per unit volume, on the other hand, the micropore volume $V_2$ of the activated carbon 1 is preferably no greater than 1.0 cc/g. $V_2$ is more preferably 0.6 cc/g to 1.0 cc/g and even more preferably 0.8 cc/g to 1.0 cc/g.

The ratio of mesopore volume $V_1$ to micropore volume $V_2$ of the activated carbon 1 ($V_1/V_2$) is preferably in the range of $0.3 \leq V_1/V_2 \leq 0.9$. That is, $V_1/V_2$ is preferably 0.3 or greater from the viewpoint of increasing the ratio of the mesopore volume to the micropore volume to a degree allowing reduction in the input/output characteristic to be minimized while maintaining high capacitance. On the other hand, from the viewpoint of increasing the proportion of the micropore volume with respect to the mesopore volume, to an extent allowing reduction in capacitance to be minimized while maintaining a high input/output characteristic, $V_1/V_2$ is preferably no greater than 0.9, more preferably $0.4 \leq V_1/V_2 \leq 0.7$ and even more preferably $0.55 \leq V_1/V_2 \leq 0.7$.

The upper limit and lower limit for $V_1$, $V_2$ and $V_1/V_2$ for activated carbon 1 as specified above may be combined as desired.

From the viewpoint of increasing the input/output of the obtained power storage element, the mean pore size of activated carbon 1 is preferably 17 Å or greater, more preferably 18 Å or greater and even more preferably 20 Å or greater. From the viewpoint of increasing the capacitance, the mean pore size of activated carbon 1 is preferably no greater than 25 Å.

The BET specific surface area of activated carbon 1 is preferably 1,500 m²/g to 3,000 m²/g, and more preferably 1,500 m²/g to 2,500 m²/g. If the BET specific surface area is 1,500 m²/g or greater it will be easier to obtain satisfactory energy density, and if the BET specific surface area is 3,000 m²/g or lower there will be no need to add large amounts of a binder to maintain the strength of the electrode, and therefore the performance per volume of the electrode will be higher. The upper limit and lower limit for the BET specific surface area may be combined as desired.

The activated carbon 1 having such features can be obtained, for example, using the starting material and treatment method described below.

For this embodiment, the carbon source to be used as the starting material for activated carbon 1 is not particularly restricted. Examples include plant-based starting materials such as wood, wood dust, coconut shell, by-products of pulp production, bagasse and molasses; fossil-based starting materials such as peat, lignite, brown coal, bituminous coal, anthracite, petroleum distillation residue components, petroleum pitch, coke and coal tar; various synthetic resins such as a phenol resin, vinyl chloride resin, vinyl acetate resin, melamine resin, urea resin, resorcinol resin, celluloid, epoxy resin, polyurethane resin, polyester resin and polyamide resin; synthetic rubbers such as polybutylene, polybutadiene and polychloroprene; as well as synthetic wood or synthetic pulp materials, and carbides of the foregoing. From the viewpoint of suitability for mass-production and of cost, the starting materials preferred among these are plant-based starting materials such as coconut shell and wood dust, and their carbides, with coconut shell carbides being particularly preferred.

The system used for carbonization and activation to obtain the activated carbon 1 from these starting materials may be a known system such as, for example, a fixed bed system, moving bed system, fluidized bed system, slurry system or rotary kiln system.

The carbonization method for these starting materials is a method in which an inert gas such as nitrogen, carbon dioxide, helium, argon, xenon, neon, carbon monoxide or exhaust gas, or a mixed gas composed mainly of such inert gases with other gases, is used for calcination at about 400 to 700° C. and preferably 450 to 600° C., over a period of about 30 minutes to 10 hours.

The activation method for a carbide obtained by the carbonization method is preferably a gas activation method in which an activating gas such as water vapor, carbon dioxide or oxygen is used for calcination. A method using water vapor or carbon dioxide as the activating gas is preferred among these.

In this activation method, the activating gas is supplied at a rate of preferably 0.5 to 3.0 kg/h and more preferably 0.7 to 2.0 kg/h, while the carbide is raised to 800 to 1,000° C. for preferably 3 to 12 hours, more preferably 5 to 11 hours and even more preferably 6 to 10 hours, for activation.

The carbide may be subjected to a primary activation before activation treatment of the carbide. In the primary activation, a method of calcination the carbon material at a temperature of below 900° C. using an activating gas such as water vapor, carbon dioxide or oxygen for gas activation, is usually preferred.

By appropriate combinations for the calcination temperature and calcination time for the carbonization method, and the activating gas supply rate, temperature-elevating rate and maximum activation temperature in the activation method, it is possible to produce activated carbon 1 having the features described above.

The mean particle diameter of the activated carbon 1 is preferably 2 to 20 rm. If the mean particle diameter is 2 µm or greater, the capacitance per electrode volume will tend to be higher due to the higher density of the active material layer. If the mean particle diameter is 2 µm or greater, the durability will also be less likely to be reduced. A mean particle diameter of no larger than 20 µm, on the other hand, will tend to be more suitable for high-speed charge/discharge of the nonaqueous lithium power storage element. The upper limit for the mean particle diameter is preferably no larger than 15 µm, more preferably no larger than 10 µm, even more preferably no larger than 8 µm, especially preferably no larger than 6 µm and most preferably no larger than 5 µm, and the lower limit for the mean particle diameter is preferably 2.5 µm or larger and more preferably 3 µm or larger. The same effect as described above is exhibited even if the lower limit for the mean particle diameter is 1 µm or larger. The upper limit and lower limits for the mean particle diameter may be combined as desired.

(Activated Carbon 2)

The mesopore volume $V_1$ of activated carbon 2 is preferably a value larger than 0.8 cc/g, from the viewpoint of a greater input/output characteristic when incorporated into a power storage element. $V_1$ is preferably no greater than 2.5 cc/g from the viewpoint of suppressing reduction in the capacitance of the power storage element. $V_1$ is more preferably 1.0 cc/g to 2.0 cc/g and even more preferably 1.2 cc/g to 1.8 cc/g.

The micropore volume $V_2$ of activated carbon 2 is preferably a value larger than 0.8 cc/g in order to increase the specific surface area of the activated carbon and increase capacitance. From the viewpoint of reducing the bulk of the activated carbon, increasing the density as an electrode and increasing the capacitance per unit volume, $V_2$ is preferably no larger than 3.0 cc/g. $V_2$ is more preferably larger than 1.0 cc/g and no larger than 2.5 cc/g, and even more preferably 1.5 cc/g to 2.5 cc/g.

Activated carbon 2 having the mesopore volume and micropore volume described above has a higher BET specific surface area than the activated carbon used in conventional electrical double layer capacitors or lithium ion capacitors. The specific value of the BET specific surface area of activated carbon 2 is preferably 2,300 m$^2$/g to 4,000 m$^2$/g. The lower limit for the BET specific surface area is more preferably 3,000 m$^2$/g or greater and even more preferably 3,200 m$^2$/g or greater. The upper limit for the BET specific surface area is more preferably no greater than 3,800 m$^2$/g. If the BET specific surface area is 2,300 m$^2$/g or greater it will be easier to obtain satisfactory energy density, and if the BET specific surface area is 4,000 m$^2$/g or lower there will be no need to add large amounts of a binder to maintain the strength of the electrode, and therefore the performance per volume of the electrode will be higher.

The upper limits and lower limits of the preferable ranges respectively for $V_1$, $V_2$ and BET specific surface area for activated carbon 2 as specified above may be combined as desired.

Activated carbon 2 having such features can be obtained, for example, using the starting material and treatment method described below.

The carbon source used as the starting material for activated carbon 2 is not particularly restricted so long as it is a carbon source commonly used as a starting material for the activated carbon, and examples include plant-based starting materials such as wood, wood dust and coconut shell; petroleum-based starting materials such as petroleum pitch and coke; and various synthetic resins such as phenol resins, furan resins, vinyl chloride resins, vinyl acetate resins, melamine resins, urea resins and resorcinol resins. Of these starting materials, phenol resins and furan resins are especially preferred, being suitable for fabrication of activated carbon with a high specific surface area.

The system used for carbonization of these starting materials, or the heating method during activation treatment, may be a known system such as, for example, a fixed bed system, moving bed system, fluidized bed system, slurry system or rotary kiln system. The atmosphere during heating is an inert gas such as nitrogen, carbon dioxide, helium or argon, or a mixed gas composed mainly of such inert gases in admixture with other gases. The carbonization temperature is preferably 400 to 700° C., the lower limit being preferably 450° C. or higher and more preferably 500° C. or higher, and the upper limit being preferably no higher than 650° C., while the calcination time is preferably about 0.5 to 10 hours.

The activation method for the carbide after carbonization may be a gas activation method in which calcination is accomplished using an activating gas such as water vapor, carbon dioxide or oxygen, or an alkali metal activation method in which heat treatment is carried out after mixture with an alkali metal compound. An alkali metal activation method is preferred to prepare activated carbon with a high specific surface area.

In this activation method, a carbide and an alkali metal compound such as potassium hydroxide (KOH) or sodium hydroxide (NaOH) are mixed so that the weight ratio is 1:≥1 (the amount of the alkali metal compound being equal to or greater than the amount of the carbide), after which heat treatment is carried out in a range of preferably 600 to 900° C. and more preferably 650° C. to 850° C., for 0.5 to 5 hours under an inert gas atmosphere, and then the alkali metal compound is subjected to cleaning and removal with an acid or water, and drying is performed.

The weight ratio of the carbide and alkali metal compound (=carbide:alkali metal compound) is preferably 1:≥1, but since the mesopore volume increases as the amount of alkali metal compound increases, and the pore volume tends to increase drastically near a weight ratio of 1:3.5, the weight ratio of the carbide and alkali metal compound is preferably 1:≥3. Although the pore volume increases as the alkali metal compound increases, the weight ratio of the carbide and alkali metal compound is preferably 1: ≤5.5, considering the efficiency of subsequent treatment procedures such as washing.

In order to increase the micropore volume and not increase the mesopore volume, the amount of carbide may be increased during activation, and mixed with KOH. In order to increase both the micropore volume and mesopore volume, a large amount of KOH may be used. In order to increase mainly the mesopore volume, steam-activation is preferably carried out after alkaline activation treatment.

The mean particle diameter of the activated carbon 2 is preferably 2 μm to 20 μm. The upper limit for the mean particle diameter is preferably no larger than 15 μm, more preferably no larger than 10 μm, even more preferably no larger than 8 μm, especially preferably no larger than 6 μm and most preferably no larger than 5 μm, and the lower limit for the mean particle diameter is preferably 2.5 μm or larger and more preferably 3 μm or larger. The same effect as described above is exhibited even if the lower limit for the mean particle diameter is 1 μm or larger.

(Aspect Using Activated Carbon)

When activated carbon is to be used for the positive electrode active material, activated carbons 1 and 2 may each be a single type of activated carbon or a mixture of two or more different types of activated carbon, such that the mixture as a whole exhibits the characteristic values described above.

Either of activated carbon 1 or 2 may be selected for use, or both may be used in admixture.

The positive electrode active material may include materials other than activated carbons 1 and 2, such as activated carbon without the specified $V_1$ and/or $V_2$ values, or materials other than the activated carbon (such as complex oxides of lithium and transition metals). The content of activated carbon 1, or the content of activated carbon 2, or the total content of activated carbons 1 and 2, are preferably greater than 50 weight %, more preferably 70 weight % or greater, even more preferably 90 weight % or greater and most preferably 100 weight %, of the total positive electrode active material.

The content ratio of the positive electrode active material in the positive electrode active material layer is preferably 35 weight % to 95 weight % based on the total weight of the positive electrode active material layer in the positive electrode precursor. The lower limit for the content ratio of the positive electrode active material is more preferably 45 weight % or greater and even more preferably 55 weight % or greater. The upper limit for the content ratio of the positive electrode active material is more preferably no greater than 90 weight % and even more preferably no greater than 80 weight %. A suitable charge/discharge characteristic is exhibited within this range of the content ratio.

—Lithium Compound—

The positive electrode active material layer of the positive electrode precursor preferably comprises a lithium compound other than the positive electrode active material.

The lithium compound is not particularly restricted so long as it can decompose at the positive electrode in the lithium doping described below, releasing lithium ion, and preferred examples are one or more selected from the group consisting of lithium carbonate, lithium oxide, lithium hydroxide, lithium fluoride, lithium chloride, lithium bromide, lithium iodide, lithium nitride, lithium oxalate and lithium acetate. Preferred among these are lithium carbonate, lithium oxide and lithium hydroxide and lithium carbonate is more preferred from the viewpoint of being handleable in air and having low hygroscopicity. Such a lithium compound can decompose upon application of a voltage, to function as a dopant source for lithium doping in the negative electrode, while also forming pores in the positive electrode active material layer, having excellent electrolytic solution retentivity, and forming a positive electrode with excellent ionic conductivity.

The lithium compound is preferably in particulate form. The mean particle diameter of the lithium compound in the positive electrode precursor is 0.1 μm to 100 μm. The upper limit for the mean particle diameter of the lithium compound in the positive electrode precursor is more preferably no larger than 50 μm, even more preferably no larger than 20 μm and yet more preferably no larger than 10 μm. The lower limit for the mean particle diameter of the lithium compound in the positive electrode precursor is more preferably 0.3 μm or larger and even more preferably 0.5 μm or larger. If the mean particle diameter of the lithium compound is 0.1 μm or larger, the pores remaining after oxidation reaction of the lithium compound at the positive electrode will have sufficient volume to hold the electrolytic solution, and the high load charge/discharge characteristic will therefore be increased. If the mean particle diameter of the lithium compound is no larger than 100 μm, the surface area of the lithium compound will not be excessively reduced, thus allowing the oxidation reaction rate of the lithium compound to be ensured. The upper limit and lower limit ranges for the mean particle diameter of the lithium compound may be combined as desired.

Various methods may be used for micronization of the lithium compound. For example, a pulverizer such as a ball mill, bead mill, ring mill, jet mill or rod mill may be used.

The content ratio of the lithium compound in the positive electrode active material layer of the positive electrode precursor is preferably 5 weight % to 60 weight % and more preferably 10 weight % to 50 weight %, based on the total weight of the positive electrode active material layer of the positive electrode precursor. A content ratio within this range will allow suitable function to be exhibited as a dopant source into the negative electrode, while also allowing a suitable degree of porosity to be imparted to the positive electrode, which together will allow a power storage element with excellent high load charge/discharge efficiency to be provided. The upper limit and lower limit of the ranges for the content ratio may be combined as desired.

—Optional Components of Positive Electrode Active Material Layer—

If necessary, the positive electrode active material layer of this embodiment may also contain optional components such as a conductive filler, binder and dispersion stabilizer, in addition to the positive electrode active material and lithium compound.

The conductive filler is not particularly restricted, and for example, acetylene black, Ketchen black, vapor grown carbon fibers, graphite, carbon nanotubes, and mixtures thereof, may be used. The amount of conductive filler used is preferably greater than 0 parts by weight and no greater than 30 parts by weight, with respect to 100 parts by weight of the positive electrode active material. It is more preferably 0.01 part by weight to 20 parts by weight and even more preferably 1 part by weight to 15 parts by weight. If the amount of conductive filler used is greater than 30 parts by weight, the energy density per volume of the positive electrode active material layer will be lower due to the reduced content ratio of the positive electrode active material in the positive electrode active material layer, and therefore it is not desirable.

The binder is not particularly restricted, and for example, PVdF (polyvinylidene fluoride), PTFE (polytetrafluoroethylene), polyimide, latex, styrene-butadiene copolymer, fluorine rubber or an acrylic copolymer may be used. The amount of binder used is preferably 1 part by weight to 30 parts by weight, more preferably 3 parts by weight to 27 parts by weight and even more preferably 5 parts by weight to 25 parts by weight, with respect to 100 parts by weight of the positive electrode active material. If the amount of binder used is 1 part by weight or greater, adequate electrode strength will be exhibited. If the amount of binder used is no greater than 30 parts by weight, on the other hand, a high input/output characteristic will be exhibited without inhibiting movement or diffusion of ions in and from the positive electrode active material.

The dispersion stabilizer is not particularly restricted, and for example, PVP (polyvinylpyrrolidone), PVA (polyvinyl alcohol) or cellulose derivatives may be used. The amount of dispersion stabilizer used is preferably greater than 0 parts by weight or 0.1 part by weight or greater, and no greater than 10 parts by weight, with respect to 100 parts by weight of the positive electrode active material. If the amount of dispersion stabilizer used is no greater than 10 parts by weight, on the other hand, a high input/output characteristic will be exhibited without inhibiting movement or diffusion of ions in and from the positive electrode active material.

[Positive Electrode Power Collector]

The material composing the positive electrode power collector of this embodiment is not particularly restricted so long as it is a material with high electron conductivity, and resistance to degradation by elution into the electrolytic solution or by reaction with the electrolyte or ion, but a metal foil is preferred. A metal foil used as the positive electrode power collector is most preferably an aluminum foil.

The positive electrode power collector may be a metal foil without ruggedness or through-holes, or it may be a metal foil having ruggedness formed by embossing, chemical etching, electrolytic deposition or blasting, or it may be a metal foil having through-holes, such as an expanded metal, punching metal or etching foil.

Among these, the positive electrode power collector of this embodiment is preferably a metal foil without through-holes. Having no through-holes is cheaper in terms of production cost and facilitates thin-film formation, and can thus contribute to higher energy density, while also lowering the power collector resistance, allowing a high input/output characteristic to be obtained.

The thickness of the positive electrode power collector is not particularly restricted so long as it allows the shape and strength of the positive electrode to be maintained, but 1 to 100 μm, for example, is preferred.

[Production of Positive Electrode Precursor]

According to this embodiment, the positive electrode precursor that is to be the positive electrode of the nonaqueous lithium power storage element can be produced by a known production technique for electrodes for lithium ion batteries or electrical double layer capacitors. For example, the positive electrode active material and lithium compound, as well as the other optional components that are used as necessary, may be dispersed and dissolved in water or an organic solvent to prepare a slurry-like coating solution, and the coating solution coated onto one or both sides of a positive electrode power collector to form a coating film, which is dried to obtain a positive electrode precursor. The obtained positive electrode precursor may also be pressed to adjust the thickness or bulk density of the positive electrode active material layer. An alternative method may also be used, in which the positive electrode active material and lithium compound, as well as the other optional components used as necessary, are mixed in a dry state without using a solvent, and the obtained mixture is subjected to press molding to form a positive electrode sheet, after which a conductive adhesive (also known as "conductive paste") is used for attachment to the positive electrode power collector.

The coating solution of the positive electrode precursor may also be prepared by dry blending all or a portion of each of the starting materials containing the positive electrode active material, and then adding water or an organic solvent, and/or adding a liquid or slurry-like substance comprising a binder or dispersion stabilizer dissolved or dispersed in them. The coating solution may also be prepared by adding various starting powders containing the positive electrode active material, to a liquid or slurry-like substance comprising a binder or dispersion stabilizer dissolved or dispersed in water or an organic solvent. The method of dry blending may be, for example, premixing in which a ball mill or the like is used to premix the positive electrode active material and lithium compound, and a conductive filler if necessary, and the lithium compound with low conductivity is coated with the conductive filler. By pre-mixing, the lithium compound will tend to decompose by the positive electrode precursor during the lithium doping described below. When water is used as the solvent for the coating solution, the coating solution may be rendered alkaline by addition of the lithium compound, and therefore a pH modifier may be added as necessary.

The method of dispersing the coating solution of the positive electrode precursor is not particularly restricted, and a dispersing machine such as a homodisperser or multiscrew disperser, planetary mixer, thin-film rotating-type high-speed mixer or the like, may be suitably used. In order to obtain a coating solution in a satisfactorily dispersed state, it is preferred for the dispersion to be at a peripheral velocity of 1 m/s to 50 m/s. It is preferred if the peripheral velocity is 1 m/s or greater, because this will allow each material to satisfactorily dissolve or disperse. It is also preferred if the peripheral velocity is no greater than 50 m/s, because each material will be unlikely to be broken down by heat or shear force during dispersion, and reaggregation will be unlikely to take place.

The degree of dispersion of the coating solution is preferably to a granularity of 0.1 μm to 100 μm, as measured with a fineness gauge. The upper limit for the degree of dispersion is more preferably to a granularity of no greater than 80 μm, and more preferably to a granularity of no greater than 50 μm. It is not preferred if the granularity is less than 0.1 μm, because the size will be less than the particle diameter of each starting powder containing the positive electrode active material, meaning that the material will have been crushed during preparation of the coating solution. If the granularity is no greater than 100 μm, there will be less clogging during discharge of the coating solution and less formation of streaks in the coating film, allowing more stable coating.

The viscosity ($\eta b$) of the coating solution of the positive electrode precursor is preferably 1,000 mPa·s to 20,000 mPa·s, more preferably 1,500 mPa·s to 10,000 mPa·s and even more preferably 1,700 mPa·s to 5,000 mPa·s. If the viscosity ($\eta b$) is 1,000 mPa·s or higher, running of liquid during formation of the coating film will be minimized, and the coating film width and thickness can be satisfactorily controlled. If the viscosity (ηb) is no higher than 20,000 mPa·s, there will be less pressure loss in the flow channel of the coating solution when a coating machine is used, allowing stable coating to be carried out, and allowing control to less than the prescribed coating film thickness.

The TI value (thixotropy index value) of the coating solution is preferably 1.1 or greater, more preferably 1.2 or greater and even more preferably 1.5 or greater. If the TI value is 1.1 or greater, the coating film width and thickness can be satisfactorily controlled.

The method of forming a coating film of the positive electrode precursor is not particularly restricted, and a coating machine such as a die coater, comma coater, knife coater or gravure coating machine may be suitably used. The coating film may be formed by monolayer coating or by multilayer coating. In the case of multilayer coating, the coating solution compositions may be adjusted so that the lithium compound content differs within each layer of the coating film. The coating speed is preferably 0.1 m/min to 100 m/min, more preferably 0.5 m/min to 70 m/min and even more preferably 1 m/min to 50 m/min. If the coating speed is 0.1 m/min or greater, stable coating will be possible. If the coating speed is 100 m/min or lower, the coating precision can be adequately ensured.

The drying method for the coating film of the positive electrode precursor is not particularly restricted, and a drying method such as hot air drying or infrared ray (IR) drying may be suitably employed. Drying of the coating film may be drying at a single temperature, or it may be drying while varying the temperature in different stages. Several drying methods may also be used in combination for drying of the coating film. The drying temperature is preferably 25° C. to 200° C., more preferably 40° C. to 180° C. and even more preferably 50° C. to 160° C. If the drying temperature is 25° C. or higher, it will be possible to adequately volatilize off the solvent in the coating film. If the drying temperature is no higher than 200° C., it will be possible to reduce cracking of the coating film by rapid volatilization of the solvent or maldistribution of the binder by migration, and oxidation of the positive electrode power collector or positive electrode active material layer.

The method of pressing the positive electrode precursor is not particularly restricted, and a pressing machine such as a hydraulic press or vacuum pressing machine may be suitably used. The thickness, bulk density and electrode strength of the positive electrode active material layer can be adjusted by the pressing pressure, the gap, and the surface temperature of the pressed portion, as described below.

The pressing pressure is preferably 0.5 kN/cm to 20 kN/cm, more preferably 1 kN/cm to 10 kN/cm and even more preferably 2 kN/cm to 7 kN/cm. If the pressing pressure is 0.5 kN/cm or greater, it will be possible to adequately increase the electrode strength. If the pressing pressure is no greater than 20 kN/cm, distortion or wrinkles will not be produced in the positive electrode precursor, and adjustment can be made to the desired layer thickness and bulk density for the positive electrode active material.

A person skilled in the art can set the gap between the press rolls to a desired value depending on the thickness of the dried positive electrode precursor, so that the desired thickness and bulk density of the positive electrode active material layer is obtained. A person skilled in the art can also set the pressing speed as desired, so as to minimize distortion and wrinkling in the positive electrode precursor.

The surface temperature of the pressed portion may be room temperature, or the pressed portion may be heated instead, if necessary. In the case of heating, the lower limit for the surface temperature of the pressed portion is preferably at least the melting point of the binder −60° C., more preferably at least the melting point −45° C., and even more preferably at least the melting point −30° C. The upper limit for the surface temperature of the pressed portion in the case of heating is also preferably no higher than the melting point of the binder used +50° C., more preferably no higher than the melting point +30° C., and even more preferably no higher than the melting point +20° C. For example, when PVdF (polyvinylidene fluoride: melting point=150° C.) is used as the binder, the surface temperature of the pressed portion is preferably between 90° C. and 200° C., more preferably between 105° C. and 180° C. and even more preferably between 120° C. and 170° C. When a styrene-butadiene copolymer (melting point=100° C.) is used as the binder, the surface temperature of the pressed portion is preferably between 40° C. and 150° C., more preferably between 55° C. and 130° C. and even more preferably between 70° C. and 120° C.

The melting point of the binder can be determined by the endothermic peak position in DSC (Differential Scanning Calorimetry). For example, using a "DSC7" differential scanning calorimeter by Perkin-Elmer, 10 mg of sample resin is set in the measuring cell and the temperature is increased from 30° C. to 250° C. at a temperature-elevating rate of 10° C./min, in a nitrogen gas atmosphere, the melting point being the endothermic peak temperature during the temperature elevation.

Pressing may also be carried out multiple times while varying the conditions including the pressing pressure, gap, speed, and pressed portion surface temperature.

The thickness of the positive electrode active material layer is preferably 20 μm to 200 μm for each side of the positive electrode power collector, more preferably 25 μm to 100 μm for each side, and even more preferably 30 μm to 80 μm. If the thickness of the positive electrode active material layer is 20 μm or greater, sufficient charge/discharge capacity can be exhibited. If the thickness of the positive electrode active material layer is no greater than 200 μm, low ion diffusion resistance can be maintained in the electrode. It will thus be possible to obtain an adequate input/output characteristic and to reduce the cell volume, thereby increasing the energy density. The upper limit and lower limit ranges for the thickness of the positive electrode active material layer may be combined as desired. Throughout the present specification, the thickness of the positive electrode active material layer, when the collector has through-holes or ruggedness, is the mean value of the thickness for each side at the sections of the collector without through-holes or ruggedness.

[Positive Electrode]

The bulk density of the positive electrode active material layer at the positive electrode after the lithium doping described below is preferably 0.30 g/cm$^3$ or greater, and more preferably 0.35 g/cm$^3$ to 1.3 g/cm$^3$. If the bulk density of the positive electrode active material layer is 0.30 g/cm$^3$ or greater, it will be possible to exhibit high energy density and to reduce the size of the power storage element. If the bulk density is no higher than 1.3 g/cm$^3$, diffusion of the electrolytic solution in the pores in the positive electrode active material layer will be adequate, and a high input/output characteristic will be obtained.

—Pore Distribution of Positive Electrode Active Material Layer (Mercury Intrusion)—

According to this embodiment, when the pore distribution of the positive electrode active material layer at the positive electrode after the lithium doping described below has been measured by mercury intrusion, the pore distribution curve for the relationship between the pore size and the log differential pore volume has at least one peak with a peak value of 1.0 mL/g to 5.0 mL/g for the log differential pore volume in the pore diameter range of 0.1 µm to 50 µm. Preferably, it has at least two peaks with a peak value of 0.5 mL/g to 5.0 mL/g for the log differential pore volume in the pore diameter range of 0.1 µm to 50 µm.

The upper limit for the pore size range in which the pore distribution curve of the positive electrode active material layer at the positive electrode has at least one peak with a peak value of 1.0 mL/g to 5.0 mL/g for the log differential pore volume, or at least two peaks with a peak value of 0.5 mL/g to 5.0 mL/g for the log differential pore volume, is preferably no larger than 30 µm, more preferably no larger than 20 µm and most preferably no larger than 10 µm, and the lower limit for the pore size range is preferably 0.2 µm or larger and more preferably 0.3 µm or larger. The upper limit and lower limit for the pore size range may be combined as desired.

Having a peak, in this case, means having a peak with the peak top position in that pore size range. According to this embodiment, there is no particular restriction on the source of the peaks in the pore distribution curve of the positive electrode active material layer in the positive electrode, but preferably it has a peak derived from gaps between the materials forming the positive electrode active material layer, such as the positive electrode active material and the conductive filler, and a peak derived from, for example, pores remaining after the lithium compound in the positive electrode active material layer of the positive electrode precursor has undergone oxidative decomposition in the lithium doping step. These peaks may also have overlapping pore sizes at the peak top positions, and may be observed as a single peak.

If the pore size range in which the pore distribution curve of the positive electrode active material layer at the positive electrode has at least one peak with a peak value of 1.0 mL/g to 5.0 mL/g for the log differential pore volume, or at least two peaks with a peak value of 0.5 mL/g to 5.0 mL/g for the log differential pore volume, is 0.1 µm or larger, then satisfactory pores will be formed that can hold the electrolytic solution inside the positive electrode, the lithium ion conductivity will be high, and a high input/output characteristic will be exhibited when it is incorporated into a nonaqueous lithium power storage element, while during repeated charge/discharge, and especially high load charge/discharge, ions will be consistently supplied from the electrolytic solution in the pores formed in the viscinity of the positive electrode active material, so that the high load charge/discharge cycle characteristic will be excellent.

On the other hand, if the pore size range in which the pore distribution curve of the positive electrode active material layer at the positive electrode has at least one peak with a peak value of 1.0 mL/g to 5.0 mL/g for the log differential pore volume, or at least two peaks with a peak value of 0.5 mL/g to 5.0 mL/g for the log differential pore volume, is no larger than 50 µm, then high energy density will be obtained when it is incorporated into a nonaqueous lithium power storage element.

Moreover, although the pore distribution curve of the positive electrode active material layer at the positive electrode preferably has at least two peaks with a peak value of 0.5 mL/g to 5.0 mL/g for the log differential pore volume, in a pore diameter range of 0.1 µm to 50 µm, as mentioned above, more preferably the lower limit for the peak values of the two or more peaks in the pore distribution curve of the positive electrode active material layer at the positive electrode, is 0.8 mL/g or greater for the log differential pore volume, and even more preferably it is 1.0 mL/g or greater for the log differential pore volume. If the peak value is 0.5 mL/g or greater for the log differential pore volume, pores capable of holding the electrolytic solution will be in sufficient number, and a high input/output characteristic and excellent high load charge/discharge cycle characteristic will be obtained when it is incorporated into a nonaqueous lithium power storage element. On the other hand, if the peak value is no greater than 5.0 mL/g for the log differential pore volume, high energy density will be obtained when it is incorporated into a nonaqueous lithium power storage element.

For the pore distribution curve of the positive electrode active material layer at the positive electrode according to this embodiment, Vp is 0.7 mL/g to 3.0 mL/g, where Vp is the total cumulative pore volume in the pore diameter range of 0.1 µm to 50 µm. Vp is more preferably 0.75 mL/g to 2.5 mL/g, and even more preferably 0.8 mL/g to 2.0 mL/g. While not particularly restrictive, Vp may be considered to represent the total volume of gaps between the materials forming the positive electrode active material layer, such as the positive electrode active material and the conductive filler, and pores remaining after the lithium compound in the positive electrode active material layer of the positive electrode precursor has undergone oxidative decomposition in the lithium doping step, for example. If Vp is 0.7 mL/g or greater, the lithium ion diffusibility will be adequately ensured and a high input/output characteristic and an excellent high load charge/discharge cycle characteristic will be obtained. On the other hand, if Vp is no greater than 3.0 mL/g, bonding between the constituent materials in the positive electrode will be ensured and sufficiently high positive electrode strength will be obtained, while high energy density will also be obtained.

—Voids in Positive Electrode Active Material Layer—

According to this embodiment, the proportion $A_1$ of voids with an area of 0.2 µm$^2$ to 250 µm$^2$, as determined by analysis of an image of a cross-section of the positive electrode active material layer at the positive electrode, measured by a scanning electron microscope (SEM), is preferably 10% to 60% per unit area of the positive electrode active material layer. The lower limit for the proportion $A_1$ of voids with an area of 0.2 µm$^2$ to 250 µm$^2$ is more preferably 12% or higher and even more preferably 14% or higher, and the upper limit for $A_1$ is more preferably 55% or lower and even more preferably 50% or lower. Throughout the present specification, "cross-section" means a cross-section in the thickness direction of the positive electrode active material layer (the perpendicular direction with respect to the positive electrode active material layer).

In this embodiment, the voids with an area of 0.2 µm$^2$ to 250 µm$^2$ in the positive electrode active material layer preferably include pores remaining after the lithium compound in the positive electrode active material layer of the positive electrode precursor has undergone oxidative decomposition by lithium doping, for example. The voids may include voids arising from the gaps between the constituent materials of the positive electrode active material layer, such as the positive electrode active material or conductive filler.

While it is not our intention to be constrained by theory, it is possible that when the proportion $A_1$ of voids with an area of 0.2 µm$^2$ to 250 µm$^2$ in the positive electrode active material layer is 10% or more per unit area of the positive electrode active material layer, satisfactory pores are formed that can hold the electrolytic solution inside the positive electrode and the lithium ion conductivity is also high, and therefore a high input/output characteristic will be exhibited when it is incorporated into a nonaqueous lithium power storage element, while during repeated charge/discharge, especially under high load charge/discharge, ions will be consistently supplied from the electrolytic solution in the pores formed in the viscinity of the positive electrode active material, so that the high load charge/discharge cycle characteristic will be excellent. If $A_1$ is no greater than 60% per unit area of the positive electrode active material layer, then high energy density will be obtained when it is incorporated into a nonaqueous lithium power storage element.

According to this embodiment, preferably $1.0 \leq B_1/4C_1 \leq 3.5$, more preferably $1.03 \leq B_1/4C_1 \leq 3.35$, even more preferably $1.06 \leq B_1/4C_1 \leq 3.2$ and yet more preferably $1.1 \leq B_1/4C_1 \leq 3.0$, where $B_1$ is the total circumferential length of voids with an area of 0.2 μm² to 250 μm² in a cross-sectional SEM image of the positive electrode active material layer, and $C_1$ is the total of the square roots of the areas of voids with an area of 0.2 μm² to 250 μm².

The value of $B_1/4C_1$ is an index representing a shape in which the cross-section of the void is nearly an approximately quadrilateral shape. That is, when the value of $B_1/4C_1$ is large, it presumably reflects that the voids have irregular shapes due to large gaps between the materials composing the positive electrode active material layer, and/or linkage between those gaps and the pores remaining after decomposition of the lithium compound. When the value of $B_1/4C_1$ is small, it presumably reflects that the voids have cross-sections with nearly approximately quadrilateral shapes due to small gaps between the materials composing the positive electrode active material layer, and/or numerous pores remaining after decomposition of the lithium compound.

If $B_1/4C_1$ for the positive electrode active material layer is 1.0 or greater, satisfactory pores will be formed that can hold the electrolytic solution, and a high input/output characteristic and an excellent high load charge/discharge cycle characteristic will be obtained when it is incorporated into a nonaqueous lithium power storage element. If $B_1/4C_1$ is no greater than 3.5, a high input/output characteristic and also high energy density will be obtained when it is incorporated into a nonaqueous lithium power storage element.

(Method for Discriminating Voids)

According to this embodiment, when SEM measurement is performed on a cross-section of the positive electrode active material layer in the thickness direction, a void is a section where the cross-section of the positive electrode active material layer constituent materials, such as active material particles, conductive filler or binder, is not observed.

The method of forming the positive electrode cross-section is not particularly restricted, and for example, it may employ BIB (Broad Ion Beam) processing in which an Ar beam is irradiated as an ion beam from above the positive electrode, and a smooth cross-section is created along the edges of a masking shield set directly above the sample. Any cross-section-forming device using an ion beam, even if not an Ar beam, can carry out similar cross-sectional processing, or precision machinery polishing or cutting with an ultramicrotome may be applied instead. Methods using ion beams are preferred as methods that produce low damage in the samples.

The method of carrying out SEM measurement of a positive electrode cross-section formed as described above is not particularly restricted, and for example, a cross-sectional SEM image of the positive electrode active material layer measured at an observational magnification of 1000-4000× may be obtained. During the measurement, it is preferred to minimize detection of secondary electrons generated from the deeper structure between the active materials of the cross-section, to aid in recognizing the areas between the active material as voids, and the method for doing so is not particularly restricted and may be one using a Lower detector, for example. This will help to facilitate image analysis such as binarization processing.

The discrimination method for the obtained cross-sectional SEM image of the positive electrode active material layer is not particularly restricted so long as the positive electrode active material layer constituent material can be discriminated from the voids, and for example, the mean value and standard deviation σ for the luminance of all the pixels may be determined, ignoring the pixels of maximum luminance and minimum luminance, binarization may be performed to extract the luminance range of mean value ±1σ, and the regions extracted by binarization may be considered to be cross-sections of the particles of positive electrode active material layer constituent material, while the other regions may be discriminated as voids.

(Analysis of Voids)

According to the invention, the regions where only the positive electrode active material layer appears in the cross-sectional SEM image of the positive electrode are cut out, the total area $Sp_{A10}$ of voids with an area of 0.2 μm² to 250 μm² with respect to the total area $Sl_{A10}$ of the positive electrode active material layer is determined, and $A_{10}$ is calculated from $Sp_{A10}/Sl_{A10}$. Measurement is performed at 5 or more locations, varying the visual field of the cross-section of the positive electrode active material layer, and the mean value for $A_{10}$ is recorded as the proportion $A_1$ of voids with an area of 0.2 μm² to 250 μm² per unit area of the positive electrode active material layer.

Similarly, the circumferential length $b_{10}$ and area $sp_{C10}$ are determined for all of the voids with an area of 0.2 μm² to 250 μm² obtained in the cross-sectional SEM image of the positive electrode active material layer, and using the square root of the area $sp_{C10}^{1/2}$ as $c_{10}$, $B_{10}/4C_{10}$ is calculated from the total circumferential length $B_{10}$ ($=\Sigma b_{10}$) and the total of the square roots of the areas $C_{10}$ ($=\Sigma c_{10}$) for all of the voids. Measurement is performed at five or more locations, varying the visual field of the cross-section of the positive electrode active material layer, and the mean value for each $B_{10}/4C_{10}$ is recorded as $B_1/4C_1$.

—Pore Distribution of Positive Electrode (Gas Adsorption Method)—

According to this embodiment, $0.3 \leq A \leq 5.0$, $0.5 \leq B \leq 10$, $0.05 \leq C \leq 3.0$ and $0.4 \leq A/B \leq 1.5$, where A (μL/cm²) is the mesopore volume per unit area due to pores with diameters of 20 Å to 500 Å, as calculated by the BJH method in nitrogen gas adsorption measurement for each side of the positive electrode, after lithium doping as described below, B (μL/cm²) is the micropore volume per unit area due to pores with diameters of smaller than 20 Å, as calculated by the MP method in the nitrogen gas adsorption measurement, and C (μL/cm²) is the ultramicropore volume per unit area due to pores with a diameter of smaller than 7 Å, as calculated by the DFT method in carbon dioxide gas adsorption measurement.

According to this embodiment, as mentioned above, the positive electrode active material layer of the positive electrode comprises not only the active material, but also a lithium compound and optional components such as a binder, and a coating film is sometimes formed by lithium ion doping or aging on the surface of the positive electrode incorporated in a nonaqueous lithium power storage element. Therefore, the pore distribution of the positive electrode measured by the gas adsorption method (that is, the mesopore volume, micropore volume, ultramicro volume and BET specific surface area) are obtained as values that include the pore intercalating effects of the binder or coating film, in the pore distribution of the positive electrode active material.

The upper limit for the mesopore volume A per unit area of the positive electrode is more preferably no greater than 4.0, even more preferably no greater than 3.5 and yet more preferably no greater than 3.0, and the lower limit for the mesopore volume A per unit area is more preferably 0.4 or greater and even more preferably 0.5 or greater. The upper limit and lower limit for the mesopore volume may be combined as desired. If the mesopore volume A per unit area is 0.3 or greater it will be possible to ensure diffusibility of lithium ions, and therefore a high input/output characteristic and an excellent high load charge/discharge cycle characteristic will be exhibited when it is incorporated into a nonaqueous lithium power storage element. If the mesopore volume A per unit area is no greater than 5.0, high energy density will be obtained.

The upper limit for the micropore volume B per unit area of the positive electrode is more preferably no greater than 8.0, even more preferably no greater than 6.5 and yet more preferably no greater than 5.0, and the lower limit for the micropore volume B per unit area is more preferably 0.6 or greater, even more preferably 0.7 or greater and yet more preferably 0.8 or greater. The upper limit and lower limit for the micropore volume may be combined as desired. If the micropore volume B per unit area is 0.5 or greater, the number of ions that can be adsorbed and desorbed in the pores of the positive electrode active material will increase, and high energy density will be obtained when incorporated into a nonaqueous lithium power storage element. If the micropore volume B per unit area is no greater than 10, the bulk density of the positive electrode will be high and high energy density will be obtained.

The upper limit for the ratio A/B of the mesopore volume A and micropore volume B per unit area of the positive electrode is more preferably no higher than 1.35, even more preferably no higher than 1.2 and yet more preferably no higher than 1.1, and the lower limit is more preferably 0.45 or higher and even more preferably 0.5 or higher. The upper limit and lower limit for A/B may be combined as desired. If A/B is 0.4 or higher, the proportion of the volume of mesopores with large pore sizes will be high, and therefore a high input/output characteristic will be exhibited when incorporated into a nonaqueous lithium power storage element. If A/B is 1.5 or lower, it will be possible to ensure high capacitance, and both high energy density and a high input/output characteristic will be possible.

The upper limit for the ultramicropore volume C per unit area of the positive electrode is more preferably no greater than 2.5, even more preferably no greater than 2.0 and yet more preferably no greater than 1.5, and the lower limit for the ultramicropore volume C per unit area is more preferably 0.1 or greater, even more preferably 0.15 or greater and yet more preferably 0.2 or greater. The upper limit and lower limit for the ultramicropore volume may be combined as desired. If the ultramicropore volume C per unit area is 0.05 or greater, high energy density will be obtained. If the ultramicropore volume C per unit area is no greater than 3.0, then it will be possible to reduce to a minimum the amount of residual solvent or adsorption water that is difficult to remove even with vacuum drying during assembly of the nonaqueous lithium power storage element described below, thereby resulting in a high-temperature storage characteristic and an excellent high load charge/discharge cycle characteristic.

According to this embodiment, preferably $1 \leq D \leq 20$, where D ($m^2/cm^2$) is the specific surface area per unit area as calculated by the BET method, with nitrogen gas adsorption measurement on each side of the positive electrode. The upper limit for the specific surface area D per unit area of the positive electrode is more preferably no greater than 18, even more preferably no greater than 15 and yet more preferably no greater than 12, and the lower limit for the specific surface area D per unit area is more preferably 1.3 or greater, even more preferably 1.6 or greater and yet more preferably 1.8 or greater. The upper limit and lower limit for the specific surface area may be combined as desired. If the specific surface area D per unit area is 1 or greater, the number of ions that can be adsorbed and desorbed in the pores of the positive electrode active material will increase, and high energy density will be obtained when incorporated into a nonaqueous lithium power storage element. If the specific surface area D per unit area is no greater than 20, the bulk density of the positive electrode will be high and high energy density will be obtained.

—Mean Size of Voids, and Mean Particle Diameter of Lithium Compound and Positive Electrode Active Material—

The positive electrode of this embodiment preferably contains a lithium compound that has not decomposed by lithium doping. When the positive electrode contains a lithium compound in the positive electrode active material layer, preferably voids are present surrounding the lithium compound. The voids surrounding the lithium compound represent pores formed by decomposition of the lithium compound by the lithium doping.

Preferably, $X_1 > Y_1$ and $0.1 \mu m \leq Y_1 \leq 10 \mu m$, where $X_1$ is the mean size of the voids in the positive electrode active material layer, and $Y_1$ is the mean particle diameter of the lithium compound. Preferably, $2 \mu m \leq Z_1 \leq 20 \mu m$ and $Y_1 < Z_1$, where $Z_1$ is the mean particle diameter of the positive electrode active material. More preferably, $0.5 \mu m \leq Y_1 \leq 5 \mu m$ and $3 \mu m \leq Z_1 \leq 10 \mu m$. If $Y_1$ is 0.1 pin or greater, the high load charge/discharge cycle characteristic will be improved due to adsorption of fluorine ions generated by high load charge/discharge cycling. If $Y_1$ is no greater than 10 μm, the reaction area with the fluorine ions generated by high load charge/discharge cycling will increase, thus allowing the fluorine ions to be adsorbed more efficiently. If $Z_1$ is 2 μm or greater, it will be possible to ensure electron conductivity between the positive electrode active materials. If $Z_1$ is no greater than 20 pin, the reaction area with the electrolyte ion will increase, allowing a high input/output characteristic to be obtained. If $X_1 > Y_1$, satisfactory pores will be formed that can hold the electrolytic solution, and a high input/output characteristic and an excellent high load charge/discharge cycle characteristic will be obtained when it is incorporated into a nonaqueous lithium power storage element. If $Y_1 < Z_1$, then the lithium compound will fill in the gaps formed between the positive electrode active materials, thus allowing the electron conductivity between the positive electrode active materials to be ensured while increasing the energy density.

The method of measuring $X_1$, $Y_1$ and $Z_1$ is not particularly restricted, and they can be calculated from an image of the positive electrode cross-section by SEM and an image by scanning electron microscopy with energy dispersive X-ray spectroscopy (SEM-EDX). The method of forming the positive electrode cross-section may employ, for example, BIB (Broad Ion Beam) processing in which an Ar beam is irradiated from above the positive electrode, and a smooth cross-section is created along the edges of a masking shield set directly above the sample. When the positive electrode comprises lithium carbonate, the carbonate ion distribution can be determined by measurement with Raman imaging of the positive electrode cross-section.

(Method of Discriminating Lithium Compound and Positive Electrode Active Material)

The lithium compound and positive electrode active material can be discriminated by oxygen mapping with an SEM-EDX image of the positive electrode cross-section measured at an observational magnification of 1000-4000×. For the SEM-EDX image measuring conditions, preferably the luminance and contrast are adjusted so that the brightness has no pixel reaching the maximum luminance, and the mean value of the brightness is a luminance in the range of 40% to 60%. In the obtained oxygen mapping, particles containing a bright portion equal to 50% or more of the area thereof when binarized based on the mean value of brightness with respect to the resulting oxygen mapping are considered to constitute the lithium compound.

(Method of Calculating $X_1$, $Y_1$ and $Z_1$)

$X_1$, $Y_1$ and $Z_1$ can be determined by analysis of an image obtained from positive electrode cross-sectional SEM-EDX, measured in the same visual field as the positive electrode cross-sectional SEM mentioned above. The cross-sectional area S is determined for all of the voids or particles X, Y and Z observed in the cross-sectional SEM image, X being the voids discriminated in the SEM image of the positive electrode cross-section, Y being lithium compound particles, and Z being the other particles which are particles of the positive electrode active material, and the diameter d of the voids or particles is determined by calculation using the following formula (1) (with π as the circular constant).

$$d = 2 \times (S/\pi)^{1/2} \quad (1)$$

Each obtained diameter d for the voids or particles is used to determine the volume-average void size or particle diameter $X_0$, $Y_0$ and $Z_0$, by the following formula (2).

$$X_0(Y_0, Z_0) = \Sigma[4/3\pi \times (d/2)]^3 \times d] / \Sigma[4/3\pi \times (d/2)]^3] \quad (2)$$

Measurement is performed at five or more locations while varying the visual field of the positive electrode cross-section, and the mean values for $X_0$, $Y_0$ and $Z_0$ are used as the mean size $X_1$ and mean particle diameters $Y_1$ and $Z_1$.

The amount of lithium compound in the positive electrode is preferably 1 weight % to 50 weight %, more preferably 1.4 weight % to 45 weight % and even more preferably 2 weight % to 20 weight %, based on the total weight of the positive electrode active material layer in the positive electrode. If the amount of lithium compound is 1 weight % or greater, a sufficient amount of lithium compound will be present to adsorb fluorine ions formed in the high load charge/discharge cycling, and therefore the high load charge/discharge cycle characteristic will be improved. If the amount of lithium compound is no greater than 50 weight %, it will be possible to increase the energy density of the nonaqueous lithium power storage element.

The lithium compound in the positive electrode gradually decomposes and gasifies as it is exposed to a high potential of about 4.0 V or greater, and the generated gas inhibits diffusion of ions in the electrolytic solution, thereby causing increased resistance. Consequently, preferably a coating film formed from the fluorine-containing compound is formed on the surface of the lithium compound, to inhibit reaction of the lithium compound.

The method of forming a coating film of the fluorine-containing compound is not particularly restricted, and for example, it may be a method in which a fluorine-containing compound that decomposes at a high potential is added to the electrolytic solution and a high voltage above the decomposition potential of the fluorine-containing compound is applied to the nonaqueous lithium power storage element, or a method in which it is subjected to a temperature above the decomposition temperature.

The coverage factor of the fluorinated compound covering the lithium compound surface, i.e. the area overlap ratio $A_2$ of fluorine mapping with respect to oxygen mapping in an SEM-EDX image of the positive electrode surface, is preferably 40% to 99%, more preferably 45% to 95% and even more preferably 50% to 90%. If $A_2$ is 40% or higher it will be possible to reduce decomposition of the lithium compound. If $A_2$ is 99% or lower, it will be possible to maintain basicity near the positive electrode and the high load charge/discharge cycle characteristic will therefore be excellent.

As the method of measuring the coverage factor, it is determined by calculating the area overlap ratio of fluorine mapping with respect to oxygen mapping that has been binarized based on the mean value of brightness, in element mapping obtained by SEM-EDX of the positive electrode surface.

The SEM-EDX element mapping measuring conditions are not particularly restricted, and are preferably a pixel count in the range of 128×128 pixels to 512×512 pixels, and adjustment of the luminance and contrast so that the brightness has no pixel reaching the maximum luminance, and the mean value of the brightness is a luminance in the range of 40% to 60%.

In element mapping obtained by SEM-EDX of the BIB-processed positive electrode cross-section, the area overlap ratio $A_3$ of fluorine mapping with respect to oxygen mapping that has been binarized based on the mean value of brightness is preferably 10% to 60%, more preferably 15% to 56% and even more preferably 20% to 54%. If $A_3$ is 10% or higher it will be possible to suppress decomposition of the lithium compound. If $A_3$ is 60% or lower, there will be a non-fluorinated state up to the interior of the lithium compound, and it will therefore be possible to maintain basicity near the positive electrode, and the high load charge/discharge cycle characteristic will be excellent.

<Negative Electrode>

The negative electrode of this embodiment has a negative electrode power collector, and a negative electrode active material layer disposed on one or both sides of the negative electrode power collector.

According to this embodiment, in the negative electrode active material layer, the volume of pores of 20 Å to 350 Å (hereunder also referred to as "$V_a$") as calculated by QSDFT (Quenching Solid Density Functional Theory) is preferably 50% to 100% of the volume of pores of 0 Å to 350 Å (hereunder also referred to as "$V_b$") as calculated by QSDFT. The lower limit for the ratio of $V_a$ to $V_b$ in the negative electrode active material layer is more preferably 65% or greater, even more preferably 75% or greater, yet more preferably 80% or greater and most preferably 85% or greater. The upper limit for the ratio of $V_a$ to $V_b$ in the negative electrode active material layer is more preferably no greater than 99%.

For this embodiment, in the negative electrode active material layer, the volume of pores of 20 Å to 250 Å

(hereunder also referred to as "$V_c$") as calculated by QSDFT is preferably 40% to 90% of the volume of pores of 0 Å to 350 Å $V_b$ as calculated by QSDFT. The ratio of $V_c$ to $V_b$ in the negative electrode active material layer is more preferably 50% to 88%, even more preferably 55% to 86% and yet more preferably 60% to 85%.

For this embodiment, in the negative electrode active material layer, the specific surface area of 20 Å to 350 Å (hereunder also referred to as "$S_a$") as calculated by QSDFT is preferably 20% to 100% of the specific surface area of 0 Å to 350 Å (hereunder also referred to as "$S_b$") as calculated by QSDFT. The ratio of $S_a$ to $S_b$ in the negative electrode active material layer is more preferably 30% to 99%, even more preferably 40% to 98% and yet more preferably 45% to 97%.

For this embodiment, the mean pore size of the negative electrode active material layer is preferably 2 nm to 20 nm. The mean pore size of the negative electrode active material layer is more preferably 3 nm to 18 nm, even more preferably 3.5 nm to 16 nm and yet more preferably 4 nm to 15 nm.

A nonaqueous lithium power storage element using the negative electrode of this embodiment has a high input/output characteristic and a high load charge/discharge cycle characteristic, by adjustment of the pore volume, specific surface area and their distribution in the negative electrode active material layer to the ranges specified above. While the principle is not completely understood, and it is not our intention to be limited by theory, the following is conjectured. The diameter of lithium ion solvated in the nonaqueous electrolytic solution is estimated to be about 9 Å to 12 Å. Therefore, among the pores of the negative electrode active material layer, ion diffusion of the solvated lithium ion is rapid in the pores that are larger than the solvated lithium ion (for example, 20 Å and larger). For high current charge/discharge, therefore, solvated lithium ion that diffuses in these pores is thought to be intercalated and released at the surface of the negative electrode active material layer where the pores are formed, thereby supporting charge/discharge. By adjusting the proportion of the pore volume or the specific surface area of 20 Å or greater, as calculated by QSDFT, to a high range for the negative electrode active material layer, it is possible for the nonaqueous lithium power storage element employing it to exhibit a high input/output characteristic. Furthermore, with a negative electrode active material layer having such a pore volume and a specific surface area, and distribution thereof, the ion diffusion of solvated lithium ion is rapid, such that maldistribution of lithium ion in the nonaqueous electrolytic solution can be minimized even during high load charge/discharge cycling, and a nonaqueous lithium power storage element employing it can exhibit a high load charge/discharge cycle characteristic.

For the reason explained above, if the ratio of $V_a$ to $V_b$ in the negative electrode active material layer is 50% or higher, a nonaqueous lithium power storage element employing it can exhibit a high input/output characteristic and high load charge/discharge cycle characteristic.

Also for the reason explained above, if the ratio of $V_c$ to $V_b$ in the negative electrode active material layer is 40% or higher, a nonaqueous lithium power storage element employing it can exhibit a high input/output characteristic and high load charge/discharge cycle characteristic. On the other hand, if the ratio of $V_c$ to $V_b$ in the negative electrode active material layer is no higher than 90%, the bulk density of the negative electrode active material layer can be sufficiently high, and therefore a nonaqueous lithium power storage element employing it can exhibit high energy density.

For the reason explained above, if the ratio of $S_a$ to $S_b$ in the negative electrode active material layer is 20% or higher, a nonaqueous lithium power storage element employing it can exhibit a high input/output characteristic and high load charge/discharge cycle characteristic.

Also for the reason explained above, if the mean pore size of the negative electrode active material layer is 2 nm or larger, a nonaqueous lithium power storage element employing it can exhibit a high input/output characteristic and high load charge/discharge cycle characteristic. On the other hand, if the mean pore size of the negative electrode active material layer is no larger than 20 nm, the bulk density of the negative electrode active material layer can be sufficiently high, and therefore a nonaqueous lithium power storage element employing it can exhibit high energy density.

The method for adjusting the pore volume, the specific surface area and distribution thereof in the negative electrode active material layer of this embodiment ($V_a$, $V_b$, $V_c$, $S_a$, $S_b$ and the mean pore size) to the ranges specified above is not particularly restricted, but they may be adjusted by the types of negative electrode active material or conductive filler and binder in the negative electrode active material layer, and by their weight ratio in the negative electrode active material layer. For example, the pore volume, specific surface area and distribution thereof can be adjusted by using a negative electrode active material or conductive filler wherein the volume of pores of 20 Å to 350 Å as calculated by QSDFT is at least 30% of the volume of pores of 0 Å to 350 Å as calculated by QSDFT, and by using a binder having a linear structure such as PVdF (polyvinylidene fluoride), that easily fills pores of 20 Å and smaller. Furthermore, the pore volume, specific surface area and distribution thereof can be adjusted by the coverage of the coating film or accumulation due to reductive decomposition of the nonaqueous electrolytic solution in the negative electrode active material layer, which is adjusted by the composition of the nonaqueous electrolytic solution and the production conditions for the nonaqueous lithium power storage element.

The pore volume, specific surface area and distribution thereof in the negative electrode active material layer ($V_a$, $V_b$, $V_c$, $S_a$, $S_b$ and the mean pore size) according to this embodiment can be calculated by the following method.

The sample used for measurement may be the negative electrode before it is incorporated into the nonaqueous lithium power storage element (hereunder also referred to as "negative electrode before use"), or it may be the negative electrode incorporated in the nonaqueous lithium power storage element (hereunder also referred to as "negative electrode after use").

When the negative electrode incorporated in the nonaqueous lithium power storage element is to be used as the measuring sample, the following method, for example, is preferably used as pretreatment of the measuring sample.

First, the nonaqueous lithium power storage element is disassembled under an inert atmosphere such as argon, and the negative electrode is removed. The removed negative electrode is immersed in a linear carbonate (such as methyl ethyl carbonate or dimethyl carbonate), the nonaqueous electrolytic solution and lithium salt are removed and air-drying is carried out. Next, the following method 1), 2) or 3) is preferably used.

1) The obtained negative electrode is immersed in a mixed solvent comprising methanol and isopropanol to inactivate the lithium ion intercalated in the negative electrode active material, and air-drying is carried out. Next, vacuum drying or the like is used to remove the linear carbonate and organic solvent in the obtained negative electrode, to obtain a measuring sample.

2) Using the obtained negative electrode as the working electrode and metal lithium as the counter electrode and reference electrode, they are immersed in the nonaqueous electrolytic solution under an inert atmosphere such as argon, to fabricate an electrochemical cell. A charger-discharger is used for adjustment of the obtained electrochemical cell, so that the negative electrode potential (vs. Li/Li$^+$) is in the range of 1.5 V to 3.5 V. Next, the negative electrode is removed from the electrochemical cell under an inert atmosphere such as argon and immersed in a linear carbonate to remove the nonaqueous electrolytic solution and lithium salt, and air-drying is carried out. Next, vacuum drying or the like is used to remove the linear carbonate in the obtained negative electrode, to obtain a measuring sample.

3) The obtained negative electrode may be used directly as the measuring sample.

Using the obtained measuring sample, the adsorption/desorption isotherm is measured with nitrogen or argon as the adsorbate. The obtained adsorption/desorption isotherm is analyzed by QSDFT (Quenching Solid Density Functional Theory) to calculate $V_a$, $V_b$, $V_c$, $S_a$ and $S_b$ for the negative electrode active material layer. The specific method of calculation used is the one advocated by Ravikovitch P. I. (Langmuir, 22, 11171(2006)). This method was developed in order to allow analysis by non-local density function theory (NLDFT) (the NLDFT method), which assumes uniform pore surfaces, to be applied to non-uniform pore surfaces as well. $V_a$ is calculated by extracting the volume of pores of 20 Å to 350 Å from the cumulative pore distribution of the negative electrode active material layer, obtained by the aforementioned QSDFT analysis. Similarly, $V_b$, $V_c$, $S_a$ and $S_b$ are each calculated by using the cumulative pore distribution or cumulative surface area distribution of the negative electrode active material layer, obtained by the aforementioned QSDFT analysis, and extracting the pore volume or the specific surface area in each corresponding range.

Also, the mean pore size of the negative electrode active material layer is calculated, using the isotherm on the adsorption side obtained as described above, by first calculating the BET specific surface area by the multipoint BET method or single point BET method, and then dividing the total pore volume calculated from the measurement, by the BET specific surface area.

[Negative Electrode Active Material Layer]

The negative electrode active material layer contains a negative electrode active material that can intercalate and release lithium ions. The negative electrode active material layer may also contain optional components such as a conductive filler, binder and dispersion stabilizer, as necessary, in addition to the negative electrode active material.

—Negative Electrode Active Material—

The negative electrode active material used may be a substance capable of intercalating and releasing lithium ions. Examples of negative electrode active materials include, specifically, carbon materials, titanates, silicon, silicon oxides, silicon alloys, silicon compounds, tin and tin compounds. The content of the carbon material with respect to the total weight of the negative electrode active material is preferably 50 weight % or greater and more preferably 70 weight % or greater, or even 100 weight %. From the viewpoint of obtaining a satisfactory effect by combined use with other materials, the content of the carbon material is preferably no greater than 90 weight %, and may be no greater than 80 weight %, for example. The upper limit and lower limit ranges for the carbon material content may be combined as desired.

The negative electrode active material is preferably doped with lithium ion. The lithium ion doped in the negative electrode active material, as described throughout the present specification, includes three major forms.

The first form is lithium ion that is intercalated in advance in the negative electrode active material, as a design value, before fabrication of the nonaqueous lithium power storage element.

The second form is lithium ion intercalated in the negative electrode active material during fabrication and shipping of the nonaqueous lithium power storage element.

The third form is lithium ion intercalated in the negative electrode active material after the nonaqueous lithium power storage element has been used as a device.

By doping the negative electrode active material with lithium ion it is possible to satisfactorily control the capacitance and operating voltage of the obtained nonaqueous lithium power storage element.

Examples of carbon materials include non-graphitizable carbon materials; easily graphitizable carbon materials; carbon black; carbon nanoparticles; activated carbon; artificial graphite; natural graphite; graphitized mesophase carbon microspheres; graphite whiskers; amorphous carbonaceous materials such as polyacene-based materials; carbonaceous materials obtained by heat treatment of carbonaceous material precursors; thermal decomposition products of furfuryl alcohol resins or novolac resins; fullerenes; carbon nanohorns; and carbon materials that are composites of the foregoing. Such carbonaceous material precursors are not particularly restricted so long as they form carbonaceous materials by heat treatment, and examples include petroleum-based pitch, coal-based pitch, mesocarbon microbeads, coke and synthetic resins (for example, phenol resins).

From the viewpoint of lowering the resistance of the negative electrode, a composite carbon material is preferred, which is obtained by heat treating one or more of the aforementioned carbon materials (hereunder referred to as "base material") in the copresence of the carbonaceous material precursor, to form a composite of the base material with the carbonaceous material derived from the carbonaceous material precursor. The carbonaceous material precursor to be used in the composite carbon material is not particularly restricted, but it is preferably petroleum-based pitch or coal-based pitch. Before the heat treatment, the base material and the carbonaceous material precursor may be mixed at a temperature higher than the melting point of the carbonaceous material precursor. The heat treatment temperature may be a temperature such that the component generated by volatilization or thermal decomposition of the carbonaceous material precursor used is a carbonaceous material, and it is preferably 400° C. to 2500° C., more preferably 500° C. to 2000° C. and even more preferably 550° C. to 1500° C. The atmosphere for heat treatment is not particularly restricted, but is preferably a non-oxidizing atmosphere.

Preferred examples for the composite carbon material are composite carbon materials 1 and 2 described below. Either of these may be selected for use, or both may be used in combination.

(Composite Carbon Material 1)

Composite carbon material 1 is a composite carbon material using at least one type of carbonaceous material with a BET specific surface area of 100 m$^2$/g to 3000 m$^2$/g as the base material. The base material is not particularly restricted, and activated carbon, carbon black, molded porous carbon, high specific surface area graphite or carbon nanoparticles may be suitably used.

The BET specific surface area of the composite carbon material 1 is preferably 100 m$^2$/g to 1,500 m$^2$/g, more preferably 150 m$^2$/g to 1,100 m$^2$/g, and even more preferably 180 m$^2$/g to 550 m$^2$/g. If the BET specific surface area is 100 m$^2$/g or greater, it will be possible to suitably maintain the pores and the lithium ion diffusion will be satisfactory, and therefore a high input/output characteristic can be exhibited. If the BET specific surface area is no greater than 1,500 m$^2$/g, the lithium ion charge/discharge efficiency will be increased, and therefore the cycle durability will not be impaired. The upper limit and lower limit for the BET specific surface area of composite carbon material 1 may be combined as desired.

The weight ratio of the carbonaceous material with respect to the base material in composite carbon material 1 is preferably 10 weight % to 200 weight %, more preferably 12 weight % to 180 weight %, even more preferably 15 weight % to 160 weight % and most preferably 18 weight % to 150 weight %. If the weight ratio of the carbonaceous material is 10 weight % or greater, it will be possible to suitably fill the micropores of the base material with the carbonaceous material, and the lithium ion charge/discharge efficiency will be increased, therefore allowing satisfactory cycle durability to be exhibited. If the weight ratio of the carbonaceous material is no greater than 200 weight %, it will be possible to suitably maintain the pores and the lithium ion diffusion will be satisfactory, and therefore a high input/output characteristic can be exhibited.

The doping amount of lithium ion per unit weight of composite carbon material 1 is preferably 530 mAh/g to 2,500 mAh/g, more preferably 620 mAh/g to 2,100 mAh/g, even more preferably 760 mAh/g to 1,700 mAh/g and most preferably 840 mAh/g to 1,500 mAh/g. The upper limit and lower limit for the numerical range of the lithium ion doping amount may be combined as desired.

Doping lithium ion in the negative electrode will lower the potential of the negative electrode. Thus, when a negative electrode containing composite carbon material 1 doped with lithium ion is combined with a positive electrode, the voltage of the nonaqueous lithium power storage element is increased and the utilizable capacity of the positive electrode is increased. Therefore, the capacitance and energy density of the obtained nonaqueous lithium power storage element increases.

If the doping amount is 530 mAh/g or greater, lithium ion will be satisfactorily doped even at irreversible sites where lithium ion cannot be released after once being inserted, and it will also be possible to reduce the amount of composite carbon material 1 per amount of lithium. Consequently, the thickness of the negative electrode can be reduced and high energy density can be obtained. As the doping amount increases, the negative electrode potential decreases and the input/output characteristic, energy density and durability increase. If the doping amount is no greater than 2,500 mAh/g, there will be a lower risk of side-effects such as deposition of lithium metal.

Composite carbon material 1a using activated carbon as the base material will now be described as a preferred example of composite carbon material 1.

Composite carbon material 1a preferably satisfies 0.010≤$V_{m1}$≤0.300, 0.001≤$V_{m2}$≤0.650, where $V_{m1}$ (cc/g) is the mesopore volume due to pores with diameters of 20 Å to 500 Å, as calculated by the BJH method, and $V_{m2}$ (cc/g) is the micropore volume due to pores with diameters of smaller than 20 Å as calculated by the MP method.

The mesopore volume $V_{m1}$ more preferably satisfies 0.010≤$V_{m1}$≤0.225 and even more preferably 0.010≤$V_{m1}$≤0.200. The micropore volume $V_{m2}$ more preferably satisfies 0.001≤$V_{m2}$≤0.200, even more preferably 0.001≤$V_{m2}$≤0.150 and most preferably 0.001≤$V_{m2}$≤0.100.

If the mesopore volume $V_{m1}$ is no greater than 0.300 cc/g it will be possible to increase the BET specific surface area and increase the lithium ion doping amount, while also increasing the bulk density of the negative electrode. As a result, the negative electrode can be made into a thin-film. If the micropore volume $V_{m2}$ is no greater than 0.650 cc/g, it will be possible to maintain high charge/discharge efficiency for lithium ions. If the mesopore volume $V_{m1}$ and micropore volume $V_{m2}$ are equal to or greater than these lower limits (0.010≤$V_{m1}$, 0.001≤$V_{m2}$), then a high input/output characteristic can be obtained.

The BET specific surface area of composite carbon material 1a is preferably 100 m$^2$/g to 1,500 m$^2$/g, more preferably 150 m$^2$/g to 1,100 m$^2$/g, and even more preferably 180 m$^2$/g to 550 m$^2$/g. If the BET specific surface area is 100 m$^2$/g or greater, it will be possible to suitably maintain the pores and the lithium ion diffusion will be satisfactory, a high input/output characteristic can be exhibited, and the lithium ion doping amount can be increased, thus allowing the negative electrode to be made into a thin-film. If the BET specific surface area is no greater than 1,500 m$^2$/g, the lithium ion charge/discharge efficiency will be increased, and therefore the cycle durability will be less likely to be impaired.

The mean pore size of composite carbon material 1a is preferably 20 Å or larger, more preferably 25 Å or larger and even more preferably 30 Å or larger, from the viewpoint of obtaining a high input/output characteristic. The mean pore size of composite carbon material 1a is preferably no larger than 65 Å and more preferably no larger than 60 Å, from the viewpoint of obtaining high energy density.

The mean particle diameter of composite carbon material 1a is preferably 1 µm to 10 µm, the lower limit being more preferably 2 µm or larger and even more preferably 2.5 µm or larger, and the upper limit being more preferably no larger than 6 µm and even more preferably no larger than 4 µm. If the mean particle diameter is 1 µm to 10 µm, then satisfactory durability will be maintained.

For composite carbon material 1a, the atomic ratio of hydrogen/carbon atom (H/C) is preferably 0.05 to 0.35 and more preferably 0.05 to 0.15. If H/C is 0.35 or smaller, the structure of the carbonaceous material adhering to the activated carbon surface (typically a polycyclic aromatic conjugated structure) will satisfactorily develop and the capacitance (energy density) and charge/discharge efficiency will increase. If H/C is 0.05 or larger, there will be no excessive carbonization, and therefore satisfactory energy density will be obtained. The H/C ratio is measured with an elemental analyzer.

Composite carbon material 1a has an amorphous structure derived from the activated carbon of the base material, but it simultaneously also has a crystal structure derived mainly from the coated carbonaceous material. Based on wide-angle X-ray diffraction, in the composite carbon material 1a, preferably the plane spacing $d_{002}$ of the (002) plane is 3.60 Å to 4.00 Å, and the crystallite size Lc in the c-axis direction obtained from the half-width of the peak is 8.0 Å to 20.0 Å, and more preferably $d_{002}$ is 3.60 Å to 3.75 Å, and the crystallite size Lc in the c-axis direction obtained from the halfwidth of the peak is 11.0 Å to 16.0 Å.

The activated carbon used as the base material for composite carbon material 1a is not particularly restricted so long as the obtained composite carbon material 1a exhibits the desired properties. For example, it is possible to use a commercially available product obtained from a petroleum-based, coal-based, plant-based or polymer-based starting material as the activated carbon. In particular, it is preferred to use the activated carbon powder having a mean particle diameter of 1 μm to 15 μm and more preferably 2 μm to 10 μm.

In order to obtain composite carbon material 1a having the pore distribution range according to this embodiment, the pore distribution of the activated carbon used as the base material is important.

For the activated carbon, preferably $0.050 \leq V_1 \leq 0.500$, $0.005 \leq V_2 \leq 1.000$ and $0.2 \leq V_1/V_2 \leq 20.0$, where $V_1$ (cc/g) is the mesopore volume due to pores with diameters of 20 Å to 500 Å, as calculated by the BJH method, and $V_2$ (cc/g) is the micropore volume due to pores with diameters of smaller than 20 Å as calculated by the MP method.

The mesopore volume $V_1$ of the activated carbon used as the base material of composite carbon material 1a more preferably satisfies $0.050 \leq V_1 \leq 0.350$, and even more preferably $0.100 \leq V_1 \leq 0.300$. The micropore volume $V_2$ of the activated carbon more preferably satisfies $0.005 \leq V_2 \leq 0.850$, and even more preferably $0.100 \leq V_2 \leq 0.800$. The mesopore volume/micropore volume ratio preferably satisfies $0.22 \leq V_1/V_2 \leq 15.0$, and more preferably $0.25 \leq V_1/V_2 \leq 10.0$. When the mesopore volume $V_1$ of the activated carbon is 0.500 or smaller and the micropore volume $V_2$ is 1.000 or smaller, coating a suitable amount of carbonaceous material will be sufficient for obtaining a pore structure for the composite carbon material 1a according to this embodiment, and it will therefore tend to be easier to control the pore structure. When the mesopore volume $V_1$ of the activated carbon is 0.050 or greater and the micropore volume $V_2$ is 0.005 or greater, a pore structure can be easily obtained if $V_1/V_2$ is 0.2 or greater and $V_1/V_2$ is no greater than 20.0.

A carbonaceous material precursor to be used as a starting material for composite carbon material 1a is a solid, liquid or organic material capable of dissolving in a solvent that allows a carbonaceous material to deposit onto activated carbon by heat treatment. The carbonaceous material precursor may be, for example, pitch, mesocarbon microbeads, coke or a synthetic resin, examples of which include a furfuryl alcohol resin and phenol resin. Among such carbonaceous material precursors, inexpensive pitch is preferred in terms of production cost. Pitch is largely classified as petroleum-based pitch or coal-based pitch. Examples of petroleum-based pitch include crude oil distillation residue, fluid catalytic cracking residue (decant oil and the like), bottom oil from thermal crackers, and ethylene tar obtained during naphtha cracking.

When pitch is used, composite carbon material 1a can be obtained by heat treatment of the pitch in the co-presence of activated carbon, causing thermal reaction of the volatile components and thermal decomposition components of the pitch on the surface of the activated carbon to coat the carbonaceous material onto the activated carbon. Typically, coating of the volatile components or thermal decomposition components of the pitch inside the pores of the activated carbon proceeds at a temperature of about 200 to 500° C., and the coated components undergo reaction to carbonaceous material at 400° C. or higher. The peak temperature during heat treatment (maximum ultimate temperature) is appropriately set depending on the properties of the composite carbon material 1a to be obtained, the thermal reaction pattern and the thermal reaction atmosphere, and is preferably 400° C. or higher, more preferably 450° C. to 1,000° C. and even more preferably about 500 to 800° C. The time for which the peak temperature is maintained during heat treatment is preferably 30 minutes to 10 hours, more preferably 1 hour to 7 hours and even more preferably 2 hours to 5 hours. For example, with heat treatment at a peak temperature of about 500 to 800° C. over a period of 2 hours to 5 hours, the carbonaceous material that has been coated onto the activated carbon surface is potentially converted to polycyclic aromatic hydrocarbons.

The softening point of the pitch is preferably 30° C. to 250° C. and more preferably 60° C. to 130° C. Pitch with a softening point of 30° C. or higher will allow precise charging to be carried out without impairing the handleability. Pitch with a softening point of no higher than 250° C. comprises a relatively large number of low molecular compounds, making it possible to accomplish coating even to the relatively fine pores in the activated carbon.

The specific method for producing composite carbon material 1a may be, for example, a method in which activated carbon is heat treated in an inert atmosphere containing a hydrocarbon gas volatilized from the carbonaceous material precursor, and coated with the carbonaceous material in a gas phase. It may also be a method in which the activated carbon and carbonaceous material precursor are pre-mixed and then heat treated, or the carbonaceous material precursor dissolved in a solvent is coated onto the activated carbon and dried, and then heat treated.

The weight ratio of the carbonaceous material with respect to the activated carbon in composite carbon material 1a is preferably 10 weight % to 100 weight % and more preferably 15 weight % to 80 weight %. If the weight ratio of the carbonaceous material is 10 weight % or greater, it will be possible to suitably fill the micropores of the activated carbon with the carbonaceous material, and the charge/discharge efficiency of lithium ions will be increased, thus resulting in lower loss of cycle durability. If the weight ratio of the carbonaceous material is no greater than 100 weight %, the pores in the composite carbon material 1a will be suitably conserved and a high specific surface area will be maintained. The lithium ion doping amount can therefore be increased, and as a result, high input/output density and high durability can be maintained even if the negative electrode is a thin-film.

(Composite Carbon Material 2)

Composite carbon material 2 is a composite carbon material using at least one type of carbon material with a BET specific surface area of 0.5 m²/g to 80 m²/g as the base material. The base material is not particularly restricted, and natural graphite, artificial graphite, low crystalline graphite, hard carbon, soft carbon, carbon black or the like may be suitably used.

The BET specific surface area of composite carbon material 2 is preferably 1 m²/g to 50 m²/g, more preferably 1.5 m²/g to 40 m²/g and even more preferably 2 m²/g to 25 m²/g. If the BET specific surface area is 1 m²/g or greater, it will be possible to adequately ensure reaction sites with the lithium ions, and to thus exhibit a high input/output characteristic. If the BET specific surface area is no greater than 50 m²/g, the lithium ion charge/discharge efficiency will be increased and decomposition reaction of the nonaqueous electrolytic solution during charge/discharge will be inhibited, thus allowing high cycle durability to be exhibited. The upper limit and lower limit ranges for the BET specific surface area of composite carbon material 2 may be combined as desired.

The mean particle diameter of composite carbon material 2 is preferably 1 μm to 10 μm, more preferably 2 μm to 8 μm and even more preferably 3 μm to 6 μm. If the mean particle diameter is 1 μm or larger it will be possible to increase the lithium ion charge/discharge efficiency, and to thus exhibit high cycle durability. If the mean particle diameter is no larger than 10 μm, the reaction area between composite carbon material 2 and the nonaqueous electrolytic solution will increase, allowing a high input/output characteristic to be exhibited.

The weight ratio of the carbonaceous material with respect to the base material in composite carbon material 2 is preferably 1 weight % to 30 weight %, more preferably 1.2 weight % to 25 weight % and even more preferably 1.5 weight % to 20 weight %. If the weight ratio of the carbonaceous material is 1 weight % or greater, the number of reaction sites with lithium ion can be adequately increased by the carbonaceous material, and desolvation of the lithium ion will be facilitated, thus allowing a high input/output characteristic to be exhibited. If the weight ratio of the carbonaceous material is no greater than 30 weight %, it will be possible to satisfactorily ensure solid diffusion of lithium ions between the carbonaceous material and the base material, thus allowing a high input/output characteristic to be exhibited, and the lithium ion charge/discharge efficiency can also be increased, thus allowing high cycle durability to be exhibited.

The lithium ion doping amount per unit weight of composite carbon material 2 is preferably 50 mAh/g to 700 mAh/g, more preferably 70 mAh/g to 650 mAh/g, even more preferably 90 mAh/g to 600 mAh/g and most preferably 100 mAh/g to 550 mAh/g. The upper limit and lower limit for the lithium ion doping amount of composite carbon material 2 may be combined as desired.

Doping lithium ion in the negative electrode will lower the potential of the negative electrode. Thus, when a negative electrode containing composite carbon material 2 doped with lithium ion is combined with a positive electrode, the voltage of the nonaqueous lithium power storage element is increased and the utilizable capacity of the positive electrode is increased. Therefore, the capacitance and energy density of the obtained nonaqueous lithium power storage element increases.

If the doping amount is 50 mAh/g or greater, lithium ion will be satisfactorily doped even at irreversible sites where lithium ion cannot be released after once being inserted, and therefore high energy density can be obtained. As the doping amount increases, the negative electrode potential decreases and the input/output characteristic, energy density and durability increase. If the doping amount is no greater than 700 mAh/g, there will be a lower risk of side-effects such as deposition of lithium metal.

Composite carbon material 2a using a graphite material as the base material will now be explained as a preferred example of composite carbon material 2.

The mean particle diameter of composite carbon material 2a is preferably 1 μm to 10 μm, more preferably 2 μm to 8 μm and even more preferably 3 μm to 6 rm. If the mean particle diameter is 1 μm or larger it will be possible to increase the lithium ion charge/discharge efficiency, and to thus exhibit high cycle durability. If the mean particle diameter is no larger than 10 μm, the reaction area between composite carbon material 2a and the nonaqueous electrolytic solution will increase, allowing a high input/output characteristic to be exhibited.

The BET specific surface area of composite carbon material 2a is preferably 1 $m^2/g$ to 50 $m^2/g$, more preferably 1 $m^2/g$ to 20 $m^2/g$ and even more preferably 1 $m^2/g$ to 15 $m^2/g$. If the BET specific surface area is 1 $m^2/g$ or greater, it will be possible to adequately ensure reaction sites with the lithium ions, and to thus exhibit a high input/output characteristic. If the BET specific surface area is no greater than 50 $m^2/g$, the lithium ion charge-discharge efficiency will be increased and decomposition reaction of the nonaqueous electrolytic solution during charge/discharge will be inhibited, thus allowing high cycle durability to be exhibited.

The graphite material to be used as the base material is not particularly restricted, so long as the obtained composite carbon material 2a exhibits the desired properties. Examples of graphite materials that may be used include artificial graphite, natural graphite, graphitized mesophase carbon microspheres and graphite whiskers. The mean particle diameter of the graphite material is preferably 1 μm to 10 μm and more preferably 2 μm to 8 μm.

A carbonaceous material precursor to be used as a starting material for composite carbon material 2a is a solid, liquid or organic material capable of dissolving in a solvent that allows the carbonaceous material to be deposited with a graphite material by heat treatment. The carbonaceous material precursor may be, for example, pitch, mesocarbon microbeads, coke or a synthetic resin, examples of which include a furfuryl alcohol resin and phenol resin. Among such carbonaceous material precursors, inexpensive pitch is preferred in terms of production cost. Pitch is largely classified as petroleum-based pitch or coal-based pitch. Examples of petroleum-based pitch include crude oil distillation residue, fluid catalytic cracking residue (decant oil and the like), bottom oil from thermal crackers, and ethylene tar obtained during naphtha cracking.

The weight ratio of the carbonaceous material with respect to the graphite material in composite carbon material 2a is preferably 1 weight % to 20 weight %, more preferably 1.2 weight % to 15 weight %, even more preferably 1.5 weight % to 10 weight % and most preferably 2 weight % to 5 weight %. If the weight ratio of the carbonaceous material is 1 weight % or greater, the number of reaction sites with lithium ion can be adequately increased by the carbonaceous material, and desolvation of the lithium ion will be facilitated, thus allowing a high input/output characteristic to be exhibited. If the weight ratio of the carbonaceous material is no greater than 20 weight %, it will be possible to satisfactorily ensure in-solid diffusion of lithium ions between the carbonaceous material and the graphite material, thus allowing a high input/output characteristic to be exhibited, and the lithium ion charge/discharge efficiency can also be increased, thus allowing high cycle durability to be exhibited.

—Optional Components of Negative Electrode Active Material Layer—

The negative electrode active material layer of this embodiment may also contain optional components such as a conductive filler, binder and dispersion stabilizer, as necessary, in addition to the negative electrode active material.

The type of conductive filler is not particularly restricted, and examples include acetylene black, Ketchen black and vapor grown carbon fibers. The amount of conductive filler used is preferably greater than 0 parts by weight and no greater than 30 parts by weight, more preferably 0.01 part by weight to 20 parts by weight and even more preferably 0.1 part by weight to 15 parts by weight, with respect to 100 parts by weight of the negative electrode active material.

The binder is not particularly restricted, and for example, PVdF (polyvinylidene fluoride), PTFE (polytetrafluoroethylene), polyimide, latex, styrene-butadiene copolymer, fluorine-contained rubber or an acrylic copolymer may be used. The amount of binder used is preferably 1 part by weight to 30 parts by weight, more preferably 2 parts by weight to 27 parts by weight and even more preferably 3 parts by weight to 25 parts by weight, with respect to 100 parts by weight of the negative electrode active material. If the amount of binder used is 1 part by weight or greater, adequate electrode strength will be exhibited. If the amount of binder used is no greater than 30 parts by weight, on the other hand, a high input/output characteristic will be exhibited without inhibiting movement of lithium ions into the negative electrode active material.

The dispersion stabilizer is not particularly restricted, and for example, PVP (polyvinylpyrrolidone), PVA (polyvinyl alcohol) or cellulose derivatives may be used. The amount of dispersion stabilizer used is preferably greater than 0 parts by weight or 0.1 part by weight or greater, and no greater than 10 parts by weight, with respect to 100 parts by weight of the negative electrode active material. If the amount of dispersion stabilizer used is no greater than 10 parts by weight, a high input/output characteristic will be exhibited without inhibiting movement of lithium ions into the negative electrode active material.

[Negative Electrode Power Collector]

The material composing the negative electrode power collector of this embodiment is preferably a metal foil with high electron conductivity, and resistance to degradation by elution into the electrolytic solution or reaction with the electrolyte or ion. There are no particular restrictions on such metal foils, and examples include aluminum foils, copper foils, nickel foils and stainless steel foils. The negative electrode power collector in the nonaqueous lithium power storage element of this embodiment is preferably a copper foil.

The metal foil may be a metal foil without ruggedness or through-holes, or it may be a metal foil having ruggedness formed by embossing, chemical etching, electrode position or blasting, or it may be a metal foil having through-holes, such as an expanded metal, punching metal or etching foil.

Among these, the negative electrode power collector of this embodiment is preferably a metal foil without through-holes. Having no through-holes is cheaper in terms of production cost and facilitates thin-film formation, and can thus contribute to higher energy density, while also lowering the power collector resistance and allowing a high input/output characteristic to be obtained.

The thickness of the negative electrode power collector is not particularly restricted so long as it allows the shape and strength of the negative electrode to be maintained, but 1 to 100 μm, for example, is preferred.

[Production of Negative Electrode]

The negative electrode comprises a negative electrode active material layer on one or both sides of a negative electrode power collector. According to a typical mode, the negative electrode active material layer is adhered to the negative electrode power collector.

The negative electrode can be produced by a known electrode production technique for lithium ion batteries or electrical double layer capacitors. For example, different materials containing a negative electrode active material may be dispersed and dissolved in water or an organic solvent to prepare a slurry-like coating solution, and the coating solution coated onto one or both sides of a negative electrode power collector to form a coating film, which is dried to obtain a negative electrode. The obtained negative electrode may also be pressed to adjust the thickness or bulk density of the negative electrode active material layer. As an alternative method, various materials containing negative electrode active materials may also be dry-mixed without using a solvent, and the obtained mixture is press-molded and then attached to a negative electrode power collector using a conductive adhesive.

The coating solution may also be prepared by dry blending all or a portion of each of the starting material powders containing the negative electrode active material, and then adding water or an organic solvent, and/or adding a liquid or slurry-like substance comprising a binder or dispersion stabilizer dissolved or dispersed in them. The coating solution may also be prepared by adding various starting powders containing the negative electrode active material, to a liquid or slurry-like substance comprising a binder or dispersion stabilizer dissolved or dispersed in water or an organic solvent.

The method of dispersing the coating solution is not particularly restricted, and a dispersing machine such as a homodisperser or multiscrew disperser, planetary mixer, thin-film rotating-type high-speed mixer or the like, may be suitably used. In order to obtain a coating solution in a satisfactory dispersed state, it is preferred for the dispersion to be at a peripheral velocity of 1 m/s to 50 m/s. It is preferred if the peripheral velocity is 1 m/s or greater, because each material will satisfactorily dissolve or disperse. It is also preferred if the peripheral velocity is no greater than 50 m/s, because each material will be unlikely to be damaged by heat or shear force during dispersion, and re-aggregation will be unlikely to take place.

The viscosity ($\eta b$) of the coating solution is preferably 1,000 mPa·s to 20,000 mPa·s, more preferably 1,500 mPa·s to 10,000 mPa·s and even more preferably 1,700 mPa·s to 5,000 mPa·s. If the viscosity ($\eta b$) is 1,000 mPa·s or higher, running of liquid during formation of the coating film will be minimized, and the coating film width and thickness can be satisfactorily controlled. If the viscosity ($\eta b$) is no higher than 20,000 mPa·s, there will be less pressure loss in the flow path of the coating solution when a coating machine is used, allowing stable coating to be carried out, and allowing control to less than the prescribed coating film thickness.

The TI value (thixotropy index value) of the coating solution is preferably 1.1 or greater, more preferably 1.2 or greater and even more preferably 1.5 or greater. If the TI value is 1.1 or greater, the coating film width and thickness can be satisfactorily controlled.

The method of forming the coating film is not particularly restricted, and a coating machine such as a die coater, comma coater, knife coater or gravure coating machine may be suitably used. The coating film may be formed by monolayer coating or by multilayer coating. The coating speed is preferably 0.1 m/min to 100 m/min, more preferably 0.5 m/min to 70 m/min and even more preferably 1 m/min to 50 m/min. If the coating speed is 0.1 m/min or greater, stable coating will be possible. If the coating speed is 100 m/min or lower, the coating precision can be adequately ensured.

The drying method for the coating film is not particularly restricted, and a drying method such as hot air drying or infrared ray (IR) drying may be suitably employed. Drying of the coating film may be drying at a single temperature, or it may be drying while varying the temperature in different stages. Several drying methods may also be used in combination for drying. The drying temperature is preferably 25° C. to 200° C., more preferably 40° C. to 180° C. and even more preferably 50° C. to 160° C. If the drying temperature is 25° C. or higher, it will be possible to adequately volatilize off the solvent in the coating film. If the drying temperature is no higher than 200° C., it will be possible to reduce cracking of the coating film by rapid volatilization of the solvent or maldistribution of the binder by migration, and oxidation of the negative electrode power collector or negative electrode active material layer.

The method of pressing the negative electrode is not particularly restricted, and a pressing machine such as a hydraulic press or vacuum pressing machine may be suitably used. The thickness, bulk density and electrode strength of the negative electrode active material layer can be adjusted by the pressing pressure, the gap, and the surface temperature of the pressed portion, as described below.

The pressing pressure is preferably 0.5 kN/cm to 20 kN/cm, more preferably 1 kN/cm to 10 kN/cm and even more preferably 2 kN/cm to 7 kN/cm. If the pressing pressure is 0.5 kN/cm or greater, it will be possible to adequately increase the electrode strength. If the pressing pressure is no greater than 20 kN/cm, distortion or wrinkles will be less likely to be produced in the negative electrode, and adjustment can be made to the desired layer thickness or bulk density for the negative electrode active material.

A person skilled in the art can set the gap between the press rolls to a desired value depending on the thickness of the dried negative electrode, so that the desired thickness or bulk density of the negative electrode active material layer is obtained. A person skilled in the art can also set the pressing speed as desired, so as to minimize distortion and wrinkling in the negative electrode.

The surface temperature of the pressed portion may be room temperature, or the pressed portion may be heated instead, if necessary. In the case of heating, the lower limit for the surface temperature of the pressed portion is preferably at least the melting point of the binder minus 60° C., more preferably at least the melting point minus 45° C., and even more preferably at least the melting point minus 30° C. The upper limit for the surface temperature of the pressed portion in the case of heating is also preferably no higher than the melting point of the binder used plus 50° C., more preferably no higher than the melting point plus 30° C., and even more preferably no higher than the melting point plus 20° C. For example, when PVdF (polyvinylidene fluoride: melting point=150° C.) is used as the binder, the surface temperature of the pressed portion is preferably between 90° C. and 200° C., more preferably between 105° C. and 180° C. and even more preferably between 120° C. and 170° C. When a styrene-butadiene copolymer (melting point=100° C.) is used as the binder, the surface temperature of the pressed portion is preferably between 40° C. and 150° C., more preferably between 55° C. and 130° C. and even more preferably between 70° C. and 120° C.

The melting point of the binder can be determined by the endothermic peak position in DSC (Differential Scanning Calorimetry). For example, using a "DSC7" differential scanning calorimeter by Perkin-Elmer, 10 mg of sample resin is set in the measuring cell and the temperature is increased from 30° C. to 250° C. at a temperature-elevating rate of 10° C./min, in a nitrogen gas atmosphere, the melting point being the endothermic peak temperature during the temperature elevation.

Pressing may also be carried out multiple times while varying the conditions including the pressing pressure, gap, speed, and pressed portion surface temperature.

The thickness of the negative electrode active material layer is preferably 5 μm to 100 μm for each side, the lower limit being more preferably 7 μm or greater, and even more preferably 10 μm or greater, and the upper limit being more preferably no greater than 80 μm and even more preferably no greater than 60 μm. If the thickness of the negative electrode active material layer is 5 μm or greater, the coatability will be excellent with less tendency to produce streaks during coating of the negative electrode active material layer. If the thickness of the negative electrode active material layer is 100 μm or lower, on the other hand, high energy density can be exhibited by reduction of the cell volume. The upper limit and lower limit for the thickness of the negative electrode active material layer may be combined as desired. The thickness of the negative electrode active material layer, when the collector has through-holes or ruggedness, is the mean value of the thickness for each side at the sections of the collector without through-holes or ruggedness.

The bulk density of the negative electrode active material layer is preferably 0.30 g/cm$^3$ to 1.8 g/cm$^3$, more preferably 0.40 g/cm$^3$ to 1.5 g/cm$^3$ and even more preferably 0.45 g/cm$^3$ to 1.3 g/cm$^3$. If the bulk density is 0.30 g/cm$^3$ or greater, sufficient strength can be obtained and sufficient conductivity can be exhibited between the negative electrode active materials. If the bulk density is 1.8 g/cm$^3$ or lower, it will be possible to ensure pores through which the ions can be sufficiently diffused in the negative electrode active material layer.

<Separator>

The positive electrode precursor and negative electrode may be laminated via a separator, or laminated and wound, to form an electrode laminated body or electrode wound body comprising a positive electrode precursor, separator and negative electrode.

The separator used may be a polyethylene microporous film or polypropylene microporous film used in lithium ion secondary batteries, or a cellulose nonwoven sheet used in electrical double layer capacitors. A film composed of organic or inorganic microparticles may also be laminated on one or both sides of these separators. Organic or inorganic microparticles may also be included inside a separator.

The thickness of the separator is preferably 5 μm to 35 μm. The thickness is preferably 5 μm or greater, as this will tend to reduce self-discharge due to internal microshorts. The thickness is also preferably no greater than 35 in, as this will tend to result in a higher input/output characteristic of the power storage element.

The thickness of a film composed of organic or inorganic microparticles is preferably 1 μm to 10 μm. The thickness is preferably 1 μm or greater, as this will tend to reduce self-discharge due to internal microshorts. The thickness is also preferably no greater than 10 m, as this will tend to result in a higher input/output characteristic of the power storage element.

<Casing>

The casing used may be a metal can or laminate film. A metal can is preferably made of aluminum. The laminate film is preferably a laminated film of a metal foil and a resin film, an example of which is a three-layer structure comprising the structure: outer layer resin film/metal foil/inner layer resin film. The outer layer resin film serves to prevent damage to the metal foil by contact, and a resin such as nylon or polyester may be suitably used. The metal foil serves to prevent penetration of moisture and gas, and a foil such as copper, aluminum or stainless steel may be suitably used. The inner layer resin film serves to protect the metal foil from the electrolytic solution housed inside while also providing a melt seal during heat sealing of the casing, and a polyolefin or acid-modified polyolefin may be suitably used.

<Nonaqueous Electrolytic Solution>

The electrolytic solution for this embodiment is a non-aqueous electrolytic solution. Specifically, the electrolytic solution contains a non-aqueous solvent as described below. The nonaqueous electrolytic solution comprises a lithium salt dissolved at a concentration of 0.5 mol/L or greater based on the total amount of the nonaqueous electrolytic solution. That is, the nonaqueous electrolytic solution contains lithium ion as an electrolyte.

Examples of lithium salts to be contained in the nonaqueous electrolytic solution of this embodiment include (LiN$(SO_2F)_2$), LiN$(SO_2CF_3)_2$, LiN$(SO_2C_2F_5)_2$, LiN$(SO_2CF_3)$$(SO_2C_2F_5)$, LiN$(SO_2CF_3)$ $(SO_2C_2F_4H)$, LiC$(SO_2F)_3$, LiC$(SO_2CF_3)_3$, LiC$(SO_2C_2F_5)_3$, LiCF$_3$SO$_3$, LiC$_4$F$_9$SO$_3$, LiPF$_6$ and LiBF$_4$, which may be used alone or in mixtures of two more. The nonaqueous electrolytic solution preferably contains LiPF$_6$ and/or LiN$(SO_2F)_2$, since these will allow high conductivity to be exhibited.

The lithium salt concentration in the nonaqueous electrolytic solution is preferably 0.5 mol/L or greater, and more preferably in the range of 0.5 to 2.0 mol/L. If the lithium salt concentration is 0.5 mol/L or greater, anions will be sufficiently present to allow sufficiently high power storage element capacitance. The lithium salt concentration is preferably 2.0 mol/L or lower, because this can prevent precipitation of the undissolved lithium salt in the nonaqueous electrolytic solution and prevent the viscosity of the electrolytic solution from becoming too high, and will avoid lowering of the conductivity or reduction in the input/output characteristic as well.

The nonaqueous electrolytic solution of this embodiment preferably comprises a cyclic carbonate and linear carbonate as non-aqueous solvents. If the nonaqueous electrolytic solution comprises a cyclic carbonate and a linear carbonate, this will be advantageous from the viewpoint of dissolving the lithium salt to the desired concentration and exhibiting high lithium ion conductivity. Examples of cyclic carbonates include alkylene carbonate compounds, representative of which are ethylene carbonate, propylene carbonate and butylene carbonate. An alkylene carbonate compound will typically be unsubstituted. Linear carbonates include dialkyl carbonate compounds, representative of which are dimethyl carbonate, diethyl carbonate, ethylmethyl carbonate, dipropyl carbonate and dibutyl carbonate. A dialkyl carbonate compound will typically be unsubstituted.

The total content of the cyclic carbonate and linear carbonate is preferably 50 weight % or greater and more preferably 65 weight % or greater, and preferably no greater than 95 weight % and more preferably no greater than 90 weight %, based on the total weight of the nonaqueous electrolytic solution. If the total content of the cyclic carbonate and linear carbonate is 50 weight % or greater it will be possible to dissolve the desired concentration of lithium salt, allowing high lithium ion conductivity to be exhibited, and if it is no greater than 95 weight %, the electrolytic solution will be able to further comprise the additives mentioned below. The upper limit and lower limit ranges for the total concentration may be combined as desired.

The nonaqueous electrolytic solution of this embodiment may also further comprise additives. The additives are not particularly restricted and include, for example, sultone compounds, cyclic phosphazenes, acyclic fluoroethers, fluorinated cyclic carbonates, cyclic carbonates, cyclic carboxylates, and cyclic acid anhydrides, which may be used alone or in mixtures of two or more.

According to this embodiment, from the viewpoint of minimal adverse effect on resistance, and from the viewpoint of reducing decomposition of the nonaqueous electrolytic solution at high temperature to minimize gas generation, 1,3-propanesultone, 2,4-butanesultone, 1,4-butanesultone, 1,3-butanesultone and 2,4-pentanesultone are preferred as saturated cyclic sultone compounds, 1,3-propenesultone and 1,4-butanesultone are preferred as unsaturated cyclic sultone compounds, and methylenebis(benzenesulfonic acid), methylenebis(phenylmethanesulfonic acid), methylenebis(ethanesulfonic acid), methylenebis(2,4,6,trimethylbenzenesulfonic acid) and methylenebis(2-trifluoromethylbenzenesulfonic acid) are preferred as other sultone compounds. It is preferred to select one or more from among these.

The total content of sultone compounds in the nonaqueous electrolytic solution of the nonaqueous lithium power storage element of this embodiment is preferably 0.1 weight % to 15 weight %, based on the total weight of the nonaqueous electrolytic solution. If the total content of sultone compounds in the nonaqueous electrolytic solution is 0.1 weight % or greater, it will be possible to minimize decomposition of the electrolytic solution at high temperature and to reduce gas generation. If the total content is no greater than 15 weight %, on the other hand, it will be possible to lower the ionic conductance of the electrolytic solution, and to maintain a high input/output characteristic. The content of sultone compounds in the nonaqueous electrolytic solution of the nonaqueous lithium power storage element is preferably 0.5 weight % to 10 weight % and more preferably 1 weight % to 5 weight %, from the viewpoint of obtaining both a high input/output characteristic and high durability.

Examples of cyclic phosphazenes include ethoxypentafluorocyclotriphosphazene, diethoxytetrafluorocyclotriphosphazene and phenoxypentafluorocyclotriphosphazene, and one or more selected from these is preferred.

The content of the cyclic phosphazene in the nonaqueous electrolytic solution is preferably 0.5 weight % to 20 weight % based on the total weight of the nonaqueous electrolytic solution. If the content is 0.5 weight % or greater, it will be possible to minimize decomposition of the electrolytic solution at high temperature and to reduce gas generation. If the content is no greater than 20 weight %, it will be possible to lower the ionic conductance of the electrolytic solution, and to maintain a high input/output characteristic. For these reasons, the cyclic phosphazene content is preferably 2 weight % to 15 weight % and more preferably 4 weight % to 12 weight %.

A cyclic phosphazene may be used alone, or two or more may be used in admixture.

Examples of acyclic fluoroethers include HCF$_2$CF$_2$OCH$_2$CF$_2$CF$_2$H, CF$_3$CFHCF$_2$OCH$_2$CF$_2$CF$_2$H, HCF$_2$CF$_2$CH$_2$OCH$_2$CF$_2$CF$_2$H and CF$_3$CFHCF$_2$OCH$_2$CF$_2$CFHCF$_3$, among which HCF$_2$CF$_2$OCH$_2$CF$_2$CF$_2$H is preferred from the viewpoint of electrochemical stability.

The content of the acyclic fluoroether is preferably 0.5 weight % to 15 weight % and more preferably 1 weight % to 10 weight %, based on the total weight of the nonaqueous electrolytic solution. If the acyclic fluoroether content is 0.5 weight % or higher, the stability of the nonaqueous electrolytic solution against oxidative decomposition will be increased and a power storage element with high durability during high temperature will be obtained. If the acyclic fluoroether content is 15 weight % or lower, on the other hand, the electrolyte salt solubility will be kept satisfactory and high ionic conductance of the nonaqueous electrolytic solution will be maintained, thus allowing a high input/output characteristic to be exhibited.

An acyclic fluoroether used may be a single type or a mixture of two or more types.

A fluorinated cyclic carbonate is preferably at least one selected from the group consisting of fluoroethylene carbonate (FEC) and difluoroethylene carbonate (dFEC), from the viewpoint of compatibility with other nonaqueous solvents.

The content of the fluorinated cyclic carbonate is preferably 0.5 weight % to 10 weight %, and more preferably 1 weight % to 5 weight %, with respect to the total weight of the nonaqueous electrolytic solution. If the fluorinated cyclic carbonate is 0.5 weight % or higher, it will be possible to form a satisfactory coating film on the negative electrode, and reductive decomposition of the electrolytic solution on the negative electrode will be minimized, to obtain a power storage element with high durability at high temperature. If the fluorinated cyclic carbonate content is 10 weight % or lower, on the other hand, the electrolyte salt solubility will be kept satisfactory and high ionic conductance of the nonaqueous electrolytic solution will be maintained, thus allowing a high input/output characteristic to be exhibited.

A fluorinated cyclic carbonate may be used alone, or two or more may be used as a mixture.

A cyclic carbonate is preferably vinylene carbonate.

The content of the cyclic carbonate is preferably 0.5 weight % to 10 weight %, and more preferably 1 weight % to 5 weight %, with respect to the total weight of the nonaqueous electrolytic solution. If the cyclic carbonate content is 0.5 weight % or higher, it will be possible to form a satisfactory coating film on the negative electrode, and reductive decomposition of the electrolytic solution on the negative electrode will be minimized, to obtain a power storage element with high durability at high temperature. If the cyclic carbonate content is 10 weight % or lower, the electrolyte salt solubility will be kept satisfactory and high ionic conductance of the nonaqueous electrolytic solution will be maintained, thus allowing a high input/output characteristic to be exhibited.

Examples of cyclic carboxylates include γ-butyrolactone, γ-valerolactone, γ-caprolactone and ε-caprolactone, and preferably at least one selected from these is used. Particularly preferred among these is γ-butyrolactone, from the viewpoint of improving the cell characteristic attributable to improved lithium ion dissociation.

The content of the cyclic carboxylate is preferably 0.5 weight % to 15 weight %, and more preferably 1 weight % to 5 weight %, with respect to the total weight of the nonaqueous electrolytic solution. If the cyclic acid anhydride content is 0.5 weight % or higher, it will be possible to form a satisfactory coating film on the negative electrode, and reductive decomposition of the electrolytic solution on the negative electrode will be minimized, to obtain a power storage element with high durability during periods of high temperature. If the cyclic carboxylate content is 15 weight % or lower, on the other hand, the electrolyte salt solubility will be kept satisfactory and high ionic conductance of the nonaqueous electrolytic solution will be maintained, thus allowing a high input/output characteristic to be exhibited.

A cyclic carboxylate may be used alone, or two or more may be used in admixture.

The cyclic acid anhydride is preferably one or more selected from among succinic anhydride, maleic anhydride, citraconic anhydride and itaconic anhydride. Selection is most preferably made from succinic anhydride and maleic anhydride, from the viewpoint of ready industrial availability to reduce production cost of the electrolytic solution, and from the viewpoint of easier dissolution in the nonaqueous electrolytic solution.

The content of the cyclic acid anhydride is preferably 0.5 weight % to 15 weight %, and more preferably 1 weight % to 10 weight %, with respect to the total weight of the nonaqueous electrolytic solution. If the cyclic acid anhydride content is 0.5 weight % or higher, it will be possible to form a satisfactory coating film on the negative electrode, and reductive decomposition of the electrolytic solution on the negative electrode will be minimized, to obtain a power storage element with high durability during periods of high temperature. If the cyclic acid anhydride content is 10 weight % or lower, the electrolyte salt solubility will be kept satisfactory and high ionic conductance of the nonaqueous electrolytic solution will be maintained, thus allowing a high input/output characteristic to be exhibited.

A cyclic acid anhydride may be used alone, or two or more may be used in admixture.

<Method for Producing Nonaqueous Lithium Power Storage Element>

<Assembly>

Typically, a positive electrode precursor and negative electrode cut into the shape of a sheet are laminated via a separator to obtain an electrode laminated body, and a positive electrode terminal and negative electrode terminal are connected to the electrode laminated body. Alternatively, a positive electrode precursor and negative electrode are laminated via a separator and wound to obtain a wound electrode, and a positive electrode terminal and negative electrode terminal are connected to the wound electrode. The shape of the wound electrode may be cylindrical or flat.

The method of connecting the positive electrode terminal and negative electrode terminal is not particularly restricted, and a method such as resistance welding or ultrasonic welding may be employed.

The terminal-connected electrode laminated body or wound electrode is preferably dried to remove the residual solvent. The drying method is not restricted, and drying may be carried out by vacuum drying or the like. The residual solvent is preferably no greater than 1.5 weight % per weight of the positive electrode active material layer or negative electrode active material layer. It is not preferred if the residual solvent is greater than 1.5 weight %, because the solvent will remain in the system and impair the self-discharge property.

The dried electrode laminated body or wound electrode is preferably stored in a casing, which is typically a metal can or laminate film, in a dry environment of below the dew point minus 40° C., and is preferably sealed, leaving only one of the openings. If the temperature is higher than the dew point minus 40° C., moisture will adhere to the electrode laminated body or wound electrode, often resulting in residue of water in the system and impairing the self-discharge property. The method of sealing the casing is not particularly restricted, and a method such as heat sealing or impulse sealing may be employed.

<Filling, Impregnation and Sealing>

Following assembly, the electrode laminated body or wound electrode housed in the casing is filled with a nonaqueous electrolytic solution. After filling, the positive electrode precursor, negative electrode and separator are preferably thoroughly impregnated with the nonaqueous electrolytic solution. If the electrolytic solution has not wetted at least a portion of the positive electrode precursor, negative electrode and separator, then in the lithium doping described below, doping will proceed in a non-uniform manner, resulting in increased resistance or lower durability of the obtained nonaqueous lithium power storage element. The method of impregnation is not particularly restricted, and for example, the method used may be setting the filled nonaqueous lithium power storage element in a pressure reduction chamber with the casing in an opened state, using a vacuum pump to bring the interior of the chamber to a reduced pressure state, and then restoring it to atmospheric pressure. After impregnation, the nonaqueous lithium power storage element with the casing in an opened state is sealed under reduced pressure, to hermetically seal it.

<Lithium Doping>

A preferred method of lithium doping is a method of applying a voltage between the positive electrode precursor and the negative electrode to decompose the lithium compound in the positive electrode precursor and release lithium ions, and reducing the lithium ions at the negative electrode to predope lithium ions into the negative electrode active material layer.

During the lithium doping, gas such as $CO_2$ is generated with oxidative decomposition of the lithium compound in the positive electrode precursor. It is therefore preferable to provide means for releasing the generated gas out of the casing during application of the voltage. Examples of such means include a method of applying a voltage with a portion of the casing in an open state; and a method of applying voltage with appropriate outgassing means such as a degassing valve or gas permeable film set beforehand on a portion of the casing.

<Aging>

After lithium doping, the nonaqueous lithium power storage element is preferably subjected to aging. For aging, the solvent in the electrolytic solution is decomposed at the negative electrode, and a lithium ion-permeable solid polymer coating film is formed on the negative electrode surface.

The method of aging is not particularly restricted, and for example, a method of reacting the solvent in the electrolytic solution in a high-temperature environment may be used.

<Degassing>

After aging, preferably degassing is further carried out to reliably remove the gas remaining in the electrolytic solution, positive electrode and negative electrode. Any gas remaining in at least portions of the electrolytic solution, positive electrode and negative electrode will interfere with ion conduction, thus increasing the resistance of the obtained nonaqueous lithium power storage element.

The method of degassing is not particularly restricted, and for example, the method used may be setting the nonaqueous lithium power storage element in a pressure reduction chamber with the casing in an opened state, and using a vacuum pump to bring the interior of the chamber to a reduced pressure state.

<Evaluation of Power Storage Element Properties>

(Electrostatic Capacitance)

Throughout the present specification, the electrostatic capacitance F (F) is the value obtained by the following method.

First, in a thermostatic chamber set to 25° C., a cell corresponding to the nonaqueous lithium power storage element is subjected to constant-current charge at the 2 C current value until 3.8 V is reached, and then constant voltage charge is carried out for 30 minutes with application of a constant voltage of 3.8 V. Next, the capacitance after constant-current discharge to 2.2 V at the 2 C current value is recorded as Q. The obtained value of Q is used to determine the value calculated by $F=Q/(3.8-2.2)$.

The C rate of the current is based on 1 C as the current value such that discharge is complete at 1 hour, upon constant-current discharge from maximum voltage to minimum voltage. Throughout the present specification, 1 C is the current value such that discharge is complete at 1 hour, upon constant-current discharge from a maximum voltage of 3.8 V to a minimum voltage of 2.2 V.

(Internal Resistance)

Throughout the present specification, the internal resistance Ra ($\Omega$) is the value obtained by the following method.

First, in a thermostatic chamber set to 25° C., the nonaqueous lithium power storage element is subjected to constant-current charge at the 20 C current value until 3.8 V is reached, and then constant voltage charge is carried out for 30 minutes with application of a constant voltage of 3.8 V. Next, constant-current discharge is carried out to 2.2 V with the 20 C current value, to obtain a discharge curve (time-voltage). The value is calculated from voltage drop $\Delta V=3.8-Vo$, and $Ra=\Delta V/(20\ C\ current\ value)$ when the voltage of Vo at discharge time=0 seconds, obtained by extrapolating by linear approximation from the voltage values at discharge times of 2 seconds and 4 seconds in the discharging curve, is defined as $E_0$.

(Electrical Energy)

Throughout the present specification, the electrical energy E (Wh) is the value obtained by the following method.

It is the value calculated by $F\times(3.8^2-2.2^2)/2/3600$, using the electrostatic capacitance F (F) calculated by the method described above.

(Volume)

The volume V (L) of the power storage element is the volume of the portion of the electrode laminated body or wound electrode in which the region where the positive electrode active material layer and negative electrode active material layer are stacked is housed by the casing.

For example, in the case of an electrode laminated body or wound electrode housed by a laminate film, typically the region of the electrode laminated body or wound electrode where the positive electrode active material layer and negative electrode active material layer are present is housed in a laminate film molded into the shape of cup. The volume (Vx) of the power storage element is calculated by $Vx=lx\times wx\times tx$, using the outer length (lx) and outer width (wx) of the cup-shaped section, and the thickness (tx) of the power storage element including the laminate film.

In the case of an electrode laminated body or wound electrode housed in a rectilinear metal can, the volume of the outer dimensions of the metal can is simply used as the volume of the power storage element. That is, the volume (Vy) of the power storage element is calculated by $Vy=ly\times wy\times ty$, based on the outer length (ly) and outer width (wy), and outer thickness (ty), of the rectilinear metal can.

Even in the case of a wound electrode housed in a cylindrical metal can, the volume of the outer dimensions of the metal can is used as the volume of the power storage element. That is, the volume ($V_Z$) of the power storage element is calculated by $V_Z=3.14\times r\times r\times l_Z$, using the outer radius (r) and outer length ($l_Z$) of the bottom face or top face of the cylindrical metal can.

(Conditions a and b)

The nonaqueous lithium power storage element of this embodiment preferably satisfies the following conditions (a) and (b):

(a) the product of Ra and F, Ra·F is 0.3 to 3.0.

(b) E/V is 15 to 50.

Regarding condition (a), Ra·F is preferably no greater than 3.0, more preferably no greater than 2.5 and even more preferably no greater than 2.0, from the viewpoint of exhibiting sufficient charge capacity and discharge capacity for high current. If Ra·F is no greater than 3.0, it will be possible to obtain a power storage element having an excellent input/output characteristic. This is therefore preferred since, by combining a power storage system using a power storage element with a high efficiency engine, for example, it will be possible to adequately withstand the high load applied to the power storage element. Ra·F is preferably 0.3 or greater, 0.4 or greater or 0.5 or greater, from the viewpoint of maintaining the properties of the power storage element.

Regarding condition (b), E/V is preferably 15 or greater, more preferably 18 or greater and even more preferably 20 or greater, from the viewpoint of exhibiting sufficient charge capacity and discharge capacity. If E/V is 15 or greater, it will be possible to obtain a power storage element with excellent volume energy density. This is therefore preferable, because when a power storage system using the power storage element is used in combination with an automobile engine, for example, it will be possible to install the power storage system in the narrow limited space in the automobile. E/V is preferably no greater than 50, no greater than 45 or no greater than 40, from the viewpoint of maintaining the properties of the power storage element.

(High Load Charge/Discharge Cycling Test)

For the present specification, the resistance increase rate (Rb/Ra) after a high load charge/discharge cycling test is measured by the following method.

First, a cell corresponding to the nonaqueous lithium power storage element is subjected to constant-current charge in a thermostatic chamber set to 25° C., until reaching 3.8 V at the 300 C current value, and then constant-current discharge is carried out until reaching 2.2 V at the 300 C current value. Charge/discharge is repeated 60,000 times, measuring the internal resistance before start of the test and after completion of the test, and the resistance increase rate after the high load charge-discharge cycling test with respect to before start of the test is calculated as Rb/Ra, with Ra ($\Omega$) as the internal resistance before start of the test and Rb ($\Omega$) as the internal resistance after completion of the test.

Rb/Ra for the nonaqueous lithium power storage element of this embodiment is preferably no greater than 2.0, more preferably no greater than 1.6, even more preferably no greater than 1.4 and yet more preferably no greater than 1.2. If the resistance increase rate after the high load charge/discharge cycling test is no greater than 2.0, the device properties will be maintained even with repeated charge/discharge. Consequently, it will be possible to stably obtain an excellent input/output characteristic for long periods, thus helping to prolong the usable life of the device. Rb/Ra is preferably 0.90 or greater, 0.95 or greater or 1.00 or greater, from the viewpoint of maintaining the properties of the power storage element.

<Measuring Methods>
<BET Specific Surface Area, Mesopore Volume, Micropore Volume and Mean Pore Size of Active Material>

The BET specific surface area, mesopore volume, micropore volume and mean pore size of the active material for this embodiment are the values determined by the following respective methods. A sample is vacuum dried at 200° C. overnight, and the adsorption/desorption isotherm is measured using nitrogen as the adsorbate. Using the obtained isotherm at the adsorption side, the BET specific surface area is calculated by the multipoint BET method or single point BET method, the mesopore volume by the BJH method, and the micropore volume by the MP method.

The BJH method is a method of calculation commonly used for analysis of mesopores, and it was advocated by Barrett, Joyner, Halenda et al. (E. P. Barrett, L. G. Joyner and P. Halenda, J. Am. Chem. Soc., 73, 373(1951)).

The MP method is a method in which the "t-plot method" (B. C. Lippens, J. H. de Boer, J. Catalysis, 4319 (1965)) is utilized to determine micropore volume, micropore area and micropore distribution, and it is the method proposed by R. S. Mikhail, Brunauer and Bodor (R. S. Mikhail, S. Brunauer, E. E. Bodor, J. Colloid Interface Sci., 26, 45 (1968)).

The "mean pore size" is the value determined by dividing the total pore volume per weight of a sample, as obtained by measuring the equilibrium adsorption volumes of nitrogen gas under different relative pressures at the temperature of liquid nitrogen, by the aforementioned BET specific surface area.

<Mean Particle Diameter>

The mean particle diameter of the active material of this embodiment is the particle diameter at the point where, when the particle diameter distribution is measured using a particle diameter distribution analyzer, and a cumulative curve with 100% as the total volume is determined, the cumulative curve reaches at 50% (that is, the 50% diameter (median diameter)). The mean particle diameter can be measured using a commercially available laser diffraction particle diameter distribution analyzer.

<Dispersity>

Dispersity for this embodiment is the value determined by a dispersion evaluation test using a fineness gauge conforming to JIS K5600. Specifically, a sufficient amount of sample is allowed to flow into the tip of a fineness gauge having a groove with the prescribed depth corresponding to the particle diameter, through the deep end of the groove, and is allowed to slightly spill over from the groove. Next, with the long side of a scraper parallel to the widthwise direction of the gauge, and placed with the blade edge in contact with the deep tip of the groove of the fineness gauge, the scraper is held on the surface of the gauge, the surface of the gauge is pulled at an even speed perpendicular to the long side direction of the groove to a groove depth of 0 for a period of 1 to 2 seconds, observation is made with light irradiated at an angle of 20° to 30° within 3 seconds after the pulling has ended, and the depth at which particles appear in the groove of the fineness gauge is read off.

<Viscosity and TI Value>

The viscosity ($\eta$b) and TI value for this embodiment are the values determined by the following respective methods. First, an E-type viscometer is used to determine the viscosity ($\eta$a) stabilized after measurement for 2 minutes or longer under conditions with a temperature of 25° C. and a shear rate of 2 s$^{-1}$. Next, the viscosity ($\eta$b) is determined as measured under the same conditions except for changing the shear rate to 20 s$^{-1}$. The viscosity values as obtained above are used to calculate the TI value as: TI value=$\eta$a/$\eta$b. When increasing the shear rate from 2 s$^{-1}$ to 20 s$^{-1}$, it may be increased in a single step, or the shear rate may be increased in steps within the range specified above, while appropriately determining the viscosity at each shear rate.

<Measurement of Pore Distribution by Mercury Intrusion>

The total cumulative pore volume and log differential pore volume according to mercury intrusion for this embodiment are the values determined by the following respective methods.

A vessel containing the sample is filled with mercury after evacuation, pressure is applied to the mercury, and the intrusion of mercury with respect to the applied pressure is measured. The applied pressure is converted to pore size based on the following formula, and the amount of mercury intrusion is converted to pore volume, to obtain the pore distribution.

$$P \times D = -4 \times \sigma \times \cos\theta$$

(wherein, P=pressure, D=pore size, σ=surface tension of mercury (485 mN/m), and θ=mercury contact angle (130°).)

From the cumulative pore volume distribution, with pore size (μm) on the abscissa and estimating pore volume (mL/g) on the ordinate, the total cumulative pore volume (Vp) in a given specified pore size range, such as 0.1 μm to 50 μm, is calculated by the following formula: (cumulative pore volume at pore size of 0.1 μm)–(cumulative pore volume at pore size of 50 μm).

Also, the value dV/d(log D), of the pore volume difference value dV between measured points, divided by the logarithm of the pore size difference value between the measured points d(log D), is recorded as the log differential pore volume with respect to the mean pore size of the measured point interval.

The unit weight (g) of the total cumulative pore volume (mL/g) and log differential pore volume (mL/g) of the positive electrode active material layer of this embodiment is defined as the weight of the entire positive electrode active material layer.

<BET Specific Surface Area, Mesopore Volume, Micropore Volume and Ultramicropore Volume of Positive Electrode>

The BET specific surface area, mesopore volume, micropore volume and ultramicropore volume of the positive electrode of this embodiment are the values determined by the following respective methods.

The nonaqueous lithium power storage element is disassembled, and the positive electrode is cut out, washed with a nonaqueous solvent and vacuum dried overnight, to obtain a positive electrode sample. The nonaqueous solvent may be one that is commonly used as an electrolytic solution solvent for nonaqueous lithium power storage elements, and diethyl carbonate may be described as an example. The temperature for the vacuum drying is not particularly restricted so long as it is a temperature at which the solvent vaporizes from within the pores of the positive electrode, and it is preferably 100 to 200° C. and more preferably 150 to 200° C.

The obtained positive electrode sample is used for measurement of the adsorption/desorption isotherm, with nitrogen as the adsorbate. Using the obtained isotherm at the adsorption side, the BET specific surface area is calculated by the multipoint BET method or single point BET method, the mesopore volume by the BJH method, and the micropore volume by the MP method. The obtained BET specific surface area, mesopore volume and micropore volume are each divided by the measured area of the positive electrode sample, to allow calculation of the BET specific surface area D per unit area ($m^2/cm^2$), the mesopore volume A per unit area ($\mu L/cm^2$), and the micropore volume B per unit area ($\mu L/cm^2$).

The obtained positive electrode sample is used for measurement of the adsorption/desorption isotherm, with carbon dioxide as the adsorbate. The obtained isotherm at the adsorption side is used to calculate the ultramicropore volume by the DFT method. The obtained ultramicropore volume is divided by the measured area of the positive electrode sample, to allow calculation of the ultramicropore volume C per unit area ($\mu L/cm^2$).

Here, the DFT method (Density Functional Theory method) is a method in which the absorption isotherm for a model pore and the actually measured absorption isotherm data are compared and analyzed to obtain a pore distribution. In the analysis of the ultramicropores for this embodiment, it is preferred to use the slit pore analytical model of the NLDFT method (Non-Local Density Functional Theory method).

<Method of Identifying Lithium Compound in Electrode>

The method of identifying a lithium compound in the positive electrode is not particularly restricted, and it may be identification by SEM-EDX, Raman or X-ray photoelectron spectroscopy (XPS), for example. For identification of a lithium compound, it is preferred to carry out the identification by combining the different analysis methods described below.

For measurement by SEM-EDX, Raman or X-ray photoelectron spectroscopy (XPS), preferably the nonaqueous lithium power storage element is disassembled in an argon box, the positive electrode is removed, and measurement is performed after washing the electrolyte adhering to the positive electrode surface. Since the solvent used for washing of the positive electrode only needs to wash off the electrolyte adhering to the positive electrode surface, a carbonate solvent such as dimethyl carbonate, ethylmethyl carbonate or diethyl carbonate may be suitably used.

The washing method may be, for example, immersion of the positive electrode for 10 minutes or longer in a diethyl carbonate solvent in an amount of 50 to 100 times the weight of the positive electrode, and subsequent reimmersion of the positive electrode after exchange of the solvent. The positive electrode is then removed from the diethyl carbonate and vacuum dried, and then subjected to SEM-EDX, Raman and XPS analysis. The vacuum drying conditions may be conditions such that the diethyl carbonate residue in the positive electrode is no greater than 1 weight % under the conditions of a temperature of 0 to 200° C., a pressure of 0 to 20 kPa and a time of 1 to 40 hours. The diethyl carbonate residue can be quantified by GC/MS measurement of water after distilled water washing and liquid volume adjustment, based on a predrawn calibration curve.

In ion chromatography, the water after washing of the positive electrode with distilled water is analyzed to allow identification of the anion.

When the lithium compound cannot be identified by this analysis method, 7Li-solid NMR, XRD (X-ray diffraction), TOF-SIMS (Time-Of-Flight Secondary Ion Mass Spectrometry), AES (Auger Electron Spectroscopy), TPD/MS (Temperature Programmed Desorption/Mass Spectrometry), DSC (Differential Scanning Calorimetry) or the like may be used as an alternative analysis method to identify the lithium compound.

(SEM-EDX)

The oxygen-containing lithium compound and positive electrode active material can be discriminated by oxygen mapping with an SEM-EDX image of the positive electrode surface measured at an observational magnification of 1000-4000×. The SEM-EDX image can be measured with an acceleration voltage of 10 kV, an emission current of 10 μA and a measuring pixel count of 256×256 pixels, and a number of integration of 50. In order to prevent electrification of the sample, the sample may be surface treated with gold, platinum, osmium or the like by a method such as vacuum vapor deposition or sputtering. For the SEM-EDX image measuring conditions, preferably the luminance and contrast are adjusted so that there are no pixels reaching the maximum brightness and the mean value of the brightness falls within the range of 40% to 60%. In the obtained oxygen mapping, particles containing a bright portion equal to 50% or more of the area thereof when binarized based on the mean value of brightness with respect to the resulting oxygen mapping were considered to constitute the lithium compound.

(Raman)

The lithium compound comprising carbonate ion, and the positive electrode active material can be discriminated by Raman imaging of the positive electrode surface measured at an observational magnification of 1000-4000×. The measuring conditions may be, for example, an excitation light of 532 nm, an excitation light intensity of 1%, 50× long working of objective lens, a diffraction grating of 1800 gr/mm, point scanning as the mapping system (slit: 65 mm, binning: 5 pix), a 1 mm step, an exposure time per point of 3 seconds, a number of scans of 1, and a noise filter. For the measured Raman spectrum, a straight baseline is set in the range of 1071 to 1104 cm$^{-1}$, a value positive from the baseline is considered a carbonate ion peak followed by integration of the frequency thereof, but the frequency of the noise component relative to the peak area of carbonate ions approximated by a Gaussian function is subtracted from the frequency distribution of the carbonate ions.

(XPS)

The electronic state of lithium can be analyzed by XPS to discriminate the bonded state of the lithium.

The measuring conditions may be, for example, monochromatized AlKα as the X-ray source, an X-ray beam diameter of 100 μmφ (25 W, 15 kV), narrow scan for path energy (58.70 eV), with charge neutralization, narrow scan for sweeping: 10 times (carbon, oxygen), 20 times (fluorine), 30 times (phosphorus), 40 times (lithium), 50 times (silicon), narrow scan for energy step: 0.25 eV.

The surface of the positive electrode is preferably cleaned by sputtering before XPS measurement. As the sputtering conditions, cleaning of the positive electrode surface may be carried out, for example, with an acceleration voltage of 1.0 kV, and 1 minute in a range of 2 mm×2 mm (1.25 nm/min as $SiO_2$).

In the obtained XPS spectrum, the following assignments may be made:

A peak having Li 1s bonding energy of 50 to 54 eV as a $LiO_2$ or Li—C bond, a peak of 55 to 60 eV as LiF, $Li_2CO_3$, $Li_xPO_yF_z$ (where x, y and z are integers of 1 to 6), a peak having C1s bonding energy of 285 eV as a C—C bond, a peak of 286 eV as a C—O bond, a peak of 288 eV as COO, a peak of 290 to 292 eV as $CO_3^{2-}$ and C—F bonds, a peak having O1s bonding energy of 527 to 530 eV as $O^{2-}$ ($Li_2O$), a peak of 531 to 532 eV as CO, $CO_3$, OH, $PO_x$ (where x is an integer of 1 to 4), $SiO_x$ (where x is an integer of 1 to 4), a peak of 533 eV as C—O, $SiO_x$ (where x is an integer of 1 to 4), a peak having F s bonding energy of 685 eV as LiF, a peak of 687 eV as a C—F bond, $Li_xPO_yF_z$ (where x, y and z are integers of 1 to 6), $PF_6^-$, and for P2p bonding energy, a peak having P2p bonding energy of 133 eV as $PO_x$ (where x is an integer of 1 to 4), a peak of 134 to 136 eV as $PF_x$ (where x is an integer of 1 to 6), a peak having Si2p bonding energy of 99 eV as Si, silicide, a peak of 101 to 107 eV as $Si_xO_y$ (where x and y are any integers).

When peaks overlap in the obtained spectrum, the spectrum is preferably assigned upon separating the peaks with the assumption of a Gaussian function or Lorentz function. The lithium compound that is present can be identified based on the obtained results of measuring the electronic state, and the existing element ratio.

(Ion Chromatography)

Anion species eluted in water can be identified by analyzing the distilled water washing fluid from the positive electrode, by ion chromatography. The columns used may be an ion-exchange type, ion-exclusion type and reversed-phase ion pair type. The detector used may be an electric conductivity detector, ultraviolet-visible absorption intensity detector or electrochemical detector, and a suppressor system with a suppressor installed before the detector, or a non-suppressor system without installation of a suppressor, using a solution with low electric conductivity as the eluent, may be used. Since measurement can also be carried out by combining a mass spectrometer or charged particle detection with the detector, it is preferred to combine an appropriate column and detector, depending on the lithium compound identified from the results of analysis by SEM-EDX, Raman or XPS.

The sample retention time will depend on the conditions such as the column and eluent used and is the same for each ion species component, while the size of the peak response differs for each ion species but is proportional to the concentration. By preliminarily measuring a standard solution of known concentration with ensured traceability, it is possible to qualitatively and quantitatively analyze the ion species components.

<Method of Quantifying Lithium Compound>

A method of quantifying the lithium compound in the positive electrode will now be described. The positive electrode may be washed with an organic solvent and subsequently washed with distilled water, and the lithium compound quantified from the change in positive electrode weight before and after the washing with distilled water. The area of the positive electrode to be measured is not particularly restricted, but from the viewpoint of reducing measurement variation it is preferably 5 cm$^2$ to 200 cm$^2$ and more preferably 25 cm$^2$ to 150 cm$^2$. Measurement reproducibility can be ensured if the area is at least 5 cm$^2$. The handleability of the sample will be excellent if the area is no greater than 200 cm$^2$. The upper limit and lower limit ranges for the area may be combined as desired.

The organic solvent for washing of the positive electrode is sufficient if it can remove electrolytic solution decomposition products of the electrolytic solution that have accumulated on the positive electrode surface, and while it is not particularly restricted, elution of the lithium compound can be minimized by using an organic solvent with a solubility of no greater than 2 weight % for the lithium compound, and it is therefore preferred. For example, a polar solvent such as methanol or acetone may be used.

The method of washing the positive electrode is thorough immersion of the positive electrode for 3 days or longer in a methanol solution at a 50- to 100-fold amount with respect to the weight of the positive electrode. During the procedure, certain measures are preferred such as capping the vessel so that the methanol does not volatilize off. The positive electrode is then removed from the methanol and vacuum dried, and the weight of the positive electrode at that time is recorded as $M_0$ (g). The vacuum drying conditions employed may be conditions such that the methanol residue in the positive electrode is no greater than 1 weight % under the conditions of a temperature of 100 to 200° C., a pressure of 0 to 10 kPa and a time of 5 to 20 hours. The methanol residue can be quantified by GC/MS measurement of water after washing with distilled water, based on a predrawn calibration curve.

The positive electrode is thoroughly immersed for 3 days or longer in distilled water at a 100-fold amount (100 $M_0$ (g)) with respect to the weight of the vacuum dried positive electrode. During the procedure, certain measures are preferred such as capping the vessel so that the distilled water does not volatilize off. After immersion for 3 days or longer, the positive electrode is removed from the distilled water (for the aforementioned ion chromatography measurement, the liquid volume is adjusted so that the amount of distilled water is 100 $M_0$ (g)), and vacuum drying is performed in the same manner as for the methanol washing described above. The weight of the positive electrode at this time is recorded as $M_1$ (g), and then the positive electrode active material layer is removed from the power collector using a spatula, brush, bristles or the like, for measurement of the weight of the obtained positive electrode power collector. If the weight of the obtained positive electrode power collector is represented as $M_2$ (g), the weight % W of the lithium compound in the positive electrode can be calculated by the following formula.

$$W=100\times[1-(M_1-M_2)/(M_0-M_2)]$$

EXAMPLES

Embodiments of the invention will now be explained in detail by examples and comparative examples, with the understanding that these examples and comparative examples are not limitative in any way on the invention.

The first embodiment will now be explained in detail.
<Preparation of Positive Electrode Active Material>
[Preparation of Activated Carbon 1]

Crushed coconut shell carbide was subjected to carbonization in a small carbonizing furnace, at 500° C. for 3 hours in nitrogen, to obtain a carbide. The obtained carbide was placed in an activating furnace, water vapor was introduced into the activating furnace at 1 kg/h in a heated state using a preheating furnace, and the temperature was increased to 900° C. over 8 hours for activation. The activated carbide was cooled under a nitrogen atmosphere to obtain activated carbon. The obtained activated carbon was flow-rinsed for 10 hours, drained, and dried for 10 hours in an electrodesiccator held at 115° C., and then it was pulverized for 1 hour with a ball mill to obtain activated carbon 1.

A laser diffraction particle diameter distribution analyzer (SALD-2000J) by Shimadzu Corp. was used to measure the mean particle diameter of the activated carbon 1, which was found to be 4.2 μm. A pore distribution measuring apparatus (AUTOSORB-1 AS-1-MP) by Yuasa Ionics, Inc. was also used to measure the pore distribution. As a result, the BET specific surface area was 2360 $m^2$/g, the mesopore volume ($V_1$) was 0.52 cc/g, the micropore volume ($V_2$) was 0.88 cc/g, and $V_1/V_2=0.59$.

[Preparation of Activated Carbon 2]

For the phenol resin, after carbonization for 2 hours in a firing furnace at 600° C. under a nitrogen atmosphere, it was pulverized with a ball mill and sorted, to obtain a carbide having a mean particle diameter of 7.0 μm. The carbide and KOH were mixed at a weight ratio of 1:5, and heated for 1 hour in a firing furnace at 800° C. under a nitrogen atmosphere, for activation. The obtained activated substance was stirred and washed for 1 hour in dilute hydrochloric acid adjusted to a concentration of 2 mol/L, and then boiled and washed with distilled water until pH stabilized to between 5 and 6, after which it was dried to produce activated carbon 2.

A laser diffraction particle diameter distribution analyzer (SALD-2000J) by Shimadzu Corp. was used to measure the mean particle diameter of activated carbon 2, which was found to be 7.1 μm. A pore distribution measuring apparatus (AUTOSORB-1 AS-1-MP) by Yuasa Ionics, Inc. was also used to measure the pore distribution. As a result, the BET specific surface area was 3627 $m^2$/g, the mesopore volume ($V_1$) was 1.50 cc/g, the micropore volume ($V_2$) was 2.28 cc/g, and $V_1/V_2=0.66$.

[Preparation of Activated Carbon 3]

For the phenol resin, after carbonization for 2 hours in a firing furnace at 600° C. under a nitrogen atmosphere, it was pulverized with a ball mill and sorted, to obtain a carbide having a mean particle diameter of 17.5 pin. The carbide and KOH were mixed at a weight ratio of 1:4.5, and heated for 1 hour in a firing furnace at 800° C. under a nitrogen atmosphere, for activation. The obtained activated substance was stirred and washed for 1 hour in dilute hydrochloric acid adjusted to a concentration of 2 mol/L, and then boiled and washed with distilled water until the pH stabilized to between 5 and 6, after which it was dried to produce activated carbon 3.

A laser diffraction particle diameter distribution analyzer (SALD-2000J) by Shimadzu Corp. was used to measure the mean particle diameter of activated carbon 3, which was found to be 17.7 μm. A pore distribution measuring apparatus (AUTOSORB-1 AS-1-MP) by Yuasa-Ionics, Inc. was also used to measure the pore distribution. As a result, the BET specific surface area was 3130 $m^2$/g, the mesopore volume ($V_1$) was 1.26 cc/g, the micropore volume ($V_2$) was 2.07 cc/g, and $V_1/V_2=0.61$.

[Preparation of Activated Carbon 4]

Activated carbon 4 was obtained by further subjecting activated carbon 1 to pulverization for 2 hours with a ball mill.

A laser diffraction particle diameter distribution analyzer (SALD-2000J) by Shimadzu Corp. was used to measure the mean particle diameter of activated carbon 4, which was found to be 2.6 μm. A pore distribution measuring apparatus (AUTOSORB-1 AS-1-MP) by Yuasa-Ionics, Inc. was also used to measure the pore distribution. As a result, the BET specific surface area was 2424 $m^2$/g, the mesopore volume ($V_1$) was 0.50 cc/g, the micropore volume ($V_2$) was 0.91 cc/g, and $V_1/V_2=0.55$.

<Production of Positive Electrode Precursor>
[Production of Positive Electrode Precursor (Composition [a])]

One of activated carbons 1 to 3 was used as the positive electrode active material to produce a positive electrode precursor (composition [a]) by the method described below.

After mixing 35.5 parts by weight of one of activated carbons 1 to 3, 55.0 parts by weight of lithium carbonate having the mean particle diameter shown in Table 1, as a lithium compound, 2.0 parts by weight of Ketchen black, 1.5 parts by weight of PVP (polyvinylpyrrolidone), 6.0 parts by weight of PVdF (polyvinylidene fluoride) and NMP (N-methylpyrrolidone), the mixture was dispersed using a FILMIX® thin-film rotating-type high-speed mixer by Primix Corp., under conditions with a peripheral velocity of 17.0 m/s, to obtain a coating solution. The coating solution was coated onto one or both sides of an aluminum foil with a thickness of 15 μm using a die coater by Toray Engineering Co., Ltd. under conditions with a coating speed of 1 m/s, and dried at a drying temperature of 100° C. to obtain a positive electrode precursor. The obtained positive electrode precursor was pressed using a roll press under conditions with a pressure of 4 kN/cm and a pressed portion surface temperature of 25° C.

[Production of Positive Electrode Precursor (Composition [b])]

One of activated carbons 1 to 4 was used as the positive electrode active material to produce a positive electrode precursor (composition [b]) by the method described below.

After mixing 60.0 parts by weight of one of activated carbons 1 to 4, 27.5 parts by weight of lithium carbonate, lithium oxide or lithium hydroxide having the mean particle diameter shown in Table 1, as a lithium compound, 3.0 parts by weight of Ketchen black, 1.5 parts by weight of PVP (polyvinylpyrrolidone), 8.0 parts by weight of PVdF (polyvinylidene fluoride) and NMP (N-methylpyrrolidone), the mixture was dispersed using a FILMIX® thin-film rotating-type high-speed mixer by Primix Corp., under conditions with a peripheral velocity of 17.0 m/s, to obtain a coating solution. The coating solution was coated onto one or both sides of an aluminum foil with a thickness of 15 μm using a die coater by Toray Engineering Co., Ltd. under conditions with a coating speed of 1 m/s, and dried at a drying temperature of 100° C. to obtain a positive electrode precursor. The obtained positive electrode precursor was pressed using a roll press under conditions with a pressure of 4 kN/cm and a pressed portion surface temperature of 25° C.

[Production of Positive Electrode Precursor (Composition [c])]

One of activated carbons 1 to 3 was used as the positive electrode active material to produce a positive electrode precursor (composition [c]) by the method described below.

After mixing 45.0 parts by weight of one of activated carbons 1 to 3, 40.0 parts by weight of lithium carbonate having the mean particle diameter shown in Table 1, as a lithium compound, 5.0 parts by weight of acetylene black and 10.0 parts by weight of PTFE (polytetrafluoroethylene), a positive electrode sheet was fabricated. The fabricated sheet was adhered onto one or both sides of an aluminum foil with a thickness of 15 μm using conductive paste, and vacuum dried at 170° C. for 10 hours.

<Preparation of Negative Electrode Active Material>

[Preparation of Negative Electrode 1]

A 150 g portion of commercially available coconut shell activated carbon having a mean particle diameter of 3.0 μm and a BET specific surface area of 1,780 m²/g was placed into a stainless steel mesh basket and set on a stainless steel vat containing 270 g of coal-based pitch (softening point: 50° C.), both were set in an electric furnace (furnace inner usable dimension: 300 mm×300 mm×300 mm), and thermal reaction was carried out to obtain composite carbon material 1. The heat treatment was carried out under a nitrogen atmosphere, with temperature increase to 600° C. over a period of 8 hours, and 4 hours of holding at the same temperature. Composite carbon material 1 was then cooled to 60° C. by natural cooling, after which the obtained composite carbon material 1 was removed out of the furnace.

The mean particle diameter and BET specific surface area of the obtained composite carbon material 1 were measured by the same methods as described above. As a result, the mean particle diameter was 3.2 μm and the BET specific surface area was 262 m²/g. The weight ratio of coal-based pitch-derived carbonaceous material with respect to activated carbon was 78%.

Composite carbon material 1 was then used as a negative electrode active material to produce a negative electrode.

After mixing 85 parts by weight of composite carbon material 1, 10 parts by weight of acetylene black, 5 parts by weight of PVdF (polyvinylidene fluoride) and NMP (N-methylpyrrolidone), the mixture was dispersed using a FILMIX® thin-film rotating-type high-speed mixer by Primix Corp., under conditions with a peripheral velocity of 15 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,789 mPa·s and the TI value was 4.3. The coating solution was coated onto both sides of an electrolytic copper foil with a thickness of 10 μm using a die coater by Toray Engineering Co., Ltd. under conditions with a coating speed of 1 m/s, and dried at a drying temperature of 85° C. to obtain negative electrode 1. The obtained negative electrode 1 was pressed using a roll press under conditions with a pressure of 4 kN/cm and a pressed portion surface temperature of 25° C. The thickness of the negative electrode active material layer of the obtained negative electrode 1 was determined by subtracting the thickness of the copper foil from the average thickness measured at 10 arbitrary locations of negative electrode 1 using a Linear Gauge Sensor GS-551 by Ono Sokki Co., Ltd. As a result, the thickness per side of the negative electrode active material layers of negative electrode 1 was 40 μm.

[Preparation of Negative Electrode 2]

A 150 g portion of commercially available artificial graphite having a BET specific surface area of 3.1 m²/g and a mean particle diameter of 4.8 μm was placed into a stainless steel mesh basket and set on a stainless steel vat containing 15 g of coal-based pitch (softening point: 50° C.), both were set in an electric furnace (furnace inner usable dimension: 300 mm×300 mm×300 mm), and thermal reaction was carried out to obtain composite carbon material 2. The heat treatment was carried out under a nitrogen atmosphere, with temperature increase to 1000° C. over a period of 8 hours, and 4 hours of holding at the same temperature. This was followed by natural cooling to 60° C., after which the composite carbon material 2 was removed out of the furnace.

The mean particle diameter and BET specific surface area of the obtained composite carbon material 2 were measured by the same methods as described above. As a result, the mean particle diameter was 4.9 μm and the BET specific surface area was 6.1 m²/g. The weight ratio of coal-based pitch-derived carbonaceous material with respect to artificial graphite was 2%.

Composite carbon material 2 was then used as a negative electrode active material to produce a negative electrode.

After mixing 80 parts by weight of composite carbon material 2, 8 parts by weight of acetylene black, 12 parts by weight of PVdF (polyvinylidene fluoride) and NMP (N-methylpyrrolidone), the mixture was dispersed using a FILMIX® thin-film rotating-type high-speed mixer by Primix Corp., under conditions with a peripheral velocity of 15 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,798 mPa·s and the TI value was 2.7. The coating solution was coated onto both sides of an electrolytic copper foil with a thickness of 10 μm using a die coater by Toray Engineering Co., Ltd. under conditions with a coating speed of 1 m/s, and dried at a drying temperature of 85° C. to obtain negative electrode 2. The obtained negative electrode 2 was pressed using a roll press under conditions with a pressure of 4 kN/cm and a pressed portion surface temperature of 25° C. The thickness of the negative electrode active material layer of the obtained negative electrode 2 was determined by subtracting the thickness of the copper foil from the average thickness measured at 10 arbitrary locations of negative electrode 2 using a Linear Gauge Sensor GS-551 by Ono Sokki Co., Ltd. As a result, the thickness per side of the negative electrode active material layers of negative electrode 2 was 25 µm.

<Preparation of Electrolytic Solution>

As an organic solvent there was used a mixed solvent of ethylene carbonate (EC):methyl ethyl carbonate (EMC)=33: 67 (volume ratio), each electrolyte salt was dissolved so that the concentration ratio of $LiN(SO_2F)_2$ and $LiPF_6$ was 75:25 (molar ratio) with respect to the total electrolytic solution and the total concentration of $LiN(SO_2F)_2$ and $LiPF_6$ was 1.2 mol/L, and the obtained solution was used as a nonaqueous electrolytic solution.

The concentrations of $LiN(SO_2F)_2$ and $LiPF_6$ in the prepared electrolytic solution were 0.9 mol/L and 0.3 mol/L, respectively.

Example 1

<Fabrication of Nonaqueous Lithium Power Storage Element>

[Assembly and Drying of Power Storage Element]

The obtained double-sided negative electrode 1 and double-sided positive electrode precursor (composition [a]) were cut to 10 cm×10 cm (100 cm²). Using a single-sided positive electrode precursor (composition [a]) for the uppermost side and lowermost side, 21 double-sided negative electrodes 1 and 20 double-sided positive electrode precursors (composition [a]) were stacked, sandwiching microporous film separators each with a thickness of 15 µm between the negative electrodes and positive electrode precursors. Next, a negative electrode terminal and positive electrode terminal were connected to the negative electrodes and positive electrode precursors, respectively, by ultrasonic welding to form an electrode laminated body. The electrode laminated body was vacuum dried under conditions with a temperature of 80° C., a pressure of 50 Pa and a drying time of 60 hr. The dried electrode laminated body was housed in a casing made of an aluminum laminate package material in a dry environment with a dew point of −45° C., and the electrode terminal portion and bottom portion of the casing were heat sealed on three sides under conditions with a temperature of 180° C., a seal time of 20 sec and a seal pressure of 1.0 MPa.

[Filling, Impregnation and Sealing of Power Storage Element]

Approximately 80 g of the nonaqueous electrolytic solution was injected into the electrode laminated body housed in the aluminum laminate package material under atmospheric pressure, in a dry air environment with a temperature of 25° C. and a dew point of no higher than −40° C., to form a nonaqueous lithium power storage element before lithium doping treatment. Next, the nonaqueous lithium power storage element was placed in a pressure reduction chamber and the pressure was reduced from ordinary pressure to −87 kPa, after which it was restored to atmospheric pressure and allowed to stand for 5 minutes. The step of reducing the pressure from ordinary pressure to −87 kPa and then restoring to atmospheric pressure was subsequently repeated 4 times, and the power storage element was then allowed to stand for 15 minutes. The pressure was again reduced from ordinary pressure to −91 kPa, and then restored to atmospheric pressure. The step of pressure reduction and restoration to atmospheric pressure in the same manner was repeated a total of 7 times (pressure reduction to −95, −96, −97, −81, −97, −97 and −97 kPa, respectively). The electrode laminated body was impregnated with the nonaqueous electrolytic solution by this procedure.

Next, the nonaqueous lithium power storage element was placed in a pressure-reducing sealing machine, and with the pressure reduced to −95 kPa, it was sealed at 180° C. for 10 seconds at a pressure of 0.1 MPa to seal the aluminum laminate package material.

[Lithium Doping Step]

The obtained nonaqueous lithium power storage element was subjected to initial charging by a method of constant-current charging using a charge/discharge apparatus (TOSCAT-3100U) by Toyo System Co., Ltd., in an environment of 25° C. with a current value of 0.5 A until reaching a voltage of 4.3 V, followed by constant voltage charge at 4.3 V continued for 36 hours, for lithium doping of the negative electrode.

[Aging Step]

The lithium-doped nonaqueous lithium power storage element was subjected to constant-current discharge in an environment of 25° C. at 0.5 A until reaching a voltage of 3.0 V, and then constant-current discharge at 3.0 V for 1 hour, to adjust the voltage to 3.0 V. The nonaqueous lithium power storage element was then stored for 48 hours in a thermostatic bath at 60° C.

[Degassing Step]

A portion of the aluminum laminate package material of the aged nonaqueous lithium power storage element was unsealed in a dry air environment with a temperature of 25° C. and a dew point of −40° C. Next, the nonaqueous lithium power storage element was placed in a pressure reduction chamber, and a step of using a diaphragm pump (N816.3KT.45.18) by KNF Co. for pressure reduction over a period of 3 minutes from atmospheric pressure to −80 kPa, followed by restoration to atmospheric pressure over a period of 3 minutes, was repeated 3 times. Next, the nonaqueous lithium power storage element was placed in a pressure-reducing sealing machine, and after pressure reduction to −90 kPa, it was sealed at 200° C. for 10 seconds at a pressure of 0.1 MPa to seal the aluminum laminate package material.

At least two nonaqueous lithium power storage elements were completed by this step.

<Evaluation of Nonaqueous Lithium Power Storage Element>

One of the obtained nonaqueous lithium power storage elements was subjected to electrostatic capacitance and Ra·F measurement and a high load charge/discharge cycling test, as described below. The other one was then subjected to pore distribution measurement of the positive electrode by mercury intrusion, positive electrode cross-sectional SEM-EDX measurement and lithium compound quantitation, as described below.

[Electrostatic Capacitance and Ra·F Measurement]

Each of the nonaqueous lithium power storage elements obtained by the steps described above was used in the method described above in a thermostatic chamber set to 25° C., using a charge/discharge apparatus (5 V, 360 A) by Fujitsu Telecom Networks, Ltd., to calculate the electrostatic capacitance F and the internal resistance Ra at 25° C., and the Ra·F and energy density E/V were obtained. The results are shown in Table 1.

[High Load Charge/Discharge Cycling Test]

Each of the nonaqueous lithium power storage elements obtained by the steps described above was used in the method described above in a thermostatic chamber set to 25° C., using a charge/discharge apparatus (5 V, 360 A) by Fujitsu Telecom Networks, Ltd., for a high load charge/discharge cycling test, the internal resistance Rb at ordinary temperature after the high load charge/discharge cycling test was calculated, and Rb/Ra was obtained. The results are shown in Table 1.

[Preparation of Positive Electrode Sample]

The obtained nonaqueous lithium power storage element was disassembled in an argon box with a dew point temperature of −72° C., and the positive electrode coated on both sides with the positive electrode active material layer was cut out to a size of 10 cm×5 cm and immersed in 30 g of a diethyl carbonate solvent, occasionally moving the positive electrode with a pincette, and was washed for 10 minutes. The positive electrode was then removed out and air-dried for 5 minutes in an argon box, and the positive electrode was immersed in 30 g of freshly prepared diethyl carbonate solvent and washed for 10 minutes by the same method as described above. The positive electrode was removed from the argon box, and a vacuum dryer (DP33 by Yamato Scientific Co., Ltd.) was used for drying for 20 hours at a temperature of 25° C. and a pressure of 1 kPa, to obtain a positive electrode sample.

[Pore Distribution Measurement of Positive Electrode by Mercury Intrusion]

A small piece with a size of 4 cm×5 cm was cut out from the positive electrode sample, and a mercury porosimeter (Autopore Model IV9510 by Micromeritics, Japan) was used to measure the pore distribution by mercury intrusion, in a pore size measurement range of 400 μm to 0.01 μm. The Vp value was calculated by the method described above, and the obtained results are shown in Table 1. The pore sizes and the log differential pore volumes at the peak top positions are shown together in Table 1, the peaks having a peak value of 0.3 mL/g or greater for the log differential pore volume in the pore size range of 0.1 μm to 100 μm being designated as P1 and P2, in order from smaller pore size.

[SEM-EDX Measurement of Positive Electrode Cross-Section]

A small 1 cm×1 cm piece was cut out from the positive electrode sample, and an SM-09020CP by JEOL Corp. was used to create a cross-section perpendicular to the in-plane direction of the positive electrode sample using argon gas, under conditions with an acceleration voltage of 4 kV and a beam diameter of 500 μm. The surface was then coated by sputtering of gold in a vacuum of 10 Pa. Next, the cut out positive electrode surface was measured by SEM and EDX with atmospheric exposure, under the conditions described below.

(SEM-EDX Measuring Conditions)
  Measuring apparatus: FE-SEM S-4700 Electrolytic emission scanning electron microscope by Hitachi High-Technologies Corp.
  Acceleration voltage: 10 kV
  Emission current: 10 μA
  Measurement magnification: 2000×
  Electron beam incident angle: 90°
  X-ray take-off angle: 30°
  Dead time: 15%
  Mapping elements: C, O, F
  Measurement pixel count 256×256 pixels
  Measuring time: 60 sec
  Number of scans: 50
  The luminance and contrast were adjusted so that the brightness had no pixel reaching the maximum luminance, and the mean value of the brightness fell within the range of 40% to 60% of luminance.

(SEM-EDX Analysis)

The images obtained from SEM and EDX of the measured positive electrode cross-section were subjected to image analysis by the method described above using image analysis software (ImageJ), and $Y_1$ and $Z_1$ were calculated. The results are shown in Table 1.

[Quantitation of Lithium Compound]

A positive electrode sample cut out to a size of 5 cm×5 cm was immersed in methanol, and the vessel was capped and allowed to stand for 3 days in an environment of 25° C. The positive electrode was then removed out and vacuum dried for 10 hours under conditions of 120° C., 5 kPa. The methanol solution after washing was measured by GC/MS under conditions with a predrawn calibration curve, and a diethyl carbonate abundance of less than 1% was confirmed. After then measuring the positive electrode weight $M_0$, the positive electrode sample was impregnated with distilled water, and the vessel was capped and allowed to stand for 3 days in an environment of 45° C. The positive electrode sample was then removed out and vacuum dried for 12 hours under conditions of 150° C., 3 kPa. The distilled water after washing was measured by GC/MS under conditions with a predrawn calibration curve, and a methanol abundance of less than 1% was confirmed. The positive electrode weight $M_1$ was then measured, a spatula, brush or bristles were used to remove the active material layer on the positive electrode power collector, and the weight $M_2$ of the positive electrode power collector was measured. The lithium compound weight W in the positive electrode was quantified by this method. The results are shown in Table 1.

Examples 2 to 28 and Comparative Examples 1 to 5

Nonaqueous lithium power storage elements for Examples 2 to 28 and Comparative Examples 1 to 5 were fabricated in the same manner as Example 1, except that the positive electrode active materials of the positive electrode precursors, the types and mean particle diameters of the lithium compounds, the compositions and negative electrodes, and the voltages and times for the lithium doping step were as shown in Table 1, and the different evaluations were carried out. The evaluation results for the obtained nonaqueous lithium power storage elements are shown in Table 1.

Comparative Example 6

<Production of Positive Electrode Precursor (Composition d)>

After mixing 87.5 parts by weight of activated carbon 1, 3.0 parts by weight of Ketchen black, 1.5 parts by weight of PVP (polyvinylpyrrolidone), 8.0 parts by weight of PVDF (polyvinylidene fluoride) and NMP (N-methylpyrrolidone), the mixture was dispersed using a FILMIX® thin-film rotating-type high-speed mixer by Primix Corp., under conditions with a peripheral velocity of 17 m/s, to obtain a coating solution. The coating solution was coated onto one or both sides of an aluminum foil with a thickness of 15 μm using a die coater by Toray Engineering Co., Ltd. under conditions with a coating speed of 1 m/s, and dried at a drying temperature of 100° C. to obtain a positive electrode precursor (composition d). The obtained positive electrode precursor was pressed using a roll press under conditions with a pressure of 4 kN/cm and a pressed portion surface temperature of 25° C.

<Production and Evaluation of Nonaqueous Lithium Power Storage Element>

Assembly, filling, impregnation and sealing of a nonaqueous lithium power storage element were carried out in the same manner as Example 1, except for using the obtained positive electrode precursor (composition d), and a negative electrode comprising a metal lithium foil corresponding to 211 mAh/g per unit weight of the negative electrode active material, attached to the negative electrode active material layer surface of the negative electrode 2.

Next, as the lithium doping step, the obtained nonaqueous lithium power storage element was stored for 72 hours in a thermostatic chamber with an environmental temperature of 45° C., for ionization of the metal lithium and doping in the negative electrode 2. The obtained nonaqueous lithium power storage element was then subjected to an aging step and degassing step in the same manner as Example 1, to produce two nonaqueous lithium power storage elements which were evaluated. The results are shown in Table 1.

The results are summarized in Table 1 below.

TABLE 1

| | Positive electrode precursor | | | | | Lithium doping | | Positive electrode | |
|---|---|---|---|---|---|---|---|---|---|
| | Positive electrode active material | Lithium compound | Lithium compound mean particle diameter (μm) | Composition | Negative electrode | Voltage (V) | Time (h) | $Y_1$ (μm) | $Z_1$ (μm) |
| Example 1 | Activated carbon 1 | $Li_2CO_3$ | 2.2 | a | Neg. electrode 1 | 4.3 | 36 | 1.5 | 4.0 |
| Example 2 | Activated carbon 1 | $Li_2CO_3$ | 2.2 | b | Neg. electrode 1 | 4.3 | 36 | 0.3 | 3.9 |
| Example 3 | Activated carbon 1 | $Li_2CO_3$ | 2.2 | c | Neg. electrode 1 | 4.3 | 36 | 0.8 | 4.0 |
| Example 4 | Activated carbon 1 | $Li_2CO_3$ | 2.2 | b | Neg. electrode 2 | 4.5 | 24 | 0.2 | 4.0 |
| Example 5 | Activated carbon 1 | $Li_2CO_3$ | 2.2 | b | Neg. electrode 2 | 4.5 | 12 | 0.5 | 3.9 |
| Example 6 | Activated carbon 2 | $Li_2CO_3$ | 2.2 | b | Neg. electrode 2 | 4.5 | 24 | 0.2 | 6.9 |
| Example 7 | Activated carbon 2 | $Li_2CO_3$ | 2.2 | a | Neg. electrode 1 | 4.3 | 36 | 0.4 | 7.0 |
| Example 8 | Activated carbon 2 | $Li_2CO_3$ | 1.5 | a | Neg. electrode 1 | 4.3 | 36 | 0.2 | 7.1 |
| Example 9 | Activated carbon 2 | $Li_2CO_3$ | 1.5 | b | Neg. electrode 2 | 4.5 | 24 | 0.1 | 6.9 |
| Example 10 | Activated carbon 2 | $Li_2CO_3$ | 4.1 | a | Neg. electrode 2 | 4.5 | 36 | 1.5 | 7.0 |
| Example 11 | Activated carbon 2 | $Li_2CO_3$ | 4.1 | a | Neg. electrode 2 | 4.5 | 12 | 2.7 | 6.8 |
| Example 12 | Activated carbon 2 | $Li_2CO_3$ | 4.1 | b | Neg. electrode 2 | 4.5 | 36 | 1.2 | 6.8 |
| Example 13 | Activated carbon 2 | $Li_2O$ | 4.1 | b | Neg. electrode 2 | 4.5 | 36 | 1.4 | 7.1 |
| Example 14 | Activated carbon 2 | LiOH | 4.1 | b | Neg. electrode 2 | 4.5 | 36 | 1.3 | 6.9 |
| Example 15 | Activated carbon 2 | $Li_2CO_3$ | 5.8 | b | Neg. electrode 2 | 4.5 | 36 | 3.4 | 7.0 |
| Example 16 | Activated carbon 2 | $Li_2CO_3$ | 9.2 | a | Neg. electrode 2 | 4.5 | 12 | 7.3 | 7.1 |
| Example 17 | Activated carbon 2 | $Li_2CO_3$ | 9.2 | b | Neg. electrode 2 | 4.5 | 36 | 3.4 | 6.9 |
| Example 18 | Activated carbon 2 | $Li_2CO_3$ | 12 | b | Neg. electrode 2 | 4.5 | 36 | 3.9 | 7.1 |
| Example 19 | Activated carbon 2 | $Li_2CO_3$ | 17 | c | Neg. electrode 2 | 4.5 | 36 | 7.9 | 7.0 |
| Example 20 | Activated carbon 2 | $Li_2CO_3$ | 22 | c | Neg. electrode 2 | 4.5 | 36 | 10.8 | 7.1 |
| Example 21 | Activated carbon 2 | $Li_2CO_3$ | 28 | c | Neg. electrode 2 | 4.5 | 36 | 15.7 | 6.8 |
| Example 22 | Activated carbon 2 | $Li_2CO_3$ | 35 | c | Neg. electrode 2 | 4.5 | 36 | 22.1 | 6.9 |
| Example 23 | Activated carbon 2 | $Li_2CO_3$ | 48 | c | Neg. electrode 2 | 4.5 | 36 | 35.2 | 7.0 |
| Example 24 | Activated carbon 3 | $Li_2CO_3$ | 4.1 | a | Neg. electrode 2 | 4.5 | 36 | 1.8 | 17.4 |
| Example 25 | Activated carbon 3 | $Li_2CO_3$ | 12 | b | Neg. electrode 2 | 4.5 | 36 | 4.2 | 17.2 |
| Example 26 | Activated carbon 3 | $Li_2CO_3$ | 35 | c | Neg. electrode 2 | 4.5 | 36 | 25.8 | 17.3 |

TABLE 1-continued

| | | | | | | | | | |
|---|---|---|---|---|---|---|---|---|---|
| Example 27 | Activated carbon 4 | Li₂CO₃ | 2.2 | b | Neg. electrode 2 | 4.5 | 24 | 0.1 | 2.5 |
| Example 28 | Activated carbon 4 | Li₂CO₃ | 2.2 | b | Neg. electrode 2 | 4.5 | 12 | 0.3 | 2.5 |
| Comp. Example 1 | Activated carbon 1 | Li₂CO₃ | 0.3 | a | Neg. electrode 1 | 4.3 | 36 | 0.05 | 4.1 |
| Comp. Example 2 | Activated carbon 2 | Li₂CO₃ | 0.3 | a | Neg. electrode 1 | 4.3 | 36 | 0.03 | 7.0 |
| Comp. Example 3 | Activated carbon 3 | Li₂CO₃ | 12 | a | Neg. electrode 2 | 4.5 | 3 | 10.4 | 17.4 |
| Comp. Example 4 | Activated carbon 1 | Li₂CO₃ | 58 | c | Neg. electrode 1 | 4.3 | 36 | 44.1 | 4.0 |
| Comp. Example 5 | Activated carbon 3 | Li₂CO₃ | 58 | c | Neg. electrode 2 | 4.5 | 36 | 42.6 | 17.3 |
| Comp. Example 6 | Activated carbon 1 | None | — | d | Neg. electrode 2 | — | — | — | 4.0 |

| | Positive electrode | | | | | Nonaqueous lithium power storage element properties | | |
|---|---|---|---|---|---|---|---|---|
| | W (wt %) | Vp (mL/g) | P1 pore size (μm) | P1 Log differential pore volume (mL/g) | P2 pore size (μm) | P2 Log differential pore volume (mL/g) | Ra · F (Ω F) | E/V (Wh/L) | Rb/Ra |

| | W (wt %) | Vp (mL/g) | P1 pore size (μm) | P1 Log differential pore volume (mL/g) | P2 pore size (μm) | P2 Log differential pore volume (mL/g) | Ra · F (Ω F) | E/V (Wh/L) | Rb/Ra |
|---|---|---|---|---|---|---|---|---|---|
| Example 1 | 17.6 | 2.12 | 0.46 | 1.23 | 0.68 | 2.12 | 1.08 | 16 | 1.09 |
| Example 2 | 5.2 | 1.12 | 0.41 | 1.63 | 1.76 | 1.23 | 1.36 | 21 | 1.22 |
| Example 3 | 10.1 | 1.75 | 0.44 | 1.49 | 1.23 | 1.68 | 1.47 | 19 | 1.12 |
| Example 4 | 2.8 | 0.92 | 0.41 | 1.52 | 1.92 | 0.82 | 2.14 | 26 | 1.17 |
| Example 5 | 5.7 | 0.75 | 0.37 | 1.75 | 1.45 | 0.68 | 2.21 | 28 | 1.38 |
| Example 6 | 1.7 | 1.32 | 0.99 | 2.31 | 1.78 | 1.03 | 1.83 | 31 | 1.34 |
| Example 7 | 4.8 | 2.45 | 0.95 | 1.64 | 1.67 | 3.12 | 0.75 | 24 | 1.25 |
| Example 8 | 4.6 | 2.71 | 0.88 | 2.52 | 1.21 | 1.74 | 0.59 | 23 | 1.23 |
| Example 9 | 1.4 | 1.16 | 0.91 | 1.34 | 1.28 | 0.92 | 1.67 | 36 | 1.19 |
| Example 10 | 13.5 | 2.67 | 1.05 | 1.06 | 2.41 | 2.89 | 1.15 | 23 | 1.28 |
| Example 11 | 35.2 | 1.06 | 1.01 | 1.12 | 1.39 | 0.62 | 1.98 | 22 | 1.81 |
| Example 12 | 6.2 | 2.34 | 1.12 | 1.36 | 2.74 | 2.42 | 1.28 | 27 | 1.34 |
| Example 13 | 7.0 | 2.23 | 1.19 | 1.45 | 2.47 | 2.19 | 2.03 | 26 | 1.63 |
| Example 14 | 6.8 | 2.12 | 1.24 | 1.23 | 2.45 | 2.23 | 2.23 | 27 | 1.72 |
| Example 15 | 8.1 | 2.11 | 1.24 | 1.51 | 2.12 | 2.14 | 1.45 | 26 | 1.37 |
| Example 16 | 44.2 | 1.11 | 1.09 | 1.63 | 1.72 | 0.73 | 1.85 | 22 | 1.45 |
| Example 17 | 9.6 | 1.76 | 1.17 | 1.78 | 4.89 | 1.90 | 1.59 | 23 | 1.4 |
| Example 18 | 11.7 | 1.37 | 1.2 | 1.97 | 6.81 | 1.79 | 1.78 | 21 | 1.45 |
| Example 19 | 18.2 | 1.69 | 1.23 | 1.62 | 7.96 | 1.32 | 1.89 | 21 | 1.58 |
| Example 20 | 20.6 | 1.52 | 1.28 | 1.63 | 10.16 | 1.15 | 2.04 | 20 | 1.67 |
| Example 21 | 23.9 | 1.32 | 1.34 | 1.73 | 11.41 | 0.98 | 2.31 | 19 | 1.75 |
| Example 22 | 26.6 | 1.14 | 1.39 | 1.86 | 11.12 | 0.71 | 2.78 | 17 | 1.82 |
| Example 23 | 30.1 | 1.02 | 1.45 | 1.98 | 10.27 | 0.58 | 2.91 | 16 | 1.91 |
| Example 24 | 15.6 | 2.13 | 1.11 | 2.26 | 2.24 | 1.05 | 1.23 | 22 | 1.37 |

TABLE 1-continued

| | | | | | | | | | |
|---|---|---|---|---|---|---|---|---|---|
| Example 25 | 12.1 | 1.01 | 2.47 | 1.83 | 7.13 | 1.42 | 1.97 | 20 | 1.58 |
| Example 26 | 27.9 | 0.79 | 2.79 | 1.41 | 8.37 | 0.59 | 2.88 | 16 | 1.87 |
| Example 27 | 2.1 | 1.01 | 0.32 | 1.31 | 1.99 | 0.87 | 1.76 | 30 | 1.12 |
| Example 28 | 4.1 | 0.85 | 0.29 | 1.49 | 1.52 | 0.74 | 1.87 | 32 | 1.29 |
| Comp. Example 1 | 0.7 | 3.05 | 0.15 | 6.10 | — | — | 1.15 | 12 | 2.23 |
| Comp. Example 2 | 0.8 | 3.56 | 0.21 | 5.90 | — | — | 0.89 | 13 | 2.04 |
| Comp. Example 3 | 50.5 | 0.65 | 1.42 | 0.45 | 2.56 | 0.89 | 3.06 | 17 | 3.15 |
| Comp. Example 4 | 35.1 | 0.61 | 0.38 | 0.81 | 12.1 | 0.39 | 3.19 | 12 | 2.89 |
| Comp. Example 5 | 33.6 | 0.68 | 2.91 | 0.95 | 13.5 | 0.45 | 3.35 | 14 | 2.24 |
| Comp. Example 6 | 0.0 | 0.59 | 0.45 | 0.72 | — | — | 3.12 | 19 | 3.23 |

Based on comparison of Examples 1 to 28 and Comparative Examples 1 to 6, it is seen that if the pore distribution of the positive electrode has at least one peak with a peak value of 1.0 mL/g to 5.0 mL/g for the log differential pore volume in the pore diameter range of 0.1 µm to 50 µm, and the total cumulative pore volume Vp is 0.7 mL/g to 3.0 mL/g in the pore diameter range of 0.1 µm to 50 µm, then the Ra F value is small (the internal resistance is low, or in other words, the input/output characteristic is high), the energy density E/V is high, the Rb/Ra value is small, and the power storage element has an excellent high load charge/discharge cycle characteristic. It is believed that these results are obtained because, for the Examples, pores remaining after oxidative decomposition of the lithium compound in the positive electrode precursor in the lithium doping step are formed in the interior of the positive electrode, resulting in satisfactory lithium ion conductivity and playing a role in reducing the internal resistance, while satisfactory pores capable of holding electrolytic solution are formed in the interior of the positive electrode, such that during high load charge/discharge cycling, ions are constantly supplied from the electrolytic solution in the pores formed near the positive electrode active material.

The second embodiment will now be explained in detail.
<Production of Positive Electrode Precursor>

The positive electrode active materials and lithium compounds shown in Table 2 were used to produce positive electrode precursors (compositions a, b and c) by the same method described above.

Example 29

<Fabrication of Nonaqueous Lithium Power Storage Element>
[Assembly and Drying of Power Storage Element]

The obtained double-sided negative electrode 1, double-sided positive electrode precursor (composition a) and single-sided positive electrode precursor (composition a), obtained as described above, were cut to 10 cm×10 cm (100 cm²). Using a single-sided positive electrode precursor (composition a) for the uppermost side and lowermost side, 21 double-sided negative electrodes 1 and 20 double-sided positive electrode precursors (composition a) were stacked, sandwiching microporous film separators each with a thickness of 15 µm between the negative electrodes and positive electrode precursors. A negative electrode terminal and positive electrode terminal were connected to the negative electrodes and positive electrode precursors, respectively, by ultrasonic welding to obtain an electrode laminated body. The electrode laminated body was vacuum dried under conditions with a temperature of 80° C., a pressure of 50 Pa and a drying time of 60 hr. The dried electrode laminated body was housed in a casing composed of an aluminum laminate package material in a dry environment with a dew point of −45° C., and the electrode terminal portion and bottom portion of the casing were heat sealed on three sides under conditions with a temperature of 180° C., a seal time of 20 sec and a seal pressure of 1.0 MPa.
[Filling, Impregnation and Sealing of Power Storage Element]

Approximately 80 g of the nonaqueous electrolytic solution was injected into the electrode laminated body housed in the aluminum laminate package material under atmospheric pressure, in a dry air environment with a temperature of 25° C. and a dew point of no higher than −40° C., in the same manner as Example 1, to form a nonaqueous lithium power storage element before lithium doping treatment. Next, the nonaqueous lithium power storage element was placed in a pressure reduction chamber and the pressure was reduced from ordinary pressure to −87 kPa, after which it was restored to atmospheric pressure and allowed to stand for 5 minutes.

The procedure of reducing the pressure from ordinary pressure to −87 kPa and then restoring to atmospheric pressure was repeated 4 times, and the power storage element was then allowed to stand for 15 minutes. The pressure was reduced from ordinary pressure to −91 kPa, and then restored to atmospheric pressure. The procedure of pressure reduction and restoration to atmospheric pressure in the same manner was repeated a total of 7 times (pressure reduction from ordinary pressure to −95, −96, −97, −81, −97, −97 and −97 kPa, respectively). The electrode laminated body was impregnated with the nonaqueous electrolytic solution by this procedure.

Next, the casing housing the electrode laminated body impregnated with the nonaqueous electrolytic solution was placed in a pressure-reduction sealing machine, and with pressure reduction to −95 kPa, it was sealed at 180° C. for 10 seconds at a pressure of 0.1 MPa to seal the aluminum laminate package material and obtain a nonaqueous lithium power storage element.

[Lithium Doping]

The obtained nonaqueous lithium power storage element was subjected to initial charging by a method of constant-current charging using a charge/discharge apparatus (TOSCAT-3100U) by Toyo System Co., Ltd., in an environment of 35° C. with a current value of 0.5 A until reaching a voltage of 4.3 V, followed by constant voltage charge at 4.3 V continued for 36 hours, for lithium doping of the negative electrode.

[Aging]

The lithium-doped nonaqueous lithium power storage element was subjected to constant-current discharge in an environment of 25° C. at 0.5 A until reaching a voltage of 3.0 V, and then constant-current discharge at 3.0 V for 1 hour, to adjust the voltage to 3.0 V. The nonaqueous lithium power storage element was then stored for 60 hours in a thermostatic bath at 50° C.

[Degassing]

A portion of the aluminum laminate package material of the aged nonaqueous lithium power storage element was unsealed in a dry air environment with a temperature of 25° C. and a dew point of −40° C. Next, the nonaqueous lithium power storage element was placed in a pressure reduction chamber, and a procedure of using a diaphragm pump (N816.3KT.45.18) by KNF Co. for pressure reduction over a period of 3 minutes from atmospheric pressure to −80 kPa, followed by restoration to atmospheric pressure over a period of 3 minutes, was repeated 3 times. The nonaqueous lithium power storage element was placed in a pressure-reducing sealing machine, and after pressure reduction to −90 kPa, it was sealed at 200° C. for 10 seconds at a pressure of 0.1 MPa to seal the aluminum laminate package material.

At least two nonaqueous lithium power storage elements were completed by this procedure.

<Evaluation of Nonaqueous Lithium Power Storage Element>

One of the obtained nonaqueous lithium power storage elements was subjected to electrostatic capacitance and Ra·F measurement and a high load charge/discharge cycling test, as described below. The other one was then subjected to positive electrode cross-section and surface SEM and SEM-EDX measurement and lithium compound quantitation, as described below.

[Electrostatic Capacitance and Ra·F Measurement]

Each of the obtained nonaqueous lithium power storage elements was used in the method described above in a thermostatic bath set to 25° C., using a charge/discharge apparatus (5 V, 360 A) by Fujitsu Telecom Networks, Ltd., to calculate the electrostatic capacitance F and the internal resistance Ra at 25° C., and the Ra·F and energy density E/V were obtained. The results are shown in Table 2.

[High Load Charge/Discharge Cycling Test]

Each of the obtained nonaqueous lithium power storage elements was used in the method described above in a thermostatic bath set to 25° C., using a charge/discharge apparatus (5 V, 360 A) by Fujitsu Telecom Networks, Ltd., for a high load charge/discharge cycling test, the internal resistance Rb at ordinary temperature after the high load charge/discharge cycling test was calculated, and Rb/Ra was obtained. The results are shown in Table 2.

[Preparation of Positive Electrode Sample]

The obtained nonaqueous lithium power storage element was disassembled in an argon box with a dew point temperature of −72° C., and the positive electrode coated on both sides with the positive electrode active material layer was cut out to a size of 10 cm×5 cm. The cut out positive electrode was immersed in 30 g of a diethyl carbonate solvent, and was washed for 10 minutes while occasionally moving the positive electrode with a pincette. The washed positive electrode was removed out and air-dried for 5 minutes in an argon box, and the positive electrode was immersed in 30 g of freshly prepared diethyl carbonate solvent and washed for 10 minutes by the same method as described above. The positive electrode was removed from the argon box, and a vacuum dryer (DP33 by Yamato Scientific Co., Ltd.) was used for drying for 20 hours at a temperature of 25° C. and a pressure of 1 kPa, to obtain a positive electrode sample.

[SEM and SEM-EDX Measurement of Positive Electrode Cross-Section]

A small 1 cm×1 cm piece was cut out from the positive electrode sample, and an SM-09020CP by JEOL Corp. was used to create a cross-section perpendicular to the in-plane direction of the positive electrode sample using argon gas, under conditions with an acceleration voltage of 4 kV and a beam diameter of 500 µm. The surface was coated with gold by sputtering in a vacuum of 10 Pa. Next, the cut out positive electrode cross-section was measured by SEM and SEM-EDX with atmospheric exposure, under the conditions described below.

(SEM Measuring Conditions)

Measuring apparatus: FE-SEM SU8220 Electrolytic emission scanning electron microscope by Hitachi High-Technologies Corp. (Lower detector used as the detector)

Acceleration voltage: 1 kV

Measurement magnification: 2000×

(SEM Analysis)

The images obtained from SEM of the measured positive electrode cross-section were subjected to image analysis by the method described above using image analysis software (ImageJ), and $A_1$, $B_1/4C_1$ and $X_1$ were calculated. The results are shown in Table 2.

(SEM-EDX Measuring Conditions)

Measuring apparatus: FE-SEM S-4700 Electrolytic emission scanning electron microscope by Hitachi High-Technologies Corp.

Acceleration voltage: 10 kV

Emission current: 10 µA

Measurement magnification: 2000×

Electron beam incident angle: 90°

X-ray take-off angle: 30°

Dead time: 15%

Mapping elements: C, O, F

Measurement pixel count 256×256 pixels

Measuring time: 60 sec

Number of scans: 50

The luminance and contrast were adjusted so that the brightness had no pixel reaching the maximum luminance, and the mean value of the brightness fell within the range of 40% to 60% of luminance.

(SEM-EDX Analysis)

The images obtained from SEM-EDX of the measured positive electrode cross-section were subjected to image analysis by the method described above using image analysis software (ImageJ), and $Y_1$, $Z_1$ and $A_3$ were calculated. The results are shown in Table 2. The presence or absence of voids surrounding the lithium compound was examined based on the SEM image, and the results are shown in Table 2.

[SEM-EDX Measurement of Positive Electrode Surface]

A small 1 cm×1 cm piece was cut out from the positive electrode sample, and the surface was coated by sputtering of gold in a vacuum of 10 Pa. The positive electrode surface was subjected to SEM-EDX measurement with atmospheric exposure, by the same method described above for the positive electrode cross-section.

The image obtained from SEM-EDX of the obtained positive electrode surface was subjected to image analysis by the method described above using image analysis software (ImageJ), and $A_2$ was calculated. The results are shown in Table 2.

[Quantitation of Lithium Compound]

A positive electrode sample cut out to a size of 5 cm×5 cm was immersed in methanol, and the vessel was capped and allowed to stand for 3 days in an environment of 25° C. The positive electrode was then removed out and vacuum dried for 10 hours under conditions of 120° C., 5 kPa. The methanol solution after washing was measured by GC/MS under conditions with a predrawn calibration curve, and a diethyl carbonate abundance of less than 1% was confirmed. After then measuring the positive electrode weight $M_0$, the positive electrode sample was impregnated with distilled water, and the vessel was capped and allowed to stand for 3 days in an environment of 45° C. The positive electrode sample was then removed out and vacuum dried for 12 hours under conditions of 150° C., 3 kPa. The distilled water after washing was measured by GC/MS under conditions with a predrawn calibration curve, and a methanol abundance of less than 1% was confirmed. The positive electrode weight $M_1$ was measured, a spatula, brush or bristles were used to remove the active material layer on the positive electrode power collector, and the weight $M_2$ of the positive electrode power collector was measured. The lithium compound weight W in the positive electrode was quantified by this method. The results are shown in Table 2.

Examples 30 to 56 and Comparative Examples 7 to 11

Nonaqueous lithium power storage elements for Examples 30 to 56 and Comparative Examples 7 to 11 were fabricated in the same manner as Example 29, except that the positive electrode active materials of the positive electrode precursors, the types and mean particle diameters of the lithium compounds, the compositions and negative electrodes, and the voltages and times for the lithium doping were as shown in Table 2, and the different evaluations were carried out. The evaluation results for the obtained nonaqueous lithium power storage elements are shown in Table 2.

Comparative Example 12

<Production of Positive Electrode Precursor (Composition d)>

After mixing 87.5 parts by weight of activated carbon 1, 3.0 parts by weight of Ketchen black, 1.5 parts by weight of PVP (polyvinylpyrrolidone), 8.0 parts by weight of PVdF (polyvinylidene fluoride) and NMP (N-methylpyrrolidone), the mixture was dispersed using a FILMIX® thin-film rotating-type high-speed mixer by Primix Corp., under conditions with a peripheral velocity of 17 m/s, to obtain a coating solution. The coating solution was coated onto one or both sides of an aluminum foil with a thickness of 15 μm using a die coater by Toray Engineering Co., Ltd. under conditions with a coating speed of 1 m/s, and dried at a drying temperature of 100° C. to obtain a positive electrode precursor. The obtained positive electrode precursor was pressed using a roll press under conditions with a pressure of 4 kN/cm and a pressed portion surface temperature of 25° C., to obtain a positive electrode precursor (composition d).

<Production and Evaluation of Nonaqueous Lithium Power Storage Element>

Assembly, filling, impregnation and sealing of a nonaqueous lithium power storage element were carried out in the same manner as Example 29, except for using the obtained positive electrode precursor (composition d), and a negative electrode comprising a metal lithium foil corresponding to 211 mAh/g per unit weight of the negative electrode active material, attached to the surface of the negative electrode active material layer of negative electrode 2.

Next, for lithium doping, the obtained nonaqueous lithium power storage element was stored for 72 hours in a thermostatic chamber with an environmental temperature of 45° C., for ionization of the metal lithium and doping in the negative electrode 2. The obtained nonaqueous lithium power storage element was then subjected to aging and degassing in the same manner as Example 29, to produce at least two nonaqueous lithium power storage elements which were evaluated in the same manner as Example 29. The results are shown in Table 2.

TABLE 2

| | Positive electrode precursor | | | | | Lithium doping | | Positive electrode | | |
|---|---|---|---|---|---|---|---|---|---|---|
| | Positive electrode active material | Lithium compound | Lithium compound mean particle diameter (μm) | Composition | Negative electrode | Voltage (V) | Time (h) | $A_1$ (%) | $B_1/4C_1$ | $A_2$ (%) |
| Example 29 | Activated carbon 1 | $Li_2CO_3$ | 2.4 | a | Negative electrode 1 | 4.3 | 36 | 41.2 | 2.45 | 78.2 |
| Example 30 | Activated carbon 1 | $Li_2CO_3$ | 2.4 | b | Negative electrode 1 | 4.3 | 36 | 25.2 | 1.78 | 69.2 |
| Example 31 | Activated carbon 1 | $Li_2CO_3$ | 2.4 | c | Negative electrode 1 | 4.3 | 36 | 34.5 | 2.21 | 72.6 |
| Example 32 | Activated carbon 1 | $Li_2CO_3$ | 2.4 | b | Negative electrode 2 | 4.5 | 24 | 18.4 | 1.56 | 62.1 |
| Example 33 | Activated carbon 1 | $Li_2CO_3$ | 2.4 | b | Negative electrode 2 | 4.5 | 12 | 11.8 | 1.19 | 55.2 |

TABLE 2-continued

| | | | | | | | | | | |
|---|---|---|---|---|---|---|---|---|---|---|
| Example 34 | Activated carbon 2 | Li$_2$CO$_3$ | 2.4 | b | Negative electrode 2 | 4.5 | 24 | 28.4 | 2.24 | 85.2 |
| Example 35 | Activated carbon 2 | Li$_2$CO$_3$ | 2.4 | a | Negative electrode 1 | 4.3 | 36 | 49.5 | 3.14 | 89.3 |
| Example 36 | Activated carbon 2 | Li$_2$CO$_3$ | 1.6 | a | Negative electrode 1 | 4.3 | 36 | 53.6 | 3.25 | 94.7 |
| Example 37 | Activated carbon 2 | Li$_2$CO$_3$ | 1.6 | b | Negative electrode 2 | 4.5 | 24 | 22.3 | 1.84 | 85.4 |
| Example 38 | Activated carbon 2 | Li$_2$CO$_3$ | 4.5 | a | Negative electrode 2 | 4.5 | 36 | 58.1 | 3.14 | 92.4 |
| Example 39 | Activated carbon 2 | Li$_2$CO$_3$ | 4.5 | a | Negative electrode 2 | 4.5 | 12 | 13.9 | 1.31 | 46.2 |
| Example 40 | Activated carbon 2 | Li$_2$CO$_3$ | 4.5 | b | Negative electrode 2 | 4.5 | 36 | 43.2 | 1.93 | 91.3 |
| Example 41 | Activated carbon 2 | Li$_2$O | 4.5 | b | Negative electrode 2 | 4.5 | 36 | 42.3 | 1.88 | 90.4 |
| Example 42 | Activated carbon 2 | LiOH | 4.5 | b | Negative electrode 2 | 4.5 | 36 | 41.8 | 1.81 | 88.4 |
| Example 43 | Activated carbon 2 | Li$_2$CO$_3$ | 6.1 | b | Negative electrode 2 | 4.5 | 36 | 37.5 | 1.88 | 87.2 |
| Example 44 | Activated carbon 2 | Li$_2$CO$_3$ | 9.1 | a | Negative electrode 2 | 4.5 | 12 | 22.6 | 2.23 | 61.6 |
| Example 45 | Activated carbon 2 | Li$_2$CO$_3$ | 9.1 | b | Negative electrode 2 | 4.5 | 36 | 31.5 | 1.81 | 84.5 |
| Example 46 | Activated carbon 2 | Li$_2$CO$_3$ | 13 | b | Negative electrode 2 | 4.5 | 36 | 26.2 | 1.74 | 79.2 |
| Example 47 | Activated carbon 2 | Li$_2$CO$_3$ | 18 | c | Negative electrode 2 | 4.5 | 36 | 30.7 | 1.61 | 73.8 |
| Example 48 | Activated carbon 2 | Li$_2$CO$_3$ | 23 | c | Negative electrode 2 | 4.5 | 36 | 28.1 | 1.52 | 69.1 |
| Example 49 | Activated carbon 2 | Li$_2$CO$_3$ | 29 | c | Negative electrode 2 | 4.5 | 36 | 25.7 | 1.43 | 63.6 |
| Example 50 | Activated carbon 2 | Li$_2$CO$_3$ | 34 | c | Negative electrode 2 | 4.5 | 36 | 23.5 | 1.32 | 58.1 |
| Example 51 | Activated carbon 2 | Li$_2$CO$_3$ | 47 | c | Negative electrode 2 | 4.5 | 36 | 21.4 | 1.12 | 53.8 |
| Example 52 | Activated carbon 3 | Li$_2$CO$_3$ | 4.5 | a | Negative electrode 2 | 4.5 | 36 | 32.4 | 2.53 | 86.6 |
| Example 53 | Activated carbon 3 | Li$_2$CO$_3$ | 13 | b | Negative electrode 2 | 4.5 | 36 | 18.1 | 1.34 | 77.3 |
| Example 54 | Activated carbon 3 | Li$_2$CO$_3$ | 34 | c | Negative electrode 2 | 4.5 | 36 | 15.2 | 1.08 | 55.3 |
| Example 55 | Activated carbon 4 | Li$_2$CO$_3$ | 2.4 | b | Negative electrode 2 | 4.5 | 24 | 20.2 | 1.81 | 57.4 |
| Example 56 | Activated carbon 4 | Li$_2$CO$_3$ | 2.4 | b | Negative electrode 2 | 4.5 | 12 | 13.2 | 1.36 | 51.1 |
| Comp. Example 7 | Activated carbon 1 | Li$_2$CO$_3$ | 0.3 | a | Negative electrode 1 | 4.3 | 36 | 60.3 | 3.53 | 88.6 |
| Comp. Example 8 | Activated carbon 2 | Li$_2$CO$_3$ | 0.3 | a | Negative electrode 1 | 4.3 | 36 | 65.1 | 3.71 | 99.1 |
| Comp. Example 9 | Activated carbon 3 | Li$_2$CO$_3$ | 13 | a | Negative electrode 2 | 4.5 | 3 | 9.5 | 0.98 | 37.3 |
| Comp. Example 10 | Activated carbon 1 | Li$_2$CO$_3$ | 59 | c | Negative electrode 1 | 4.3 | 36 | 8.2 | 0.95 | 32.5 |
| Comp. Example 11 | Activated carbon 3 | Li$_2$CO$_3$ | 59 | c | Negative electrode 2 | 4.5 | 36 | 9.3 | 0.91 | 39.1 |
| Comp. Example 12 | Activated carbon 1 | None | — | d | Negative electrode 2 | — | — | 7.3 | 0.93 | 14.2 |

| | Positive electrode | | | | | Nonaqueous lithium power storage element properties | | |
|---|---|---|---|---|---|---|---|---|
| | $A_3$ (%) | $X_1$ (μm) | $Y_1$ (μm) | $Z_1$ (μm) | W (wt %) | Voids surrounding lithium compound | Ra · F (ΩF) | E/V (Wh/L) | Rb/Ra |
| Example 29 | 38.3 | 2.3 | 1.4 | 3.9 | 17.2 | Yes | 1.06 | 16 | 1.08 |
| Example 30 | 29.7 | 1.7 | 0.3 | 4.0 | 4.8 | Yes | 1.33 | 22 | 1.21 |
| Example 31 | 33.5 | 2.0 | 0.7 | 3.9 | 9.9 | Yes | 1.43 | 19 | 1.13 |

TABLE 2-continued

|  |  |  |  |  |  |  |  |  |
|---|---|---|---|---|---|---|---|---|
| Example 32 | 23.5 | 1.5 | 0.2 | 4.0 | 2.7 | Yes | 2.12 | 25 | 1.18 |
| Example 33 | 18.2 | 1.1 | 0.4 | 3.9 | 5.6 | Yes | 2.18 | 28 | 1.36 |
| Example 34 | 48.3 | 1.8 | 0.2 | 6.8 | 1.6 | Yes | 1.78 | 31 | 1.34 |
| Example 35 | 51.2 | 2.1 | 0.3 | 7.1 | 4.7 | Yes | 0.73 | 23 | 1.26 |
| Example 36 | 56.2 | 1.2 | 0.2 | 7.0 | 4.4 | Yes | 0.56 | 22 | 1.21 |
| Example 37 | 47.5 | 1.3 | 0.1 | 6.9 | 1.3 | Yes | 1.62 | 37 | 1.17 |
| Example 38 | 55.3 | 3.8 | 1.6 | 7.0 | 13.3 | Yes | 1.12 | 24 | 1.26 |
| Example 39 | 14.5 | 3.2 | 2.9 | 6.8 | 33.6 | Yes | 1.95 | 23 | 1.80 |
| Example 40 | 57.2 | 3.9 | 1.4 | 6.9 | 5.9 | Yes | 1.24 | 27 | 1.33 |
| Example 41 | 55.2 | 3.7 | 1.5 | 7.1 | 6.8 | Yes | 2.01 | 26 | 1.61 |
| Example 42 | 53.7 | 3.6 | 1.4 | 7.0 | 6.6 | Yes | 2.18 | 28 | 1.72 |
| Example 43 | 49.6 | 4.7 | 3.3 | 6.9 | 7.9 | Yes | 1.41 | 27 | 1.35 |
| Example 44 | 31.2 | 4.9 | 7.4 | 7.1 | 43.1 | Yes | 1.86 | 23 | 1.41 |
| Example 45 | 42.1 | 5.8 | 5.1 | 7.0 | 10.1 | Yes | 1.58 | 23 | 1.37 |
| Example 46 | 34.6 | 7.2 | 7.0 | 7.1 | 10.8 | Yes | 1.75 | 22 | 1.41 |
| Example 47 | 30.2 | 9.2 | 10.2 | 7.0 | 17.8 | Yes | 1.85 | 21 | 1.52 |
| Example 48 | 25.1 | 11.3 | 12.6 | 6.9 | 20.2 | Yes | 2.01 | 20 | 1.62 |
| Example 49 | 20.8 | 13.6 | 16.3 | 6.8 | 22.7 | Yes | 2.27 | 20 | 1.69 |
| Example 50 | 16.3 | 17.2 | 22.5 | 7.0 | 25.1 | Yes | 2.71 | 18 | 1.78 |
| Example 51 | 12.5 | 19.8 | 33.1 | 7.1 | 28.3 | Yes | 2.83 | 17 | 1.90 |
| Example 52 | 54.7 | 4.3 | 1.9 | 17.6 | 15.2 | Yes | 1.21 | 22 | 1.34 |
| Example 53 | 32.8 | 8.1 | 4.5 | 17.4 | 11.9 | Yes | 1.92 | 21 | 1.55 |
| Example 54 | 15.2 | 19.3 | 23.2 | 17.2 | 25.2 | Yes | 2.81 | 16 | 1.82 |
| Example 55 | 20.2 | 1.7 | 0.1 | 2.5 | 2.0 | Yes | 1.74 | 29 | 1.13 |
| Example 56 | 13.5 | 1.3 | 0.3 | 2.5 | 4.3 | Yes | 1.85 | 32 | 1.31 |
| Comp. Example 7 | 43.6 | 0.6 | 0.04 | 4.2 | 0.6 | Yes | 1.14 | 12 | 2.19 |
| Comp. Example 8 | 61.4 | 1.1 | 0.03 | 6.9 | 0.7 | Yes | 0.89 | 14 | 2.01 |
| Comp. Example 9 | 9.6 | 3.6 | 10.8 | 17.6 | 50.3 | Yes | 3.08 | 17 | 3.12 |
| Comp. Example 10 | 7.9 | 28.2 | 45.2 | 4.1 | 33.2 | Yes | 3.18 | 12 | 2.82 |
| Comp. Example 11 | 8.3 | 32.1 | 43.6 | 17.5 | 32.5 | Yes | 3.27 | 13 | 2.21 |
| Comp. Example 12 | 2.7 | 0.4 | — | 4.0 | 0.0 | — | 3.07 | 20 | 3.21 |

Based on comparison of Examples 29 to 56 and Comparative Examples 7 to 12, it is seen that if the proportion $A_1$ of voids with an area of 0.2 μm² to 250 μm² in the cross-sectional SEM image of the positive electrode active material layer is 10% to 60% per unit area of the positive electrode active material layer, then the Ra·F value is small (the internal resistance is low, or in other words, the input/output characteristic is high), the energy density E/V is high, the Rb/Ra value is small, and the power storage element has an excellent high load charge/discharge cycle characteristic. Without being limited to theory, it is believed that these results are obtained because, for the Examples, pores are formed in the interior of the positive electrode by oxidative decomposition of the lithium compound in the positive electrode precursor by lithium doping, resulting in satisfactory lithium ion conductivity and reducing the internal resistance, while satisfactory pores capable of holding electrolytic solution are formed in the interior of the positive electrode, such that during high load charge/discharge cycling, ions are constantly supplied from the electrolytic solution in the pores formed near the positive electrode active material.

The third embodiment will now be explained in detail.

<Preparation of Positive Electrode Active Material>

[Preparation of Activated Carbon 5]

Crushed coconut shell carbide was subjected to carbonization in a small carbonizing furnace, at 550° C. for 3 hours under a nitrogen atmosphere, to obtain a carbide. The obtained carbide was placed in an activating furnace, water vapor was introduced into the activating furnace at 1 kg/h in a heated state using a preheating furnace, and the temperature was increased to 800° C. over 6 hours for activation. The activated carbide was cooled under a nitrogen atmosphere to obtain activated carbon. The obtained activated carbon was flow-rinsed for 10 hours, drained, and dried for 10 hours in an electrodesiccator held at 115° C., and then it was pulverized for 1 hour with a ball mill to obtain activated carbon 5.

A laser diffraction particle diameter distribution analyzer (SALD-2000J) by Shimadzu Corp. was used to measure the mean particle diameter of the activated carbon 5, which was found to be 8.8 rm. A pore distribution measuring apparatus (AUTOSORB-1 AS-1-MP) by Yuasa-Ionics, Inc. was also used to measure the pore distribution. As a result, the BET specific surface area was 1880 m$^2$/g, the mesopore volume ($V_1$) was 0.33 cc/g, the micropore volume ($V_2$) was 0.80 cc/g, and $V_1/V_2=0.41$.

[Preparation of Activated Carbon 6]

A phenol resin was subjected to carbonization in a firing furnace at 600° C. for 2 hours under a nitrogen atmosphere, and was then pulverized with a ball mill and sorted, to obtain a carbide having a mean particle diameter of 3.5 μm. The carbide and KOH were mixed at a weight ratio of 1:4, and heated for 1 hour in a firing furnace at 800° C. under a nitrogen atmosphere for activation, to obtain activated carbon. The obtained activated carbon was stirred and washed for 1 hour in dilute hydrochloric acid adjusted to a concentration of 2 mol/L, and then boiled and washed with distilled water until the pH stabilized to between 5 and 6, after which it was dried to produce activated carbon 6.

A laser diffraction particle diameter distribution analyzer (SALD-2000J) by Shimadzu Corp. was used to measure the mean particle diameter of the activated carbon 6, which was found to be 3.4 μm. A pore distribution measuring apparatus (AUTOSORB-1 AS-1-MP) by Yuasa-Ionics, Inc. was also used to measure the pore distribution. As a result, the BET specific surface area was 2612 m$^2$/g, the mesopore volume ($V_1$) was 0.94 cc/g, the micropore volume ($V_2$) was 1.41 cc/g, and $V_1/V_2=0.67$.

[Preparation of Activated Carbon 7]

The phenol resin was subjected to carbonization in a firing furnace at 580° C. for 2 hours under a nitrogen atmosphere, and was then pulverized with a ball mill and sorted, to obtain a carbide having a mean particle diameter of 6.8 μm. The carbide and KOH were mixed at a weight ratio of 1:5, and heated for 1 hour in a firing furnace at 800° C. under a nitrogen atmosphere for activation, to obtain activated carbon. The obtained activated carbon was stirred and washed for 1 hour in dilute hydrochloric acid adjusted to a concentration of 2 mol/L, and then boiled and washed with distilled water until the pH stabilized to between 5 and 6, after which it was dried to produce activated carbon 7.

A laser diffraction particle diameter distribution analyzer (SALD-2000J) by Shimadzu Corp. was used to measure the mean particle diameter of the activated carbon 7, which was found to be 6.7 μm. A pore distribution measuring apparatus (AUTOSORB-1 AS-1-MP) by Yuasa-Ionics, Inc. was also used to measure the pore distribution. As a result, the BET specific surface area was 3328 m$^2$/g, the mesopore volume ($V_1$) was 1.55 cc/g, the micropore volume ($V_2$) was 2.01 cc/g, and $V_1/V_2=0.77$.

[Preparation of Activated Carbon 8]

The phenol resin was subjected to carbonization in a firing furnace at 600° C. for 2 hours under a nitrogen atmosphere, and was then pulverized with a ball mill and sorted, to obtain a carbide having a mean particle diameter of 2.0 μm. The carbide and KOH were mixed at a weight ratio of 1:4, and heated for 1 hour in a firing furnace at 800° C. under a nitrogen atmosphere for activation, to obtain activated carbon. The obtained activated carbon was stirred and washed for 1 hour in dilute hydrochloric acid adjusted to a concentration of 2 mol/L, and then boiled and washed with distilled water until the pH stabilized to between 5 and 6, after which it was dried to produce activated carbon 8.

A laser diffraction particle diameter distribution analyzer (SALD-2000J) by Shimadzu Corp. was used to measure the mean particle diameter of the activated carbon 8, which was found to be 1.8 μm. A pore distribution measuring apparatus (AUTOSORB-1 AS-1-MP) by Yuasa-Ionics, Inc. was also used to measure the pore distribution. As a result, the BET specific surface area was 2705 m$^2$/g, the mesopore volume ($V_1$) was 0.91 cc/g, the micropore volume ($V_2$) was 1.43 cc/g, and $V_1/V_2=0.64$.

<Production of Positive Electrode Precursor>

[Production of Positive Electrode Precursor (Composition b)]

One of activated carbons 1 and 5 to 8 was used as the positive electrode active material to produce a positive electrode precursor (composition b) by the method described below.

After mixing 60.0 parts by weight of one of activated carbons 1 and 5 to 8, 27.5 parts by weight of lithium carbonate, lithium oxide or lithium hydroxide having the mean particle diameter shown in Table 3, as a lithium compound, 3.0 parts by weight of Ketchen black, 1.5 parts by weight of PVP (polyvinylpyrrolidone), 8.0 parts by weight of PVdF (polyvinylidene fluoride) and NMP (N-methylpyrrolidone), the mixture was dispersed using a FILMIX® thin-film rotating-type high-speed mixer by Primix Corp., under conditions with a peripheral velocity of 17.0 m/s, to obtain a coating solution. The coating solution was coated onto one or both sides of an aluminum foil with a thickness of 15 μm using a die coater by Toray Engineering Co., Ltd. under conditions with a coating speed of 1 m/s, and dried at a drying temperature of 100° C. to obtain a positive electrode precursor. The obtained positive electrode precursor was pressed using a roll press under conditions with a pressure of 4 kN/cm and a pressed portion surface temperature of 25° C. By arbitrary adjustment of the coating amount, a positive electrode precursor was obtained having a positive electrode active material layer thickness of 20 to 100 μm on each side. The thickness of the positive electrode active material layer was determined by subtracting the thickness of the aluminum foil from the average thickness measured at 10 arbitrary locations using a Linear Gauge Sensor GS-551 by Ono Sokki Co., Ltd.

[Production of Positive Electrode Precursor (Composition e)]

One of activated carbons 1 and 5 to 7 was used as the positive electrode active material to produce a positive electrode precursor (composition e) by the method described below.

After mixing 32.0 parts by weight of one of activated carbons 1 and 5 to 7, 55.0 parts by weight of lithium carbonate having a mean particle diameter of 5.2 μm, as a lithium compound, 3.0 parts by weight of acetylene black and 10.0 parts by weight of PTFE (polytetrafluoroethylene), the obtained mixture was press molded to fabricate a positive electrode sheet. The fabricated sheet was adhered onto one or both sides of an aluminum foil with a thickness of 15 μm using conductive paste, and vacuum dried at 170° C. for 10 hours. By arbitrary adjustment of the basis weight, a positive electrode precursor was obtained having a positive electrode active material layer thickness of 150 to 250 μm on each side. The thickness of the positive electrode active material layer was determined by subtracting the thickness of the aluminum foil from the average thickness measured at 10 arbitrary locations using a Linear Gauge Sensor GS-551 by Ono Sokki Co., Ltd.

<Preparation of Negative Electrode>
[Preparation of Negative Electrode 3]

The obtained composite carbon material 1 was used as a negative electrode active material to produce negative electrode 3, in the following manner.

After mixing 85 parts by weight of composite carbon material 1, 10 parts by weight of acetylene black, 5 parts by weight of PVdF (polyvinylidene fluoride) and NMP (N-methylpyrrolidone), the mixture was dispersed using a FILMIX® thin-film rotating-type high-speed mixer by Primix Corp., under conditions with a peripheral velocity of 15 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,789 mPa·s and the TI value was 4.3. The coating solution was coated onto both sides of an electrolytic copper foil with a thickness of 10 μm using a die coater by Toray Engineering Co., Ltd. under conditions with a coating speed of 1 m/s, and dried at a drying temperature of 85° C. to obtain negative electrode 3. The obtained negative electrode 3 was pressed using a roll press under conditions with a pressure of 4 kN/cm and a pressed portion surface temperature of 25° C. The thickness of the negative electrode active material layer of the obtained negative electrode 3 was determined by subtracting the thickness of the copper foil from the average thickness measured at 10 arbitrary locations of negative electrode 3 using a Linear Gauge Sensor GS-551 by Ono Sokki Co., Ltd. As a result, the thickness per side of the negative electrode active material layers of negative electrode 3 was 100 μm.

[Preparation of Negative Electrode 4]

The obtained composite carbon material 2 was used as a negative electrode active material to produce negative electrode 4, in the following manner.

After mixing 80 parts by weight of composite carbon material 2, 8 parts by weight of acetylene black, 12 parts by weight of PVdF (polyvinylidene fluoride) and NMP (N-methylpyrrolidone), the mixture was dispersed using a FILMIX® thin-film rotating-type high-speed mixer by Primix Corp., under conditions with a peripheral velocity of 15 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,798 mPa·s and the TI value was 2.7. The coating solution was coated onto both sides of an electrolytic copper foil with a thickness of 10 μm using a die coater by Toray Engineering Co., Ltd. under conditions with a coating speed of 1 m/s, and dried at a drying temperature of 85° C. to obtain negative electrode 4. The obtained negative electrode 4 was pressed using a roll press under conditions with a pressure of 4 kN/cm and a pressed portion surface temperature of 25° C. The thickness of the negative electrode active material layer of the obtained negative electrode 4 was determined by subtracting the thickness of the copper foil from the average thickness measured at 10 arbitrary locations of negative electrode 4 using a Linear Gauge Sensor GS-551 by Ono Sokki Co., Ltd. As a result, the thickness per side of the negative electrode active material layers of negative electrode 4 was 35 μm.

Example 57

<Fabrication of Nonaqueous Lithium Power Storage Element>
[Assembly and Drying of Power Storage Element]

The obtained double-sided positive electrode precursor (activated carbon 1, composition b, thickness of positive electrode active material layer per side: 25 μm), the double-sided negative electrode 4, and the single-sided positive electrode precursor (activated carbon 1, composition b, thickness of positive electrode active material layer per side: 25 μm) were cut to 10 cm×10 cm (100 cm²). Using a single-sided positive electrode precursor for the uppermost side and lowermost side, 21 double-sided negative electrodes 4 and 20 double-sided positive electrode precursors were stacked, sandwiching microporous film separators each with a thickness of 15 μm between the negative electrodes and positive electrode precursors. A negative electrode terminal and positive electrode terminal were connected to the negative electrodes and positive electrode precursors, respectively, by ultrasonic welding to obtain an electrode laminated body. The electrode laminated body was vacuum dried under conditions with a temperature of 80° C., a pressure of 50 Pa and a drying time of 60 hr. The dried electrode laminated body was housed in a casing composed of an aluminum laminate package material in a dry environment with a dew point of −45° C., and the electrode terminal portion and bottom portion of the casing were heat sealed on three sides under conditions with a temperature of 180° C., a seal time of 20 sec and a seal pressure of 1.0 MPa.

[Filling, Impregnation and Sealing of Power Storage Element]

Approximately 80 g of the nonaqueous electrolytic solution was injected into the electrode laminated body housed in the aluminum laminate package material under atmospheric pressure, in a dry air environment with a temperature of 25° C. and a dew point of no higher than −40° C., in the same manner as Example 1, to form a nonaqueous lithium power storage element before lithium doping treatment. Next, the nonaqueous lithium power storage element was placed in a pressure reduction chamber and the pressure was reduced from ordinary pressure to −87 kPa, after which it was restored to atmospheric pressure and allowed to stand for 5 minutes. The procedure of reducing the pressure from ordinary pressure to −87 kPa and then restoring to atmospheric pressure was repeated 4 times, and the power storage element was then allowed to stand for 15 minutes. The pressure was reduced from ordinary pressure to −91 kPa, and then restored to atmospheric pressure. The procedure of pressure reduction and restoration to atmospheric pressure in the same manner was repeated a total of 7 times (pressure reduction from ordinary pressure to −95, −96, −97, −81, −97, −97 and −97 kPa, respectively). The electrode laminated body was impregnated with the nonaqueous electrolytic solution by this procedure.

Next, the casing housing the electrode laminated body impregnated with the nonaqueous electrolytic solution was placed in a pressure-reducing sealing machine, and with pressure reduction to −95 kPa, it was sealed at 180° C. for 10 seconds at a pressure of 0.1 MPa to seal the aluminum laminate package material and obtain a nonaqueous lithium power storage element.

[Lithium Doping]

The obtained nonaqueous lithium power storage element was subjected to initial charging by a method of constant-current charging using a charge/discharge apparatus (TOSCAT-3100U) by Toyo System Co., Ltd., in an environment of 55° C. with a current value of 0.5 A until reaching a voltage of 4.5 V, followed by constant voltage charge at 4.5 V continued for 1 hour, for lithium doping of the negative electrode.

[Aging]

The lithium-doped nonaqueous lithium power storage element was subjected to constant-current discharge in an environment of 25° C. at 0.5 A until reaching a voltage of 3.0 V, and then constant-current discharge at 3.0 V for 1 hour, to adjust the voltage to 3.0 V. The nonaqueous lithium power storage element was then stored for 12 hours in a thermostatic bath at 60° C.

[Degassing]

A portion of the aluminum laminate package material of the aged nonaqueous lithium power storage element was unsealed in a dry air environment with a temperature of 25° C. and a dew point of −40° C. Next, the nonaqueous lithium power storage element was placed in a pressure reduction chamber, and a procedure of using a diaphragm pump (N816.3KT.45.18) by KNF Co. for pressure reduction over a period of 3 minutes from atmospheric pressure to −80 kPa, followed by restoration to atmospheric pressure over a period of 3 minutes, was repeated 3 times. The nonaqueous lithium power storage element was placed in a pressure-reducing sealing machine, and after pressure reduction to −90 kPa, it was sealed at 200° C. for 10 seconds at a pressure of 0.1 MPa to seal the aluminum laminate package material.

At least two nonaqueous lithium power storage elements were completed by this procedure.

<Evaluation of Nonaqueous Lithium Power Storage Elements>

One of the obtained nonaqueous lithium power storage elements was subjected to electrostatic capacitance and Ra·F measurement and a high load charge/discharge cycling test, as described below. The other one was subjected to pore distribution measurement of the positive electrode by gas adsorption, pore distribution measurement of the positive electrode by mercury intrusion, positive electrode cross-sectional SEM-EDX measurement and lithium compound quantitation, as described below.

[Electrostatic Capacitance and Ra·F Measurement]

Each of the obtained nonaqueous lithium power storage elements was used in the method described above in a thermostatic bath set to 25° C., using a charge/discharge apparatus (5 V, 360 A) by Fujitsu Telecom Networks, Ltd., to calculate the electrostatic capacitance F and the internal resistance Ra at 25° C., and the Ra·F and energy density E/V were obtained. The results are shown in Table 4.

[High Load Charge/Discharge Cycling Test]

Each of the obtained nonaqueous lithium power storage elements was used in the method described above in a thermostatic bath set to 25° C., using a charge/discharge apparatus (5 V, 360 A) by Fujitsu Telecom Networks, Ltd., for a high load charge/discharge cycling test, the internal resistance Rb at ordinary temperature after the high load charge/discharge cycling test was calculated, and Rb/Ra was obtained. The results are shown in Table 4.

[Preparation of Positive Electrode Sample]

The obtained nonaqueous lithium power storage element was disassembled in an argon box with a dew point temperature of −72° C., and the positive electrode coated on both sides with the positive electrode active material layer was cut out to a size of 10 cm×5 cm. The cut out positive electrode was immersed in 30 g of a diethyl carbonate solvent, and was washed for 10 minutes while occasionally moving the positive electrode with a pincette. The washed positive electrode was removed out and air-dried for 5 minutes in an argon box, and the positive electrode was immersed in 30 g of freshly prepared diethyl carbonate solvent and washed for 10 minutes by the same method as described above. The positive electrode was removed from the argon box, and a vacuum dryer (DP33 by Yamato Scientific Co., Ltd.) was used for drying for 20 hours at a temperature of 25° C. and a pressure of 1 kPa, to obtain a positive electrode sample.

[Measurement of Pore Distribution of Positive Electrode by Gas Adsorption]

(Nitrogen Gas Adsorption Measurement)

A small piece with a size of 2 cm×2 cm was cut out from the positive electrode sample and divided into equal sizes of 0.5 cm×0.5 cm, and the pore distribution was measured under the following conditions.

Measuring apparatus: Pore distribution measuring apparatus (AUTOSORB-1 AS-1-MP) by Yuasa-Ionics, Inc.
    Pretreatment: 20 hours deaeration at 200° C. (in a vacuum)
    Adsorption gas: nitrogen
    Measuring temperature: 77K A, B, D and A/B were calculated from the measured pore distribution data, by the methods described above. The results are shown in Table 4.

(Carbon Dioxide Gas Adsorption Measurement)

A small piece with a size of 5 cm×5 cm was cut out from the positive electrode sample and divided into equal sizes of 0.5 cm×0.5 cm, and the pore distribution was measured under the following conditions.

Measuring apparatus: Pore distribution measuring apparatus (AUTOSORB-iQ-MP) by Quantachrome Instruments
    Pretreatment: 20 hours deaeration at 200° C. (in a vacuum) Adsorption gas: carbon dioxide
    Measuring temperature: 273K
    Micropore analysis: Using slit pore analytical model according to NLDFT method C was calculated from the measured pore distribution data, by the method described above. The results are shown in Table 4.

[Pore Distribution Measurement of Positive Electrode by Mercury Intrusion]

A small piece with a size of 4 cm×5 cm was cut out from the positive electrode sample, and a mercury porosimeter (Autopore Model IV9510 by Micromeritics, Japan) was used to measure the pore distribution by mercury intrusion, in a pore size measurement range of 400 μm to 0.01 μm. Vp was calculated by the method described above. The pore sizes and the log differential pore volumes at the peak top positions were determined, the peaks having a peak value of 0.3 mL/g or greater for the log differential pore volume in the pore size range of 0.1 μm to 100 μm being designated as P1 and P2, in order from smaller pore size. The results are shown in Table 4.

[SEM-EDX Measurement of Positive Electrode Cross-Section]

A small 1 cm×1 cm piece was cut out from the positive electrode sample, and an SM-09020CP by JEOL Corp. was used to create a cross-section perpendicular to the in-plane direction of the positive electrode sample using argon gas, under conditions with an acceleration voltage of 4 kV and a beam diameter of 500 μm. The surface was coated with gold by sputtering in a vacuum of 10 Pa. Next, the cut out positive electrode surface was measured by SEM and EDX with atmospheric exposure, under the conditions described below.

(SEM-EDX Measuring Conditions)
    Measuring apparatus: FE-SEM S-4700 Electrolytic emission scanning electron microscope by Hitachi High-Technologies Corp.
    Acceleration voltage: 10 kV
    Emission current: 10 μA
    Measurement magnification: 2000×
    Electron beam incident angle: 90°
    X-ray take-off angle: 30°
    Dead time: 15%
    Mapping elements: C, O, F
    Measurement pixel count 256×256 pixels
    Measuring time: 60 sec
    Number of scans: 50
    The luminance and contrast were adjusted so that the brightness had no pixel reaching the maximum luminance, and the mean value of the brightness fell within the range of 40% to 60% of luminance.

(SEM-EDX Analysis)

The images obtained from SEM and EDX of the measured positive electrode cross-section were subjected to image analysis by the method described above using image analysis software (ImageJ), and $Y_1$ and $Z_1$ were calculated. The results are shown in Table 4.

[Quantitation of Lithium Compound]

A positive electrode sample cut out to a size of 5 cm×5 cm was immersed in methanol, and the vessel was capped and allowed to stand for 3 days in an environment of 25° C. The positive electrode was then removed out and vacuum dried for 10 hours under conditions of 120° C., 5 kPa. The methanol solution after washing was measured by GC/MS under conditions with a predrawn calibration curve, and a diethyl carbonate abundance of less than 1% was confirmed. After then measuring the positive electrode weight $M_0$, the positive electrode sample was impregnated with distilled water, and the vessel was capped and allowed to stand for 3 days in an environment of 45° C. The positive electrode sample was then removed out and vacuum dried for 12 hours under conditions of 150° C., 3 kPa. The distilled water after washing was measured by GC/MS under conditions with a predrawn calibration curve, and a methanol abundance of less than 1% was confirmed. The positive electrode weight $M_1$ was measured, a spatula, brush or bristles were used to remove the active material layer on the positive electrode power collector, and the weight $M_2$ of the positive electrode power collector was measured. The lithium compound weight W in the positive electrode was quantified by this method. The results are shown in Table 4.

Examples 58 to 78 and Comparative Examples 13 and 14

Nonaqueous lithium power storage elements for Examples 58 to 78 and Comparative Examples 13 and 14 were fabricated in the same manner as Example 57, except that the positive electrode active materials of the positive electrode precursors, the types and mean particle diameters of the lithium compounds, the compositions, the thicknesses of the positive electrode active material layers, the negative electrodes, and the voltages and times for the lithium doping were as shown in Table 3, and the different evaluations were carried out. The evaluation results for the obtained nonaqueous lithium power storage elements are shown in Table 4.

Comparative Example 15

<Production of Positive Electrode Precursor (Composition d)>

After mixing 87.5 parts by weight of activated carbon 1, 3.0 parts by weight of Ketchen black, 1.5 parts by weight of PVP (polyvinylpyrrolidone), 8.0 parts by weight of PVdF (polyvinylidene fluoride) and NMP (N-methylpyrrolidone), the mixture was dispersed using a FILMIX® thin-film rotating-type high-speed mixer by Primix Corp., under conditions with a peripheral velocity of 17 m/s, to obtain a coating solution. The coating solution was coated onto one or both sides of an aluminum foil with a thickness of 15 μm using a die coater by Toray Engineering Co., Ltd. under conditions with a coating speed of 1 m/s, and dried at a drying temperature of 100° C. to obtain a positive electrode precursor (composition d). The obtained positive electrode precursor was pressed using a roll press under conditions with a pressure of 4 kN/cm and a pressed portion surface temperature of 25° C.

<Production and Evaluation of Nonaqueous Lithium Power Storage Element>

Assembly, filling, impregnation and sealing of a nonaqueous lithium power storage element were carried out in the same manner as Example 57, except for using the obtained positive electrode precursor (composition d), and a negative electrode comprising a metal lithium foil corresponding to 211 mAh/g per unit weight of the negative electrode active material, attached to the surface of the negative electrode active material layer of the negative electrode 4.

Next, for lithium doping, the obtained nonaqueous lithium power storage element was stored for 72 hours in a thermostatic bath with an environmental temperature of 45° C., for ionization of the metal lithium and doping in the negative electrode 4. The obtained nonaqueous lithium power storage element was then subjected to aging and degassing in the same manner as Example 57, to produce at least two nonaqueous lithium power storage elements which were evaluated. The results are shown in Table 4.

Comparative Example 16

A nonaqueous lithium power storage element for Comparative Example 20 was fabricated in the same manner as Comparative Example 15, except that the positive electrode active material of the positive electrode precursor was activated carbon 5, and the different evaluations were carried out. The evaluation results for the obtained nonaqueous lithium power storage elements are shown in Table 4.

TABLE 3

| | Positive electrode active material | Lithium compound | Lithium compound mean particle diameter (μm) | Composition | Thickness (μm) | Negative electrode | Lithium doping Voltage (V) | Time (h) |
|---|---|---|---|---|---|---|---|---|
| Example 57 | Activated carbon 1 | Li$_2$CO$_3$ | 5.2 | b | 25 | Neg. electrode 4 | 4.5 | 1 |
| Example 58 | Activated carbon 1 | Li$_2$CO$_3$ | 5.2 | b | 50 | Neg. electrode 4 | 4.5 | 1 |
| Example 59 | Activated carbon 1 | Li$_2$CO$_3$ | 5.2 | b | 100 | Neg. electrode 3 | 4.3 | 1 |
| Example 60 | Activated carbon 5 | Li$_2$CO$_3$ | 5.2 | b | 30 | Neg. electrode 4 | 4.5 | 1 |
| Example 61 | Activated carbon 5 | Li$_2$CO$_3$ | 5.2 | b | 50 | Neg. electrode 4 | 4.5 | 1 |
| Example 62 | Activated carbon 5 | Li$_2$CO$_3$ | 5.2 | b | 100 | Neg. electrode 3 | 4.3 | 1 |
| Example 63 | Activated carbon 6 | Li$_2$CO$_3$ | 5.2 | b | 25 | Neg. electrode 4 | 4.5 | 1 |
| Example 64 | Activated carbon 6 | Li$_2$CO$_3$ | 5.2 | b | 50 | Neg. electrode 4 | 4.5 | 1 |
| Example 65 | Activated carbon 6 | Li$_2$CO$_3$ | 5.2 | b | 50 | Neg. electrode 4 | 4.5 | 7 |
| Example 66 | Activated carbon 6 | Li$_2$CO$_3$ | 5.2 | b | 100 | Neg. electrode 3 | 4.3 | 1 |
| Example 67 | Activated carbon 7 | Li$_2$CO$_3$ | 5.2 | b | 25 | Neg. electrode 4 | 4.5 | 1 |
| Example 68 | Activated carbon 7 | Li$_2$CO$_3$ | 5.2 | b | 50 | Neg. electrode 4 | 4.5 | 1 |
| Example 69 | Activated carbon 7 | Li$_2$CO$_3$ | 5.2 | b | 50 | Neg. electrode 4 | 4.5 | 5 |
| Example 70 | Activated carbon 7 | Li$_2$CO$_3$ | 5.2 | b | 100 | Neg. electrode 3 | 4.3 | 1 |
| Example 71 | Activated carbon 7 | Li$_2$O | 5.2 | b | 50 | Neg. electrode 4 | 4.5 | 1 |
| Example 72 | Activated carbon 7 | LiOH | 5.2 | b | 50 | Neg. electrode 4 | 4.5 | 1 |
| Example 73 | Activated carbon 7 | Li$_2$CO$_3$ | 9.0 | b | 50 | Neg. electrode 4 | 4.5 | 1 |
| Example 74 | Activated carbon 7 | Li$_2$CO$_3$ | 9.0 | b | 50 | Neg. electrode 4 | 4.5 | 5 |
| Example 75 | Activated carbon 1 | Li$_2$CO$_3$ | 5.2 | e | 150 | Neg. electrode 3 | 4.3 | 3 |
| Example 76 | Activated carbon 6 | Li$_2$CO$_3$ | 5.2 | e | 150 | Neg. electrode 3 | 4.3 | 3 |
| Example 77 | Activated carbon 8 | Li$_2$CO$_3$ | 5.2 | b | 25 | Neg. electrode 4 | 4.5 | 1 |
| Example 78 | Activated carbon 8 | Li$_2$CO$_3$ | 5.2 | b | 50 | Neg. electrode 4 | 4.5 | 1 |
| Comp. Example 13 | Activated carbon 6 | Li$_2$CO$_3$ | 5.2 | e | 250 | Neg. electrode 3 | 4.3 | 3 |
| Comp. Example 14 | Activated carbon 7 | Li$_2$CO$_3$ | 5.2 | e | 250 | Neg. electrode 3 | 4.3 | 3 |
| Comp. Example 15 | Activated carbon 1 | None | — | d | 25 | Neg. electrode 4 | — | — |
| Comp. Example 16 | Activated carbon 5 | None | — | d | 25 | Neg. electrode 4 | — | — |

TABLE 4

| | Positive electrode | | | | | | | | | | | | | Nonaqueous lithium power storage element properties | | |
|---|---|---|---|---|---|---|---|---|---|---|---|---|---|---|---|---|
| | A ($\mu$L/cm$^2$) | B ($\mu$L/cm$^2$) | A/B | C ($\mu$L/cm$^2$) | D (m$^2$/cm$^2$) | $Y_1$ ($\mu$m) | $Z_1$ ($\mu$m) | W (wt %) | Vp (mL/g) | P1 pore size ($\mu$m) | P1 Log differential pore volume (mL/g) | P2 pore size ($\mu$m) | P2 Log differential pore volume (mL/g) | Ra·F ($\Omega$F) | E/V (Wh/L) | Rb/Ra |
| Example 57 | 0.33 | 0.55 | 0.60 | 0.12 | 1.51 | 2.4 | 4.0 | 3.1 | 1.25 | 0.44 | 1.51 | 2.78 | 2.23 | 1.13 | 15.4 | 1.14 |
| Example 58 | 0.63 | 1.05 | 0.60 | 0.24 | 2.84 | 2.6 | 4.1 | 4.0 | 1.10 | 0.43 | 1.58 | 2.53 | 2.12 | 1.58 | 19.9 | 1.21 |
| Example 59 | 1.24 | 2.11 | 0.59 | 0.47 | 5.58 | 2.9 | 4.1 | 5.5 | 0.94 | 0.42 | 1.65 | 2.21 | 1.95 | 2.21 | 25.8 | 1.29 |
| Example 60 | 0.31 | 0.70 | 0.44 | 0.07 | 1.27 | 2.3 | 8.6 | 2.7 | 1.29 | 0.83 | 0.93 | 2.82 | 2.26 | 1.72 | 15.2 | 1.71 |
| Example 61 | 0.49 | 1.12 | 0.44 | 0.13 | 2.09 | 2.4 | 8.7 | 3.1 | 1.13 | 0.84 | 0.95 | 2.67 | 2.17 | 2.12 | 17.7 | 1.78 |
| Example 62 | 0.99 | 2.28 | 0.43 | 0.22 | 4.12 | 2.8 | 8.5 | 4.9 | 0.99 | 0.82 | 1.01 | 2.29 | 2.04 | 2.94 | 23.1 | 1.85 |
| Example 63 | 0.68 | 0.84 | 0.81 | 0.23 | 1.71 | 2.5 | 3.2 | 3.5 | 1.35 | 0.27 | 1.62 | 1.92 | 2.12 | 0.81 | 17.1 | 1.32 |
| Example 64 | 1.35 | 1.68 | 0.80 | 0.48 | 3.31 | 2.7 | 3.3 | 4.4 | 1.21 | 0.26 | 1.75 | 2.37 | 2.01 | 1.19 | 22.4 | 1.43 |
| Example 65 | 1.32 | 1.09 | 1.21 | 0.34 | 2.12 | 2.1 | 3.2 | 2.1 | 1.73 | 0.24 | 1.61 | 2.95 | 2.72 | 1.23 | 15.3 | 1.37 |
| Example 66 | 2.61 | 3.31 | 0.79 | 0.95 | 6.53 | 3.0 | 3.2 | 6.1 | 1.01 | 0.24 | 1.91 | 2.08 | 1.72 | 1.79 | 29.1 | 1.52 |
| Example 67 | 0.74 | 0.75 | 0.99 | 0.24 | 1.68 | 2.8 | 6.5 | 4.9 | 1.26 | 1.25 | 1.83 | 2.28 | 1.93 | 0.69 | 16.8 | 1.42 |
| Example 68 | 1.45 | 1.50 | 0.97 | 0.49 | 3.30 | 3.1 | 6.6 | 6.7 | 1.09 | 1.23 | 1.91 | 2.01 | 1.54 | 1.04 | 22.3 | 1.51 |
| Example 69 | 1.43 | 1.05 | 1.36 | 0.35 | 2.62 | 2.5 | 6.5 | 3.5 | 1.32 | 1.22 | 1.69 | 2.53 | 2.08 | 1.15 | 17.7 | 1.46 |
| Example 70 | 2.75 | 2.87 | 0.96 | 0.93 | 6.41 | 3.5 | 6.4 | 9.6 | 0.91 | 1.21 | 2.04 | 1.62 | 1.21 | 1.59 | 28.6 | 1.64 |
| Example 71 | 1.39 | 1.44 | 0.97 | 0.47 | 3.21 | 3.1 | 6.5 | 6.7 | 1.04 | 1.23 | 1.89 | 1.93 | 1.49 | 1.09 | 21.9 | 1.57 |
| Example 72 | 1.36 | 1.42 | 0.96 | 0.45 | 3.19 | 3.2 | 6.7 | 7.4 | 1.01 | 1.24 | 1.83 | 1.89 | 1.46 | 1.11 | 21.6 | 1.61 |
| Example 73 | 1.51 | 1.55 | 0.97 | 0.51 | 3.32 | 6.3 | 6.4 | 10.8 | 0.81 | 1.25 | 2.01 | 2.52 | 1.08 | 0.98 | 22.6 | 1.27 |
| Example 74 | 1.48 | 1.37 | 1.08 | 0.45 | 2.97 | 5.4 | 6.3 | 6.8 | 1.02 | 1.24 | 1.84 | 3.47 | 1.52 | 111 | 19.7 | 1.21 |
| Example 75 | 1.77 | 3.51 | 0.50 | 0.77 | 9.37 | 2.7 | 4.2 | 8.9 | 0.74 | 0.38 | 1.71 | 0.96 | 1.31 | 2.93 | 30.9 | 1.92 |
| Example 76 | 3.61 | 5.58 | 0.65 | 1.78 | 12.21 | 2.9 | 3.2 | 11.0 | 0.73 | 0.24 | 2.12 | 2.17 | 1.05 | 2.60 | 34.9 | 1.65 |
| Example 77 | 0.61 | 0.88 | 0.69 | 0.31 | 1.99 | 1.7 | 1.9 | 1.1 | 1.46 | 0.22 | 1.48 | 2.59 | 2.34 | 0.72 | 19.8 | 1.34 |
| Example 78 | 1.23 | 1.73 | 0.71 | 0.58 | 3.62 | 1.8 | 1.9 | 1.3 | 1.33 | 0.21 | 1.66 | 2.88 | 2.19 | 1.08 | 25.1 | 1.49 |
| Comp. 13 | 5.82 | 10.21 | 0.57 | 3.12 | 20.90 | 3.9 | 2.7 | 26.7 | 0.34 | 0.22 | 2.61 | 1.17 | 0.45 | 3.38 | 48.0 | 2.04 |
| Example Comp. 14 | 6.21 | 8.23 | 0.75 | 2.91 | 19.78 | 4.5 | 6.4 | 41.0 | 0.25 | 0.52 | 0.31 | 1.16 | 2.96 | 3.06 | 47.2 | 2.13 |
| Example Comp. 15 | 0.28 | 0.41 | 0.68 | 0.06 | 1.24 | — | 4.1 | 0.0 | 0.41 | 0.45 | 1.32 | — | — | 1.31 | 12.6 | 1.53 |
| Example Comp. 16 | 0.25 | 0.48 | 0.52 | 0.04 | 0.97 | — | 8.6 | 0.0 | 0.55 | 0.86 | 0.72 | — | — | 1.83 | 12.5 | 2.04 |

Based on comparison of Examples 57 to 78 and Comparative Examples 13 to 16, it is seen that if the mesopore volume A per unit area ($\mu$L/cm$^2$), the micropore volume B per unit area ($\mu$L/cm$^2$) and the ultramicropore volume C per unit area ($\mu$L/cm$^2$) for each side of the positive electrode satisfy $0.3 \leq A \leq 5.0$, $0.5 \leq B \leq 10$, $0.05 \leq C \leq 3.0$ and $0.4 \leq A/B \leq 1.5$, then the Ra·F value is small (the internal resistance is low, or in other words, the input/output characteristic is high), the energy density E/V is high, the Rb/Ra value is small, and the nonaqueous lithium power storage element has an excellent high load charge/discharge cycle characteristic.

Without being limited to theory, it is believed that a nonaqueous lithium power storage element exhibiting a high input/output characteristic can be obtained by controlling the pore volume and pore distribution by adjustment of the design of the positive electrode precursor and the lithium doping conditions, and by increasing the volume and proportion of mesopores that have satisfactory lithium ion conductivity. It is believed that a nonaqueous lithium power storage element exhibiting high energy density can be obtained by maintaining a high micropore volume and ultramicropore volume that contributes to the amount of ions that can be adsorbed and desorbed. It is believed that a nonaqueous lithium power storage element exhibiting an excellent high load charge/discharge cycle characteristic can be obtained by controlling the pore distribution in the positive electrode, and adding a lithium compound that can adsorb fluorine ions generated in the high load charge/discharge cycling.

The fourth embodiment will now be explained in detail.

Example 79

<Production of Positive Electrode Precursor>

Activated carbon 1 obtained above was used as the positive electrode active material to produce a positive electrode precursor (composition f).

After mixing 67.5 parts by weight of activated carbon 1, 20.0 parts by weight of lithium carbonate having a mean particle diameter of 2.2 μm, as a lithium compound, 3.0 parts by weight of Ketchen black, 1.5 parts by weight of PVP (polyvinylpyrrolidone), 8.0 parts by weight of PVdF (polyvinylidene fluoride) and NMP (N-methylpyrrolidone), the mixture was dispersed using a FILMIX® thin-film rotating-type high-speed mixer by Primix Corp., under conditions with a peripheral velocity of 17 m/s, to obtain a coating solution. The viscosity (ηb) and TI value of the obtained coating solution were measured using a TVE-35H E-type viscometer by Toki Sangyo Co., Ltd. As a result, the viscosity (ηb) was 2,820 mPa·s and the TI value was 3.2. The degree of dispersion of the obtained coating solution was measured using a fineness gauge by Yoshimitsu Seiki Co. As a result, the granularity was 35 μm. The coating solution was coated onto one or both sides of an aluminum foil with a thickness of 15 μm and without through-holes, using a die coater by Toray Engineering Co., Ltd. under conditions with a coating speed of 1 m/s, and dried at a drying temperature of 100° C. to obtain a positive electrode precursor (composition f) (hereunder referred to as "single-sided positive electrode precursor" and "double-sided positive electrode precursor", respectively). The obtained positive electrode precursor (composition f) was pressed using a roll press under conditions with a pressure of 4 kN/cm and a pressed portion surface temperature of 25° C.

<Production of Negative Electrode>
[Preparation Example for Negative Electrode 5]

A 150 g portion of commercially available coconut shell activated carbon having a mean particle diameter of 1.1 μm and a BET specific surface area of 1,310 m²/g was placed into a stainless steel mesh basket and set on a stainless steel vat containing 200 g of coal-based pitch (softening point: 80° C.), and both were set in an electric furnace (furnace inner usable dimension: 300 mm×300 mm×300 mm). The coconut shell activated carbon and coal-based pitch were increased in temperature to 680° C. over 8 hours under a nitrogen atmosphere, and were kept at the same temperature for 4 hours for thermal reaction to obtain composite carbon material 1a. The obtained composite carbon material 1a was cooled to 60° C. by natural cooling, and then removed out from the electric furnace.

The mean particle diameter and BET specific surface area of the obtained composite carbon material 1a were measured by the same methods as described above. The results are shown in Table 5.

Composite carbon material 1a was then used as a negative electrode active material to produce negative electrode 5.

After mixing 82 parts by weight of composite carbon material 1a, 6 parts by weight of acetylene black, 12 parts by weight of PVdF (polyvinylidene fluoride) and NMP (N-methylpyrrolidone), the mixture was dispersed using a FILMIX® thin-film rotating-type high-speed mixer by Primix Corp., under conditions with a peripheral velocity of 15 m/s, to obtain a coating solution. The viscosity (ηb) and TI value of the obtained coating solution were measured using a TVE-35H E-type viscometer by Toki Sangyo Co., Ltd. As a result, the viscosity (11b) was 2,892 mPa·s and the TI value was 5.0. The coating solution was coated onto both sides of an electrolytic copper foil with a thickness of 10 μm and without through-holes, using a die coater by Toray Engineering Co., Ltd. under conditions with a coating speed of 1 m/s, and dried at a drying temperature of 85° C. to obtain negative electrode 5 (hereunder also referred to as "double-sided negative electrode"). The obtained negative electrode 5 was pressed using a roll press under conditions with a pressure of 4 kN/cm and a pressed portion surface temperature of 25° C. The film thickness of the obtained negative electrode 5 was measured at 10 arbitrary locations of negative electrode 5, using a Linear Gauge Sensor GS-551 by Ono Sokki Co., Ltd. The thickness of the copper foil was subtracted from the mean value of the measured film thickness, to determine the film thickness of the negative electrode active material layer of negative electrode 5. As a result, the film thickness of the negative electrode active material layer of negative electrode 5 was 40 μm for each side.

Next, for the obtained negative electrode 5, $V_a$, $V_b$, $V_c$, $S_a$, $S_b$ and the mean pore size of the negative electrode active material layer of the negative electrode before use were measured by the method described above using a pore distribution measuring device by Yuasa-Ionics, Inc. (AUTOSORB-1 AS-1-MP), with nitrogen as the adsorbate. The results are shown in Table 6.

[Preparation Example for Negative Electrodes 6 to 14]

Negative electrode active materials were produced and evaluated in the same manner as the preparation example for negative electrode 5, except that the preparation was with the base materials and their parts by weight, the parts by weight of the coal-based pitch and the heat treatment temperatures shown in Table 5. Also, the negative electrodes were produced and evaluated in the same manner as the preparation example for negative electrode 5, except that the preparation was using the obtained negative electrode active materials, with the coating solutions listed in Table 5. The results are shown in Table 5 and Table 6.

TABLE 5

| | Negative electrode active material | | | | | | | Coating solution | | | Negative electrode active material layer film thickness per side (μm) |
|---|---|---|---|---|---|---|---|---|---|---|---|
| | Starting materials | | | | Carbonaceous material weight ratio (weight %) | Mean particle diameter (μm) | BET specific surface area (m²/g) | Solid content (parts by weight) | | | |
| | Base material | | Pitch | Heat treatment temperature (° C.) | | | | Negative electrode active material | Acetylene black | PVdF | |
| Name | Name | Type | Amount (parts by weight) | Amount (parts by weight) | | | | | | | | |
| Negative electrode 5 | Composite carbon material 1a | Coconut shell activated carbon | 150 | 200 | 680 | 62 | 1.3 | 312 | 82 | 6 | 12 | 40 |
| Negative electrode 6 | Composite carbon material 1b | Carbon nano-particles 1 | 150 | 250 | 850 | 75 | 7.3 | 342 | 80 | 2 | 18 | 40 |
| Negative electrode 7 | Composite carbon material 1c | Carbon nano-particles 2 | 150 | 130 | 1100 | 52 | 4.5 | 212 | 80 | 2 | 18 | 40 |
| Negative electrode 8 | Composite carbon material 1d | Carbon nano-particles 3 | 150 | 50 | 1050 | 16 | 6.6 | 209 | 80 | 2 | 18 | 40 |
| Negative electrode 9 | Composite carbon material 1b | Carbon nano-particles 1 | 150 | 250 | 850 | 75 | 7.3 | 342 | 90 | 2 | 8 | 40 |
| Negative electrode 10 | Composite carbon material 2a | Artificial graphite | 150 | 70 | 1050 | 19 | 7.2 | 32 | 80 | 8 | 12 | 20 |
| Negative electrode 11 | Composite carbon material 2b | Artificial graphite | 150 | 17 | 1050 | 3 | 4.0 | 9.2 | 80 | 8 | 12 | 20 |
| Negative electrode 12 | Composite carbon material 2c | Natural graphite | 150 | 13 | 1050 | 2 | 2.3 | 10.3 | 80 | 8 | 12 | 20 |
| Negative electrode 13 | Composite carbon material 2d | Artificial graphite | 150 | 10 | 1050 | 1.6 | 3.9 | 8.5 | 80 | 8 | 12 | 20 |
| Negative electrode 14 | Composite carbon material 2e | Artificial graphite | 150 | 130 | 1050 | 49 | 10.2 | 52 | 80 | 8 | 12 | 20 |

The starting materials in Table 5 are the following.

Coconut shell activated carbon: mean particle diameter=1.1 μm, BET specific surface area=1,310 m²/g Carbon nanoparticles 1: mean particle diameter=7.1 μm, BET specific surface area=1,430 m²/g, primary particle diameter=14 nm Carbon nanoparticles 2: mean particle diameter=4.3 μm, BET specific surface area=721 m²/g, primary particle diameter=18 nm Carbon nanoparticles 3: mean particle diameter=6.5 μm, BET specific surface area=413 m²/g, primary particle diameter=35 nm Artificial graphite: mean particle diameter=3.9 μm, BET specific surface area=6.1 m²/g Natural graphite: mean particle diameter=2.1 μm, BET specific surface area=8.7 m²/g Pitch: coal-based pitch with softening point of 80° C.

<Preparation of Nonaqueous Electrolytic Solution>

As an organic solvent there was used a mixed solvent of ethylene carbonate (EC):methyl ethyl carbonate (EMC)=33:67 (volume ratio), each electrolyte salt was dissolved so that the concentration ratio of $LiN(SO_2F)_2$ and $LiPF_6$ was 25:75 (molar ratio) with respect to the total nonaqueous electrolytic solution and the total concentration of $LiN(SO_2F)_2$ and $LiPF_6$ was 1.2 mol/L, and the obtained solution was used as a nonaqueous electrolytic solution.

The concentrations of $LiN(SO_2F)_2$ and $LiPF_6$ in the prepared nonaqueous electrolytic solution were 0.3 mol/L and 0.9 mol/L, respectively.

<Production of Nonaqueous Lithium Power Storage Element>

The obtained positive electrode precursor (composition f) and negative electrode 5 were used to produce a plurality of nonaqueous lithium power storage elements under the conditions described below.

[Assembly]

The obtained double-sided negative electrode 5 and single-sided and double-sided positive electrode precursors (composition f) were cut to 10 cm×10 cm (100 cm²). Using a single-sided positive electrode precursor for the uppermost side and lowermost side, 21 double-sided negative electrodes and 20 double-sided positive electrode precursors were stacked, sandwiching microporous film separators each with a thickness of 15 μm between the negative electrodes 5 and positive electrode precursors. Next, a negative electrode terminal and positive electrode terminal were connected to the negative electrodes 5 and positive electrode precursors, respectively, by ultrasonic welding to obtain an electrode laminated body. The electrode laminated body was housed in a casing composed of an aluminum laminate package material, and the electrode terminal portion and bottom portion of the casing were heat sealed on three sides under conditions with a temperature of 180° C., a seal time of 20 sec and a seal pressure of 1.0 MPa, and vacuum dried under conditions with a temperature of 80° C., a pressure of 50 Pa and a drying time of 60 hr.

[Filling, Impregnation and Sealing Step]

Approximately 80 g of the nonaqueous electrolytic solution was injected into the electrode laminated body housed in the aluminum laminate package material, in a dry air environment at atmospheric pressure, a temperature of 25° C. and a dew point of no higher than −40° C. Next, the package material containing the electrode laminated body and electrolytic solution was placed in a pressure reduction chamber and the pressure was reduced from atmospheric pressure to −87 kPa, after which it was restored to atmospheric pressure and allowed to stand for 5 minutes. The step of reducing the pressure from atmospheric pressure to −87 kPa and then restoring to atmospheric pressure was subsequently repeated 4 times, and it was then allowed to stand for 15 minutes. The pressure of the package material was again reduced from atmospheric pressure to −91 kPa, and then restored to atmospheric pressure. The step of pressure reduction and restoration to atmospheric pressure in the same manner was repeated a total of 7 times (pressure reduction from atmospheric pressure to −95, −96, −97, −81, −97, −97 and −97 kPa, respectively). The electrode laminated body was impregnated with the nonaqueous electrolytic solution by this procedure.

Next, the electrode laminate body housed in the aluminum laminate package material and impregnated with the nonaqueous electrolytic solution was placed in a pressure-reduction sealing machine, and with pressure reduction to −95 kPa, it was sealed at 180° C. for 10 seconds at a pressure of 0.1 MPa to seal the aluminum laminate package material and fabricate a nonaqueous lithium power storage element.

[Lithium Doping Step]

The obtained nonaqueous lithium power storage element was subjected to initial charging by a method of constant-current charging using a charge/discharge apparatus (TOSCAT-3100U) by Toyo System Co., Ltd., in an environment of 25° C. with a current value of 50 mA until reaching a voltage of 4.5 V, followed by constant voltage charge at 4.5 V continued for 24 hours, for lithium doping of the negative electrode 5.

[Aging Step]

The lithium-doped nonaqueous lithium power storage element was subjected to a constant-current/constant-voltage charge step, with constant-current discharge in an environment of 45° C. at 100 mA until reaching a voltage of 2.0 V, followed by constant-current charge at 100 mA until reaching a voltage of 4.2 V, and constant-current charge at 4.2 V for 10 hours.

[Degassing Step]

A portion of the aluminum laminate package material of the aged nonaqueous lithium power storage element was unsealed in a dry air environment with a temperature of 25° C. and a dew point of −40° C. Next, the nonaqueous lithium power storage element was placed in a pressure reduction chamber, and a step of using a diaphragm pump (N816.3KT.45.18) by KNF Co. for pressure reduction over a period of 3 minutes from atmospheric pressure to −80 kPa, followed by restoration to atmospheric pressure over a period of 3 minutes, was repeated 3 times. Next, the nonaqueous lithium power storage element was placed in a pressure-reducing sealing machine, and after pressure reduction to −90 kPa, it was sealed at 200° C. for 10 seconds at a pressure of 0.1 MPa to seal the aluminum laminate package material.

<Evaluation of Nonaqueous Lithium Power Storage Element>

One of the obtained nonaqueous lithium power storage elements was subjected to [Electrostatic capacitance and Ra·F measurement] and [High load charge/discharge cycling test], as described below. The remaining nonaqueous lithium power storage element was used for [Analysis of negative electrode active material layer of negative electrode after use] and [Measurement of mean particle diameter of lithium compound in positive electrode], as described below.

[Electrostatic Capacitance and Ra·F Measurement]

Each of the obtained nonaqueous lithium power storage elements was used in the method described above in a thermostatic bath set to 25° C., using a charge/discharge apparatus (5 V, 360 A) by Fujitsu Telecom Networks, Ltd., to calculate the electrostatic capacitance F and the internal resistance Ra at 25° C., and the energy density E/V and Ra·F were obtained. The results are shown in Table 6.

[High Load Charge/Discharge Cycling Test]

Each of the obtained nonaqueous lithium power storage elements was used in the method described above in a thermostatic bath set to 25° C., using a charge/discharge apparatus (5 V, 360 A) by Fujitsu Telecom Networks, Ltd., for a high load charge/discharge cycling test, the internal resistance Rb after the high load charge/discharge cycling test was measured, and Rb/Ra was obtained. The results are shown in Table 6.

[Analysis of Negative Electrode Active Material Layer of Negative Electrode after Use]

The negative electrode 5 of the nonaqueous lithium power storage element obtained as described above was used for measurement of $V_a$, $V_b$, $V_c$, $S_a$, $S_b$ and the mean pore size of the negative electrode active material layer of the negative electrode after use.

First, the nonaqueous lithium power storage element produced as described above was subjected to constant-current charge to 2.9 V with a current of 50 mA, using a charge/discharge apparatus (ACD-01) by Aska Electronic Co., Ltd., at an environmental temperature of 25° C., and then to constant-current/constant-voltage charge with application of a constant voltage of 2.9 V for 15 hours.

The negative electrode 5 was then sampled under an argon atmosphere. The nonaqueous lithium power storage element was disassembled under an argon atmosphere, and the negative electrode 5 was removed. Next, the obtained negative electrode 5 was immersed in diethyl carbonate for 2 minutes or longer to remove the nonaqueous electrolytic solution and lithium salt, and was air-dried. The obtained negative electrode 5 was then immersed in a mixed solvent comprising methanol and isopropanol for 15 hours to inactivate the lithium ion intercalated in the negative electrode active material, and was air-dried. Next, the obtained negative electrode 5 was vacuum dried for 12 hours using a vacuum dryer under conditions with a temperature of 170° C., to obtain a measuring sample. For the obtained measuring sample, $V_a$, $V_b$, $V_c$, $S_a$, $S_b$ and the mean pore size of the negative electrode active material layer of the negative electrode after use were measured by the method described above, using a pore distribution measuring device by Yuasa- Ionics, Inc. (AUTOSORB-1 AS-1-MP), with nitrogen as the adsorbate. The results are shown in Table 6.

[Measurement of Mean Particle Diameter of Lithium Compound in Positive Electrode]

The obtained nonaqueous lithium power storage element was disassembled in an argon box with a dew point temperature of −72° C., the positive electrode coated on both sides with the positive electrode active material layer was cut out to a size of 10 cm×5 cm and immersed in 30 g of a diethyl carbonate solvent, occasionally moving the positive electrode with a pincette, and was washed for 10 minutes. The positive electrode was then removed out, and air-dried for 5 minutes in an argon box, and the positive electrode was immersed in 30 g of freshly prepared diethyl carbonate solvent and washed for 10 minutes by the same method as described above. The positive electrode was removed from the argon box, and a vacuum dryer (DP33 by Yamato Scientific Co., Ltd.) was used for drying for 20 hours at a temperature of 25° C. and a pressure of 1 kPa, to obtain a positive electrode sample.

A small 1 cm×1 cm piece was cut out from the positive electrode sample, and an SM-09020CP by JEOL Corp. was used to create a cross-section perpendicular to the in-plane direction of the positive electrode sample using argon gas, under conditions with an acceleration voltage of 4 kV and a beam diameter of 500 μm. The surface was then coated with gold by sputtering in a vacuum of 10 Pa. Next, the positive electrode surface was measured by SEM and EDX with atmospheric exposure, under the conditions described below.

(SEM-EDX Measuring Conditions)

Measuring apparatus: FE-SEM S-4700 Electrolytic emission scanning electron microscope by Hitachi High-Technologies Corp.
Acceleration voltage: 10 kV
Emission current: 10 μA
Measurement magnification: 2,000×
Electron beam incident angle: 90°
X-ray take-off angle: 30°
Dead time: 15%
Mapping elements: C, O, F
Measurement pixel count 256×256 pixels
Measuring time: 60 sec
Number of scans: 50
The luminance and contrast were adjusted so that the brightness had no pixel reaching the maximum luminance, and the mean value of the brightness fell within the range of 40% to 60% of luminance.

(SEM-EDX Analysis)

The images obtained from SEM and EDX of the measured positive electrode cross-section were subjected to image analysis by the method described above using image analysis software (ImageJ), to calculate the mean particle diameter $Y_1$ of the lithium compound. The results are shown in Table 6.

Examples 80 to 92 and Comparative Examples 17 and 18

Positive electrode precursors were produced in the same manner as Example 79, except that the positive electrode active materials and lithium compounds were as shown in Table 6. Nonaqueous lithium power storage elements were produced and evaluated in the same manner as Example 79, except that these positive electrode precursors were used and combined with the negative electrodes listed in Table 6. The results are shown in Table 6 and Table 7.

Examples 93 and 94

<Preparation of Nonaqueous Electrolytic Solution>

As an organic solvent there was used a mixed solvent of ethylene carbonate (EC):methyl ethyl carbonate (EMC)=33:67 (volume ratio), and each electrolyte salt was dissolved so that the concentration ratio of $LiN(SO_2F)_2$ and $LiPF_6$ was 25:75 (molar ratio) with respect to the total nonaqueous electrolytic solution and the total concentration of $LiN(SO_2F)_2$ and $LiPF_6$ was 1.2 mol/L, to prepare a nonaqueous electrolytic solution.

The concentrations of $LiN(SO_2F)_2$ and $LiPF_6$ in the prepared nonaqueous electrolytic solution were 0.3 mol/L and 0.9 mol/L, respectively.

Also, a solution obtained by dissolving vinylene carbonate and 1,3-propanesultone as additives each in amounts of 1 weight % with respect to the total nonaqueous electrolytic solution, was used as the nonaqueous electrolytic solution.

Positive electrode precursors were produced in the same manner as Example 79, except that the positive electrode active materials and lithium compounds were as shown in Table 6. Nonaqueous lithium power storage elements were produced and evaluated in the same manner as Example 79, except that these positive electrode precursors were used and combined with the negative electrodes listed in Table 6, and the nonaqueous electrolytic solution obtained as described above was also used. The results are shown in Table 6.

The results are summarized in Table 6 below.

TABLE 6

| | Positive electrode precursor | | | Negative electrode before use | | | | |
|---|---|---|---|---|---|---|---|---|
| | Positive electrode active material | Lithium compound | Lithium compound mean particle diameter (μm) | Negative electrode | Va/Vb (%) | Vc/Vb (%) | Sa/Sb (%) | Negative electrode active material layer mean pore size (nm) |
| Example 79 | Activated carbon 1 | $Li_2CO_3$ | 2.2 | Negative electrode 5 | 56 | 45 | 25 | 3.7 |
| Example 80 | Activated carbon 1 | $Li_2CO_3$ | 2.2 | Negative electrode 6 | 68 | 52 | 33 | 4.6 |

TABLE 6-continued

| | | | | | | | | |
|---|---|---|---|---|---|---|---|---|
| Example 81 | Activated carbon 2 | Li$_2$CO$_3$ | 2.2 | Negative electrode 6 | 68 | 52 | 33 | 4.6 |
| Example 82 | Activated carbon 2 | Li$_2$CO$_3$ | 2.2 | Negative electrode 7 | 85 | 65 | 62 | 8.2 |
| Example 83 | Activated carbon 2 | Li$_2$CO$_3$ | 2.2 | Negative electrode 8 | 100 | 88 | 100 | 13.2 |
| Example 84 | Activated carbon 2 | Li$_2$CO$_3$ | 2.2 | Negative electrode 10 | 79 | 58 | 44 | 6.5 |
| Example 85 | Activated carbon 2 | Li$_2$CO$_3$ | 2.2 | Negative electrode 11 | 90 | 61 | 51 | 7.2 |
| Example 86 | Activated carbon 2 | Li$_2$CO$_3$ | 2.2 | Negative electrode 12 | 92 | 70 | 61 | 8.2 |
| Example 87 | Activated carbon 2 | Li$_2$CO$_3$ | 2.2 | Negative electrode 13 | 100 | 89 | 100 | 12.8 |
| Example 88 | Activated carbon 2 | Li$_2$CO$_3$ | 0.6 | Negative electrode 11 | 90 | 61 | 51 | 7.2 |
| Example 89 | Activated carbon 2 | Li$_2$CO$_3$ | 6.2 | Negative electrode 11 | 90 | 61 | 51 | 7.2 |
| Example 90 | Activated carbon 2 | Li$_2$CO$_3$ | 9.5 | Negative electrode 11 | 90 | 61 | 51 | 7.2 |
| Example 91 | Activated carbon 2 | Li$_2$O | 1.9 | Negative electrode 11 | 90 | 61 | 51 | 7.2 |
| Example 92 | Activated carbon 2 | LiOH | 2.5 | Negative electrode 11 | 90 | 61 | 51 | 7.2 |
| Example 93 | Activated carbon 2 | Li$_2$CO$_3$ | 2.2 | Negative electrode 7 | 85 | 65 | 62 | 8.2 |
| Example 94 | Activated carbon 2 | Li$_2$CO$_3$ | 2.2 | Negative electrode 11 | 90 | 61 | 51 | 7.2 |
| Comp. Example 17 | Activated carbon 2 | Li$_2$CO$_3$ | 2.2 | Negative electrode 9 | 47 | 35 | 15 | 1.8 |
| Comp. Example 18 | Activated carbon 2 | Li$_2$CO$_3$ | 2.2 | Negative electrode 14 | 42 | 34 | 12 | 1.5 |

| | Negative electrode after use | | | | Positive electrode Lithium compound mean particle diameter (μm) | Nonaqueous lithium power storage element properties | | |
|---|---|---|---|---|---|---|---|---|
| | Va/Vb (%) | Vc/Vb (%) | Sa/Sb (%) | Negative electrode active material layer mean pore size (nm) | | E/V (Wh/L) | Ra · F (ΩF) | Rb/Ra |
| Example 79 | 52 | 41 | 22 | 3.6 | 1.7 | 22 | 1.46 | 1.75 |
| Example 80 | 65 | 47 | 30 | 4.4 | 1.6 | 23 | 1.23 | 1.63 |
| Example 81 | 66 | 50 | 31 | 4.5 | 1.8 | 25 | 1.55 | 1.62 |
| Example 82 | 82 | 63 | 60 | 7.9 | 1.9 | 27 | 0.78 | 1.09 |
| Example 83 | 100 | 86 | 100 | 12.9 | 1.7 | 26 | 0.81 | 1.03 |
| Example 84 | 76 | 57 | 42 | 6.2 | 2.0 | 33 | 1.64 | 1.49 |
| Example 85 | 92 | 60 | 49 | 7.0 | 2.1 | 35 | 1.32 | 1.14 |
| Example 86 | 91 | 67 | 56 | 7.9 | 2.1 | 35 | 1.40 | 1.20 |
| Example 87 | 99 | 88 | 98 | 12.2 | 2.1 | 34 | 1.34 | 1.10 |
| Example 88 | 89 | 57 | 49 | 6.9 | 0.2 | 35 | 1.30 | 1.35 |

TABLE 6-continued

| | | | | | | | | |
|---|---|---|---|---|---|---|---|---|
| Example 89 | 88 | 55 | 47 | 6.7 | 6.0 | 35 | 1.45 | 1.14 |
| Example 90 | 88 | 52 | 44 | 6.5 | 9.4 | 35 | 1.60 | 1.15 |
| Example 91 | 90 | 57 | 48 | 6.9 | 1.7 | 34 | 1.45 | 1.31 |
| Example 92 | 87 | 50 | 42 | 6.4 | 2.4 | 35 | 1.42 | 1.28 |
| Example 93 | 75 | 53 | 55 | 7.2 | 2.1 | 27 | 1.24 | 1.32 |
| Example 94 | 83 | 49 | 33 | 6.1 | 2.1 | 35 | 1.47 | 1.37 |
| Comp. Example 17 | 43 | 31 | 9 | 1.6 | 1.6 | 23 | 3.21 | 2.32 |
| Comp. Example 18 | 39 | 33 | 8 | 1.2 | 1.8 | 33 | 3.09 | 2.22 |

Based on comparison of Examples 79 to 94 and Comparative Examples 17 and 18, it is seen that by adjusting the volume of pores of 20 Å to 350 Å in the negative electrode active material layer as calculated by QSDFT to be 50% to 100% of the volume of pores of 0 Å to 350 Å as calculated by QSDFT, a nonaqueous lithium power storage element using it can exhibit low resistance (this, a high input/output characteristic) and a high load charge/discharge cycle characteristic.

Reference Example 1

A nonaqueous lithium power storage element was produced in the same manner as Example 85, and was used for [Analysis of negative electrode active material layer of negative electrode after use], by the method described below.

[Analysis of Negative Electrode Active Material Layer of Negative Electrode after Use]

The negative electrode 11 of the nonaqueous lithium power storage element obtained as described above was used for measurement of $V_a$, $V_b$, $V_c$, $S_a$, $S_b$ and the mean pore size of the negative electrode active material layer of the negative electrode after use.

First, the nonaqueous lithium power storage element produced as described above was subjected to constant-current charge to 2.9 V with a current of 50 mA, using a charge/discharge apparatus (ACD-01) by Aska Electronic Co., Ltd., at an environmental temperature of 25° C., and then to constant-current/constant-voltage charge with application of a constant voltage of 2.9 V for 15 hours.

The negative electrode 11 was then sampled under an argon atmosphere. The nonaqueous lithium power storage element was disassembled under an argon atmosphere, and the negative electrode 11 was removed. Next, the obtained negative electrode 11 was immersed in diethyl carbonate for 2 minutes or longer to remove the nonaqueous electrolytic solution and lithium salt, and was air-dried. The obtained negative electrode 11 was then used as the working electrode and metal lithium as the counter electrode and reference electrode, and these were immersed in the nonaqueous electrolytic solution prepared in Example 79 under an argon atmosphere, to fabricate an electrochemical cell. Using a charge/discharge apparatus (TOSCAT-3000U) by Toyo System Co., Ltd., the obtained electrochemical cell was subjected to constant-current charge at a current of 10 mA until reaching a voltage of 2.5 V (that is, until the negative electrode potential of the negative electrode 11 (vs. Li/Li$^+$) reached 2.5 V), followed by constant-current/constant-voltage charge with application of a constant voltage of 2.5 V for 15 hours. The charge referred to here is the procedure of releasing lithium ions from the negative electrode 11. Next, the negative electrode 11 was removed from the electrochemical cell under an argon atmosphere, and immersed in diethyl carbonate for 2 minutes or longer to remove the nonaqueous electrolytic solution and lithium salt, and air-dried. Next, the obtained negative electrode 11 was vacuum dried for 12 hours using a vacuum dryer under conditions with a temperature of 170° C., to obtain a measuring sample. For the obtained measuring sample, $V_a$, $V_b$, $V_c$, $S_a$, $S_b$ and the mean pore size of the negative electrode active material layer of the negative electrode after use were measured by the method described above, using a pore distribution measuring device by Yuasa-Ionics, Inc. (AUTOSORB-1 AS-1-MP), with nitrogen as the adsorbate. The results are shown in Table 7.

TABLE 7

| | Positive electrode precursor | | | Negative electrode before use | | | | | Negative electrode after use | | | |
|---|---|---|---|---|---|---|---|---|---|---|---|---|
| | Positive electrode active material | Lithium compound | Lithium compound mean particle diameter (μm) | Negative electrode | $V_a/V_b$ (%) | $V_c/V_b$ (%) | $S_a/S_b$ (%) | Negative electrode active material layer mean pore size (μm) | $V_a/V_b$ (%) | $V_c/V_b$ (%) | $S_a/S_b$ (%) | Negative electrode active material layer mean pore size (nm) |
| Example 85 | Activated carbon 2 | Li$_2$CO$_3$ | 2.2 | Negative electrode 11 | 90 | 61 | 51 | 7.2 | 92 | 60 | 49 | 7.0 |
| Reference Example 1 | Activated carbon 2 | Li$_2$CO$_3$ | 2.2 | Negative electrode 11 | 90 | 61 | 51 | 7.2 | 91 | 61 | 48 | 7.1 |

From Example 85 and Reference Example 1 it is seen that similar results are obtained regardless of the difference in the pretreatment method of the measuring sample in [Analysis of negative electrode active material layer of negative electrode after use].

INDUSTRIAL APPLICABILITY

With the nonaqueous lithium power storage element of the invention, a plurality of nonaqueous lithium power storage elements may be connected in series or in parallel to create a power storage module, for example. The nonaqueous lithium power storage element and power storage module of the invention may be suitably utilized in a power regenerating system of an automobile hybrid drive system, a power load-leveling system for natural power generation such as solar power generation or wind power generation, or in a microgrid, an uninterruptable power source system for factory production equipment or the like, a non-contact power supply system designed for leveling of voltage fluctuation in microwave power transmission or electrolytic resonance, or energy storage, or an energy harvesting system designed for utilization of electric power generated by vibration or the like, which are purposes that require a high load charge/discharge cycle characteristic.

The nonaqueous lithium power storage element of the invention is preferably applied in a lithium ion capacitor or lithium ion secondary battery, for example, where the effect of the invention will be maximally exhibited.

The invention claimed is:

1. A nonaqueous lithium power storage element containing a positive electrode, a negative electrode, a separator and a nonaqueous electrolytic solution containing lithium ion, wherein
the positive electrode has a positive electrode power collector and a positive electrode active material layer disposed on one or both sides of the positive electrode power collector, the positive electrode active material layer comprising a positive electrode active material containing a carbon material,
the negative electrode has a negative electrode power collector and a negative electrode active material layer disposed on one or both sides of the negative electrode power collector, the negative electrode active material layer comprising a negative electrode active material that can intercalate and release lithium ions, and
in a pore distribution of the positive electrode active material layer measured by a mercury intrusion method, a pore distribution curve for a relationship between a pore diameter of the positive electrode active material layer and a log differential pore volume of the positive electrode active material layer has at least one peak with a peak value of 1.0 mL/g to 5.0 mL/g for the log differential pore volume in the pore diameter range of 0.1 μm to 50 μm, and a total cumulative pore volume Vp of the positive electrode active material layer in the pore diameter range of 0.1 μm to 50 μm is 0.7 mL/g to 3.0 mL/g.

2. The nonaqueous lithium power storage element according to claim 1, wherein the pore distribution curve for the positive electrode active material layer has at least two peaks with a peak value of 0.5 mL/g to 5.0 mL/g for the log differential pore volume in the pore diameter range of 0.1 μm to 50 μm.

3. The nonaqueous lithium power storage element according to claim 2, wherein the pore distribution curve for the positive electrode active material layer has at least two peaks in the pore diameter range of 0.3 μm to 20 μm.

4. The nonaqueous lithium power storage element according to claim 1, wherein the positive electrode contains a lithium compound other than the positive electrode active material.

5. The nonaqueous lithium power storage element according to claim 4, wherein the lithium compound is one or more types selected from the group consisting of lithium carbonate, lithium oxide and lithium hydroxide.

6. The nonaqueous lithium power storage element according to claim 4, wherein the lithium compound in the positive electrode is lithium carbonate.

7. The nonaqueous lithium power storage element according to claim 4, wherein the amount of lithium compound in the positive electrode is 1 weight % to 50 weight %, based on the weight of the positive electrode active material layer.

8. The nonaqueous lithium power storage element according to claim 4, wherein 0.1 μm≤$Y_1$≤10 μm, where $Y_1$ is the mean particle diameter of the lithium compound, 2 μm≤$Z_1$≤20 μm, where $Z_1$ is the mean particle diameter of the positive electrode active material, and $Y_1$<$Z_1$.

9. The nonaqueous lithium power storage element according to claim 4, wherein the proportion $A_1$ of voids with an area of 0.2 μm$^2$ to 250 μm$^2$ in a cross-sectional SEM image of the positive electrode active material layer is 10% to 60% per unit area of the positive electrode active material layer.

10. The nonaqueous lithium power storage element according to claim 9, wherein 1.0≤$B_1/4C_1$≤3.5 is satisfied, where $B_1$ is the total circumferential length of voids with an area of 0.2 μm$^2$ to 250 μm$^2$ in a cross-sectional SEM image of the positive electrode active material layer, and $C_1$ is the total of the square roots of the areas of voids with an area of 0.2 μm$^2$ to 250 μm$^2$.

11. The nonaqueous lithium power storage element according to claim 9, wherein in a cross-sectional SEM image of the positive electrode active material layer, voids are present surrounding the lithium compound in the positive electrode active material layer, and $X_1$>$Y_1$ is satisfied, where $X_1$ is the mean size of the voids.

12. The nonaqueous lithium power storage element according to claim 4, wherein 0.3≤A≤5.0, 0.5≤B≤10, 0.05≤C≤3.0 and 0.4≤A/B≤1.5 are satisfied, where A (μL/cm$^2$) is the mesopore volume per unit area due to pores with diameters of 20 Å to 500 Å, as calculated by the BJH method in nitrogen gas adsorption measurement for each side of the positive electrode, B (μL/cm$^2$) is the micropore volume per unit area due to pores with diameters of smaller than 20 Å, as calculated by the MP method in the nitrogen gas adsorption measurement, and C (μL/cm$^2$) is the ultramicropore volume per unit area due to pores with diameters of smaller than 7 Å, as calculated by the DFT method in carbon dioxide gas adsorption measurement for each side of the positive electrode.

13. The nonaqueous lithium power storage element according to claim 12, wherein 1≤D≤20 is satisfied, where D (m$^2$/cm$^2$) is the specific surface area per unit area as calculated by the BET method in nitrogen gas adsorption measurement, for each side of the positive electrode.

14. The nonaqueous lithium power storage element according to claim 1, wherein the area overlap ratio $A_2$ of fluorine mapping with respect to oxygen mapping, binarized based on the mean value of brightness, is 40% to 99%, in element mapping of the positive electrode surface by SEM-EDX.

15. The nonaqueous lithium power storage element according to claim 1, wherein the area overlap ratio $A_3$ of fluorine mapping with respect to oxygen mapping, binarized based on the mean value of brightness, is 10% to 60%, in element mapping of a broad ion beam (BIB) processed cross-section of the positive electrode by SEM-EDX.

16. The nonaqueous lithium power storage element according to claim 1, wherein the volume of pores of 20 Å to 350 Å as calculated by QSDFT (Quenching Solid Density Functional Theory) in the negative electrode active material layer is 50% to 100% of the volume of pores of 0 Å to 350 Å as calculated by QSDFT.

17. The nonaqueous lithium power storage element according to claim 16, wherein the volume of pores of 20 Å to 250 Å as calculated by QSDFT in the negative electrode active material layer is 40% to 90% of the volume of pores of 0 Å to 350 Å as calculated by QSDFT.

18. The nonaqueous lithium power storage element according to claim 16, wherein the specific surface area of 20 Å to 350 Å as calculated by QSDFT in the negative electrode active material layer is 20% to 100% of the specific surface area of 0 Å to 350 Å as calculated by QSDFT.

19. The nonaqueous lithium power storage element according to claim 16, wherein the mean pore size of the negative electrode active material layer is 2 nm to 20 nm.

20. The nonaqueous lithium power storage element according to claim 1, wherein the positive electrode active material comprises activated carbon as the carbon material.

21. The nonaqueous lithium power storage element according to claim 20, wherein the activated carbon satisfies $0.3 < V_1 \leq 0.8$ and $0.5 \leq V_2 \leq 1.0$, where $V_1$ (cc/g) is the mesopore volume due to pores with diameters of 20 Å to 500 Å as calculated by the BJH method, and $V_2$ (cc/g) is the micropore volume due to pores with diameters of smaller than 20 Å as calculated by the MP method, and has a specific surface area of 1,500 m$^2$/g to 3,000 m$^2$/g, as measured by the BET method.

22. The nonaqueous lithium power storage element according to claim 20, wherein the activated carbon satisfies $0.8 < V_1 \leq 2.5$, where $V_1$ (cc/g) is the mesopore volume due to pores with diameters of 20 Å to 500 Å as calculated by the BJH method, satisfies $0.8 < V_2 \leq 3.0$, where $V_2$ (cc/g) is the micropore volume due to pores with diameters of smaller than 20 Å as calculated by the MP method, and has a specific surface area of 2,300 m$^2$/g to 4,000 m$^2$/g, as measured by the BET method.

23. The nonaqueous lithium power storage element according to claim 1, wherein the mean particle diameter of the positive electrode active material is 1 μm to 10 μm.

24. The nonaqueous lithium power storage element according to claim 1, wherein the doping amount of lithium ion in the negative electrode active material is 530 mAh/g to 2,500 mAh/g per unit weight.

25. The nonaqueous lithium power storage element according to claim 1, wherein the BET specific surface area of the negative electrode active material is 100 m$^2$/g to 1,500 m$^2$/g.

26. The nonaqueous lithium power storage element according to claim 1, wherein the doping amount of lithium ion in the negative electrode active material is 50 mAh/g to 700 mAh/g per unit weight.

27. The nonaqueous lithium power storage element according to claim 1, wherein the BET specific surface area of the negative electrode active material is 1 m$^2$/g to 50 m$^2$/g.

28. The nonaqueous lithium power storage element according to claim 1, wherein the mean particle diameter of the negative electrode active material is 1 μm to 10 μm.

29. The nonaqueous lithium power storage element according to claim 1, wherein the positive electrode power collector and the negative electrode power collector are metal foils without through-holes.

30. The nonaqueous lithium power storage element according to claim 1, wherein the following (a) and (b) are simultaneously satisfied for the nonaqueous lithium power storage element:
(a) the product of Ra and F, Ra·F, is 0.3 to 3.0,
(b) E/V is 15 to 50,
where Ra (Ω) is the initial internal resistance at a cell voltage of 4 V, F (F) is the electrostatic capacitance, E (Wh) is the electrical energy and V (L) is the volume of the power storage element.

31. The nonaqueous lithium power storage element according to claim 1, wherein Rb/Ra is 0.90 to 2.0, where Rb (Ω) is the internal resistance of the nonaqueous lithium power storage element after a charge/discharge cycling test conducted 60,000 times at an environmental temperature of 25° C. and a rate of 300 C, in a cell voltage range from 2.2 V to 3.8 V, and Ra (Ω) is the internal resistance before the charge/discharge cycling test.

32. A power storage module containing the nonaqueous lithium power storage element according to claim 1.

33. A power regenerating system containing the nonaqueous lithium power storage element according to claim 1.

34. A power load-leveling system containing the nonaqueous lithium power storage element according to claim 1.

35. An uninterruptable power source system containing the nonaqueous lithium power storage element according to claim 1.

36. A non-contact power supply system containing the nonaqueous lithium power storage element according to claim 1.

37. An energy harvesting system containing the nonaqueous lithium power storage element according to claim 1.

38. A power storage system containing the nonaqueous lithium power storage element according to claim 1.

* * * * *